US012755759B2

(12) United States Patent
Morita

(10) Patent No.: US 12,755,759 B2
(45) Date of Patent: Oct. 6, 2026

(54) SERVO RECORDING APPARATUS, SERVO WRITE HEAD, METHOD OF PRODUCING A MAGNETIC TAPE, AND MAGNETIC TAPE

(71) Applicant: Sony Group Corporation, Tokyo (JP)

(72) Inventor: Hiroshi Morita, Tokyo (JP)

(73) Assignee: Sony Group Corporation, Tokyo (JP)

(*) Notice: Subject to any disclaimer, the term of this patent is extended or adjusted under 35 U.S.C. 154(b) by 139 days.

(21) Appl. No.: 18/727,624

(22) PCT Filed: Oct. 19, 2022

(86) PCT No.: PCT/JP2022/038907
§ 371 (c)(1),
(2) Date: Jul. 9, 2024

(87) PCT Pub. No.: WO2023/153024
PCT Pub. Date: Aug. 17, 2023

(65) Prior Publication Data

US 2025/0095678 A1 Mar. 20, 2025

(30) Foreign Application Priority Data

Feb. 14, 2022 (JP) ................................ 2022-020837
Jul. 22, 2022 (JP) ................................ 2022-117550

(51) Int. Cl.
*G11B 5/592* (2006.01)
*G11B 5/29* (2006.01)
(Continued)

(52) U.S. Cl.
CPC ............ *G11B 5/5928* (2013.01); *G11B 5/295* (2013.01); *G11B 5/70678* (2013.01); *G11B 5/78* (2013.01); *G11B 5/84* (2013.01)

(58) Field of Classification Search
None
See application file for complete search history.

(56) References Cited

U.S. PATENT DOCUMENTS 4,616,280 A * 10/1986 Kobayashi ............... G11B 5/56
5,982,711 A * 11/1999 Knowles ............. G11B 21/086
(Continued)

FOREIGN PATENT DOCUMENTS

JP 2003168269 A 6/2003
JP 2005259198 A 9/2005
(Continued)

OTHER PUBLICATIONS

International Search Report from corresponding PCT application PCT/JP2022/038907, dated Jan. 17, 2023.

*Primary Examiner* — Fred Tzeng
(74) *Attorney, Agent, or Firm* — K&L Gates LLP

(57) ABSTRACT

A servo recording apparatus according to the present technology includes: a servo write head. The servo write head writes a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle.

26 Claims, 19 Drawing Sheets

(51) Int. Cl.

| | |
|---|---|
| ***G11B 5/706*** | (2006.01) |
| ***G11B 5/78*** | (2006.01) |
| ***G11B 5/84*** | (2006.01) |

(56) References Cited

U.S. PATENT DOCUMENTS

| | | | | |
|---|---|---|---|---|
| 9,830,943 | B2 * | 11/2017 | Cherubini | G11B 5/00826 |
| 10,366,716 | B1 * | 7/2019 | Judd | G11B 5/588 |
| 11,138,996 | B1 * | 10/2021 | Galbraith | G11B 5/00817 |
| 2003/0099059 | A1 | 5/2003 | Nakao | |
| 2005/0254163 | A1 | 11/2005 | Nakao | |
| 2009/0073604 | A1 * | 3/2009 | Johnson | G11B 5/584 |
| 2009/0161249 | A1 * | 6/2009 | Takayama | G11B 5/584 |
| 2014/0268414 | A1 | 9/2014 | Nakashio et al. | |
| 2015/0043101 | A1 * | 2/2015 | Biskeborn | G11B 5/4893 360/71 |
| 2015/0356993 | A1 | 12/2015 | Cherubini et al. | |
| 2022/0108720 | A1 * | 4/2022 | Yamamoto | G11B 5/5526 |

FOREIGN PATENT DOCUMENTS

| | | | |
|---|---|---|---|
| JP | 2005327386 | A | 11/2005 |
| JP | 2010182411 | A | 8/2010 |
| JP | 2011192341 | A | 9/2011 |
| JP | 2014199706 | A | 10/2014 |

* cited by examiner

SERVO RECORDING APPARATUS, SERVO WRITE HEAD, METHOD OF PRODUCING A MAGNETIC TAPE, AND MAGNETIC TAPE

TECHNICAL FIELD

The present technology relates to a technology such as a servo recording apparatus that records a servo pattern on a magnetic tape.

BACKGROUND ART

A magnetic tape is provided with a plurality of data bands on which data is recorded and a plurality of servo bands on which servo patterns are recorded. In the magnetic tape, first, a servo pattern is recorded on a servo band by a servo write head of a servo recording apparatus (see, for example, Patent Literature 1).

A data write head of a data recording apparatus writes data to an arbitrary position of the data band while recognizing the position of the magnetic tape on the basis of the servo pattern (see, for example, the following Patent Literature 2).

Here, the width of the magnetic tape fluctuates due to temperature, humidity, and the like in some cases. In order to deal with this, the following Patent Literature 2 proposes that the data write head is disposed so as to be inclined with respect to the width direction of the magnetic tape.

CITATION LIST

Patent Literature

Patent Literature 1: Japanese Patent Application Laid-open No. 2014-199706

Patent Literature 2: Japanese Patent Application Laid-open No. 2005-259198

DISCLOSURE OF INVENTION

Technical Problem

In the case where the data write head is disposed so as to be inclined with respect to the width direction of the magnetic tape, there is a problem that reading of the servo pattern becomes inaccurate due to differences in azimuth loss.

In view of the circumstances as described above, it is an object of the present technology to provide a technology for writing a servo pattern that can be accurately read even when a data write head is disposed so as to be inclined with respect to a width direction of a magnetic tape, and the like.

Solution to Problem

A servo recording apparatus according to the present technology includes: a servo write head.

The servo write head writes a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle.

As a result, it is possible to write a servo pattern that can be accurately read even when a data write head is disposed so as to be inclined with respect to a width direction of a magnetic tape.

In the servo recording apparatus, the servo write head may include a plurality of pairs of servo elements corresponding to the plurality of servo bands, each of the pairs of servo elements including a first servo element that writes the first servo pattern and a second servo element that writes the second servo pattern.

In the servo recording apparatus, the first servo element and the second servo element may be provided in the servo write head so as to be asymmetric with respect to the width direction of the magnetic tape.

In the servo recording apparatus, the first servo element may be inclined with respect to the width direction of the magnetic tape at a first angle, and the second servo element may be inclined opposite to the first angle at a second angle that is different from the first angle with respect to the width direction of the magnetic tape.

In the servo recording apparatus, the first head azimuth angle of the data write head may be adjusted in the data recording apparatus.

In the servo recording apparatus, the first head azimuth angle of the data write head may be adjusted within a reference angle ±x° in the data recording apparatus.

In the servo recording apparatus, the first angle and the second angle may be related to the reference angle.

In the servo recording apparatus, the first angle may have a value obtained by adding a servo azimuth angle to the reference angle.

In the servo recording apparatus, the second angle may have a value obtained by subtracting the servo azimuth angle from the reference angle.

In the servo recording apparatus, the servo write head may be disposed such that a longitudinal direction of the servo write head is inclined with respect to the width direction of the magnetic tape by a second head azimuth angle.

In the servo recording apparatus, the first servo element and the second servo element may be inclined opposite to each other at the same angle with respect to the longitudinal direction of the servo write head.

In the servo recording apparatus, the second head azimuth angle may match the reference angle.

In the servo recording apparatus, the first servo element and the second servo element may have longitudinal directions, and a length of the first servo element in the longitudinal direction and a length of the second servo element in the longitudinal direction may be different from each other.

In the servo recording apparatus, a component of the width direction of the magnetic tape in the length of the first servo element and a component of the width direction of the magnetic tape in the length of the second servo element may be the same.

In the servo recording apparatus, the servo write head may have a width direction, the servo write head may have a facing surface that faces the magnetic tape, and the facing surface may include a plurality of grooves along a direction that is not parallel to the width direction of the servo write head.

In the servo recording apparatus, the reference angle may be 2.5° or more with respect to the width direction of the magnetic tape.

In the servo recording apparatus, the x may have a value of 0.7° or less.

In the servo recording apparatus, a phase difference of servo patterns between servo bands adjacent to each other may be represented by SP×tan (Refθ), the servo patterns including the first servo pattern and the second servo pattern, the Refθ being the reference angle, the SP being a pitch between the servo bands adjacent to each other in the width direction of the magnetic tape.

A servo write head according to the present technology writes a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle.

A method of producing a magnetic tape according to the present technology includes: writing, by a servo write head of a servo recording apparatus, a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle.

A magnetic tape according to the present technology is a magnetic tape, including: a base; a non-magnetic layer that is stacked on the base; and a magnetic layer that is stacked on the non-magnetic layer, the magnetic tape having a plurality of servo bands to which servo patterns have been written, the servo patterns including a first servo pattern and a second servo pattern that are asymmetric with respect to a width direction of the magnetic tape, the servo patterns in servo bands adjacent to each other having a phase difference.

In the magnetic tape, the first servo pattern may be inclined with respect to the width direction of the magnetic tape at a first angle, and the second servo pattern may be inclined opposite to the first angle at a second angle that is different from the first angle with respect to the width direction of the magnetic tape.

In the magnetic tape, the first servo pattern and the second servo pattern may have longitudinal directions, and a length of the first servo pattern in the longitudinal direction and a length of the second servo pattern in the longitudinal direction may be different from each other.

In the magnetic tape, a component of the width direction of the magnetic tape in the length of the first servo pattern and a component of the width direction of the magnetic tape in the length of the second servo pattern may be the same.

In the magnetic tape, the magnetic tape may be used in a data recording apparatus that includes a data write head disposed such that a longitudinal direction of the data write head is inclined with respect to the width direction of the magnetic tape by a first head azimuth angle.

In the magnetic tape, the first head azimuth angle may be adjusted within a predetermined range with reference to a reference angle.

In the magnetic tape, the phase difference may be related to the reference angle.

In the magnetic tape, the phase difference may be represented by SP×tan (Refθ), the Refθ being the reference angle, the SP being a pitch between the servo bands adjacent to each other in the width direction of the magnetic tape.

In the magnetic tape, phases of the servo pattern may be the same in a direction of the reference angle with respect to the width direction of the magnetic tape.

In the magnetic tape, the first angle and the second angle may be related to the reference angle.

In the magnetic tape, the first angle may have a value obtained by adding a servo azimuth angle to the reference angle.

In the magnetic tape, the second angle may have a value obtained by subtracting the servo azimuth angle from the reference angle.

MODE(S) FOR CARRYING OUT THE INVENTION

Embodiments according to the present technology will be described below with reference to the drawings.

First Embodiment

Figure 2:
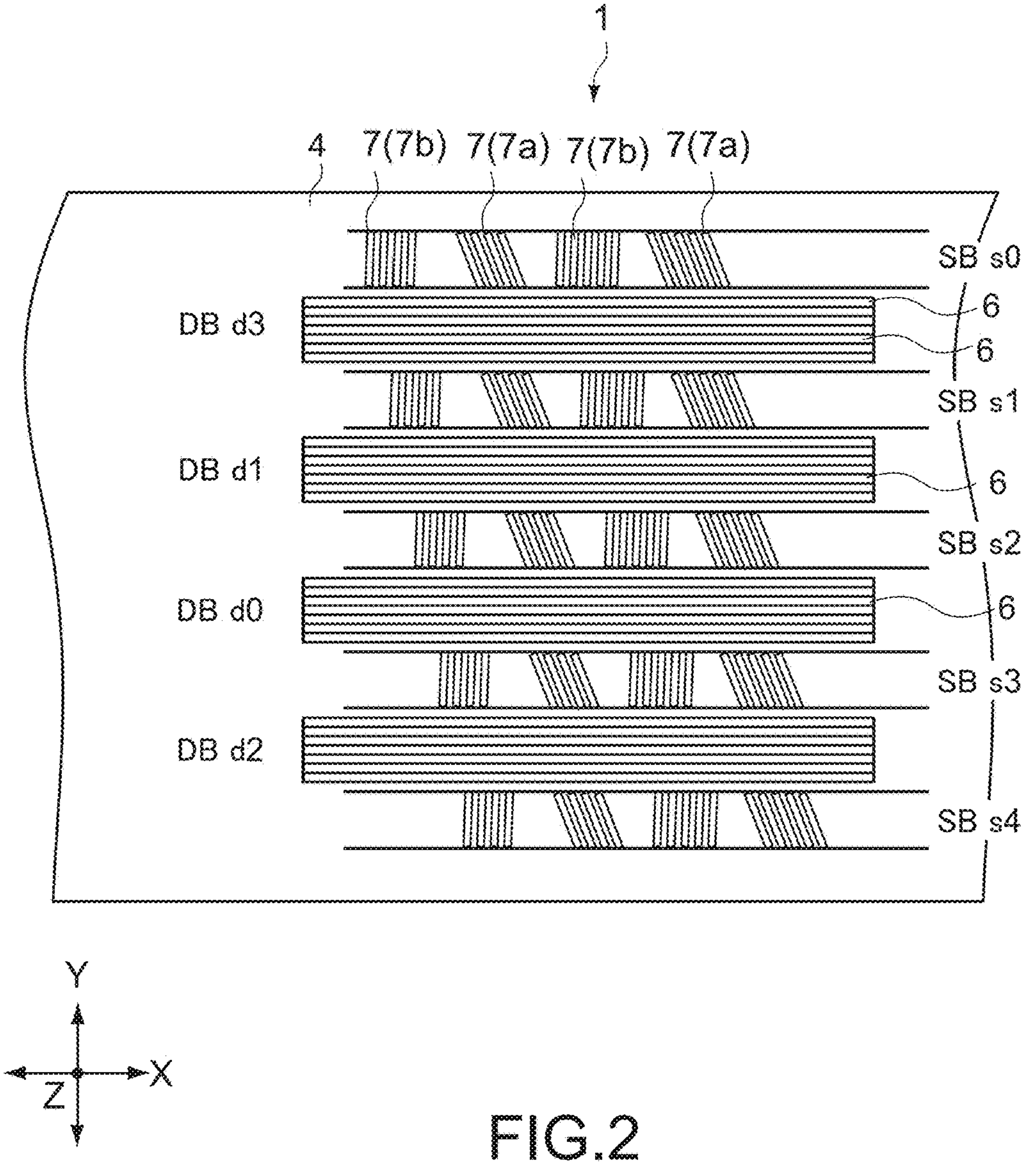
FIG. 2 is a schematic diagram of the magnetic tape as viewed from above (magnetic layer side).

In this embodiment, a servo recording/reproduction apparatus 101 (servo recording apparatus) (see FIG. 9) is configured to write a servo pattern 7 that can be accurately read by a data write head 20 of a data recording/reproduction apparatus 100 (data recording apparatus) (see FIG. 3) onto a servo band s of a magnetic tape 1 (see FIG. 2).

Figure 4:
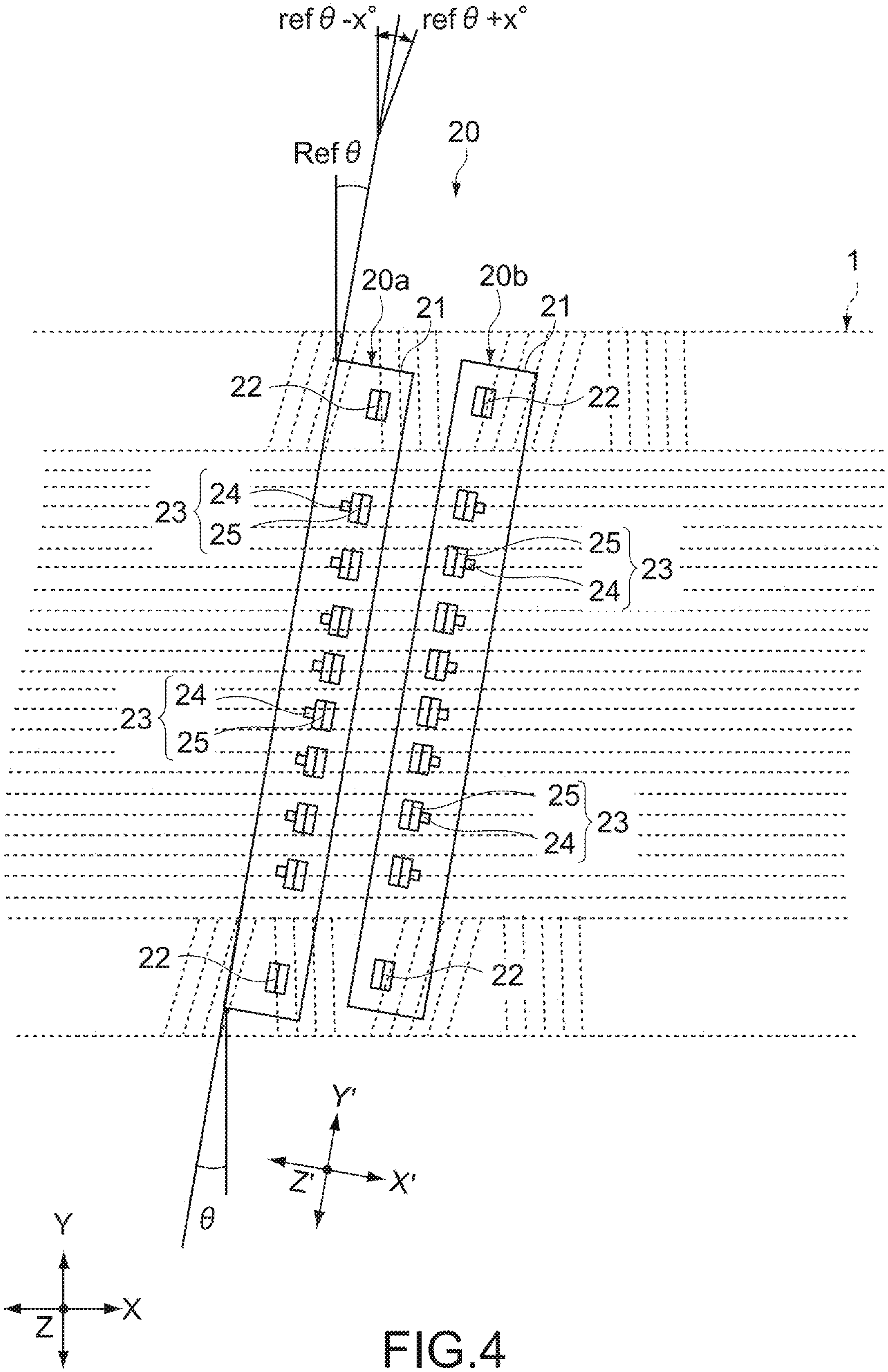
FIG. 4 is a schematic diagram of a data write head as viewed from below (back layer side).

The data write head 20 of the data recording/reproduction apparatus 100 is disposed to be inclined with respect to a width direction of the magnetic tape 1 (see FIG. 4). For this reason, in this embodiment, a first servo pattern 7*a* ("/") and a first servo pattern 7*b* ("¥") that are asymmetric with respect to the width direction of the magnetic tape are written to the servo band s (see FIG. 2).

In the description of this embodiment, the configuration of the magnetic tape 1, the configuration of the data recording/reproduction apparatus 100, and the configuration of the servo recording/reproduction apparatus 101 will be described in this order.

<Configuration of Magnetic Tape 1>

Figure 1:
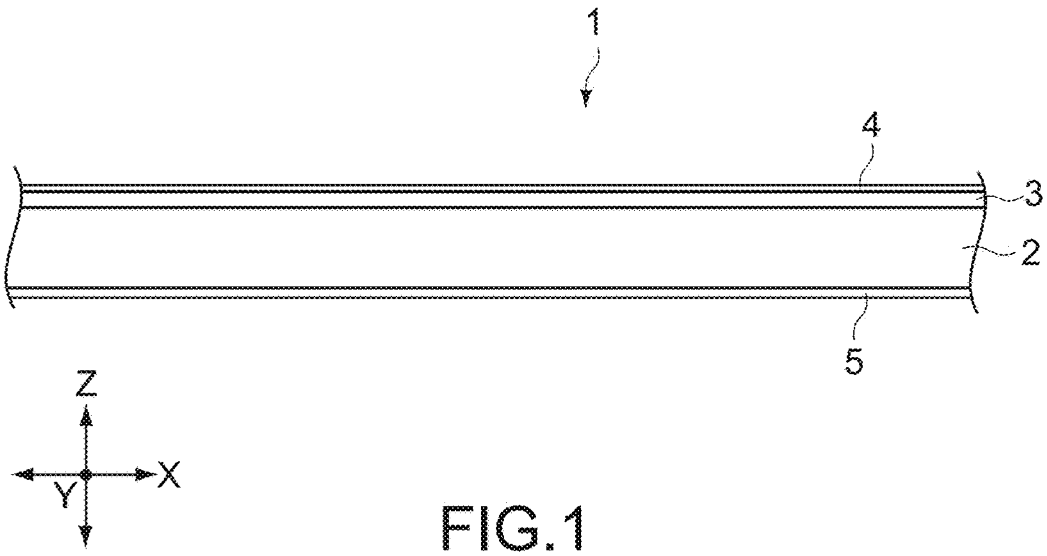
FIG. 1 is a schematic diagram of a magnetic tape as viewed from the side.

FIG. 1 is a schematic diagram of the magnetic tape 1 as viewed from the side, and FIG. 2 is a schematic diagram of the magnetic tape 1 as viewed from above (side of a magnetic layer 4). As shown in FIG. 1 and FIG. 2, the magnetic tape 1 is configured to have a tape shape that is long in the longitudinal direction (X-axis direction), short in the width direction (Y-axis direction), and thin in the thickness direction (Z-axis direction).

The width (Y-axis direction) of the magnetic tape 1 is typically approximately ½ inch, the width of the magnetic tape 1 may be approximately 1 inch, and the size thereof can be changed as appropriate.

The magnetic tape 1 includes a base material 2 having a tape shape that is long in the longitudinal direction (X-axis direction), an underlayer 3 (non-magnetic layer) that is provided on one main surface of the base material 2, a magnetic layer 4 provided on the underlayer 3, and a back layer 5 that is provided on the other main surface of the base material 2.

Note that the back layer 5 only needs to be provided as necessary and this back layer 5 may be omitted. The magnetic layer 4 may be of a perpendicularly oriented type or longitudinally oriented type. Further, the magnetic layer 4 may be a coated film of a magnetic material or may be a deposition film or a sputtering film of a magnetic material. Note that details of the respective layers constituting the magnetic tape 1 will be described below.

As shown in FIG. 2, the magnetic layer 4 includes a plurality of data bands d (data bands d0 to d3) to which data is written, and a plurality of servo bands s (servo bands s0 to s4) to which the servo pattern 7 is written. The plurality of data bands d and the plurality of servo bands s each have a shape that is long in the longitudinal direction (X-axis direction) and short in the width direction (Y-axis direction). The servo bands s are disposed at positions sandwiching the respective data bands d in the width direction (Y-axis direction).

In the example shown in FIG. 2, the number of data bands d is four and the number of servo bands s is five. Note that the number of data bands d and the number of servo bands s can be changed as appropriate.

The ratio of the area of the servo band s to the area of the entire surface of the magnetic layer 4 is, for example, 4.0% or less. Note that the width of the servo band s is, for example, 96 μm or less in the case of a tape width of ½ inch. The ratio of the area of the servo band s to the area of the entire surface of the magnetic layer 43 can be measured by, for example, developing the magnetic tape 1 using a developer such as a ferricolloid developer and then observing the developed magnetic tape 1 with an optical microscope.

The data band d includes a plurality of recording tracks 6 that is long in the longitudinal direction and aligned in the width direction. The number of recording tracks 6 included in one data band d is, for example, approximately 1000 to 2500. Data is recorded in the recording tracks 6 along the recording tracks 6. The 1-bit length in the longitudinal direction of data recorded in the data band d is, for example, 48 nm or less.

Further, the width (track pitch: Y-axis direction) of the recording track 6 is, for example, 2.0 μm or less. Note that such a recording track width can be measured by, for example, developing the magnetic layer 4 of the magnetic tape 1 using a developer such as a ferricolloid developer and then observing the developed magnetic layer 4 of the magnetic tape 1 with an optical microscope.

Alternatively, as a method of measuring the recording track width, a method of using the data write head 20 (see FIG. 4 described below) may be used. In this case, the data write head 20 is made in a recording and reproduction state in order to ignore fluctuations during travelling of the magnetic tape 1, and the recording track width can be measured on the basis of the change in output when an azimuth angle θ of the data write head 20 is changed. (IEEE_Sept1996_Crosstrack Profiles of Thin Film MR Tape Heads Using the Azimuth Displacement Method)

The servo band s includes the servo pattern 7 having a predetermined shape to be recorded by the servo recording/reproduction apparatus 101 (see FIG. 9) described below. The servo pattern 7 includes the first servo pattern 7*a* ("/") and the second servo pattern 7*b* ("¥").

Note that in the present specification, the symbols "/" and "¥" in the first servo pattern 7*a* and the second servo pattern 7*b* are used as symbols indicating the inclination direction of the servo pattern when the magnetic tape 1 is viewed from below (back layer side). Therefore, the symbols "/" and "¥" of the first servo pattern 7*a* and the second servo pattern 7*b* are reversed when the magnetic tape 1 is viewed from the magnetic layer side in FIG. 2. Meanwhile, in FIG. 10 to FIG. 19 and the like described below, on the head sliding surface, a first servo element 42*a* ("/") that writes the first servo pattern 7*a* ("/"), a second servo element 42*b* ("¥") that writes the second servo pattern 7*b* ("¥"), and the servo patterns 7*a* and 7*b* to be recorded on the magnetic layer by the servo elements 42*a* and 42*b* are shown as viewed from the back layer side.

In this embodiment, the first servo pattern 7*a* ("/") and the second servo pattern 7*b* ("¥") are written to the servo band s so as to be asymmetric with respect to the width direction (Y-axis direction) of the magnetic tape 1. Note that in the case of a general servo pattern, the first servo pattern 7*a* ("/") and the second servo pattern 7*b* ("¥") are written to the servo band s so as to be symmetrical (line symmetrical) with respect to the width direction of the magnetic tape 1.

Figure 11:
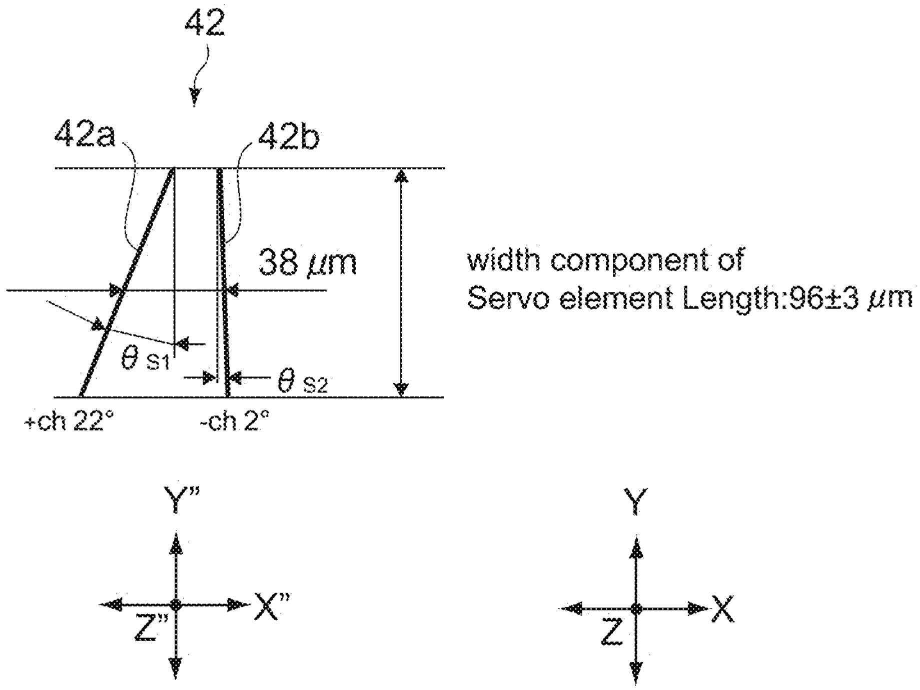
FIG. 11 is an enlarged view of a servo element included in the servo write head according to First Example.

The first servo pattern 7*a* ("/") is inclined at a first angle θs1 with respect to the width direction of the magnetic tape 1, and the second servo pattern 7*b* ("¥") is inclined opposite to the first angle θs1 at a second angle θs2 that is different from the first angle θs1 with respect to the width direction of the magnetic tape 1 (see FIG. 11 and FIG. 13 described below).

One group of first servo patterns 7*a*("/") and one group of second servo patterns 7 ("¥") are arranged alternately in the longitudinal direction of the magnetic tape 1. The number of first servo patterns 7*a* ("/") included in the one group of first servo patterns 7*a* ("/") is typically four or five. Similarly, the number of second servo patterns 7*b* ("¥") included in the one group of second servo patterns 7*b* ("¥") is typically four or five.

The shape of the servo pattern 7 can be measured by, for example, developing the magnetic layer 4 of the magnetic tape 1 using a developer such as a ferricolloid developer and then observing the developed magnetic layer 4 of the magnetic tape 1 with an optical microscope.

Note that details of the first servo pattern 7*a* ("/") and the second servo pattern 7*b* ("¥") will be described in the description of a servo write head 40 of the servo recording/reproduction apparatus 101 that writes this servo pattern 7.

Here, in the magnetic tape 1 in the LTO standard, the number of recording tracks 6 increases with each generation and the recording capacity has dramatically improved. For example, the number of recording tracks 6 was 384 in the first generation LTO-1 and increased to 512, 704, 896, 1280, 2176, 3584, 6656, and 8960 in the LTO-2 to LTO-9, respectively. Similarly, the data recording capacity was 100 GB (gigabyte) in the LTO-1 and increased to 200 GB, 400 GB, 800 GB, 1.5 TB (terabyte), 2.5 TB, 6.0 TB, 12 TB, and 18 TB in the LTO-2 to LTO-9, respectively.

In this embodiment, the number of recording tracks 6 and the recording capacity are not particularly limited and can be changed as appropriate. However, for example, it is advantageous to apply the present technology to the magnetic tape 1 that has a large number of recording tracks 6 and large recording capacity (e.g., 6656 or more, 12 TB or more: LTO8 and subsequent LTOs) and is easily affected by fluctuations in the width of the magnetic tape 1.

<Data Recording/Reproduction Apparatus 100>

Figure 3:
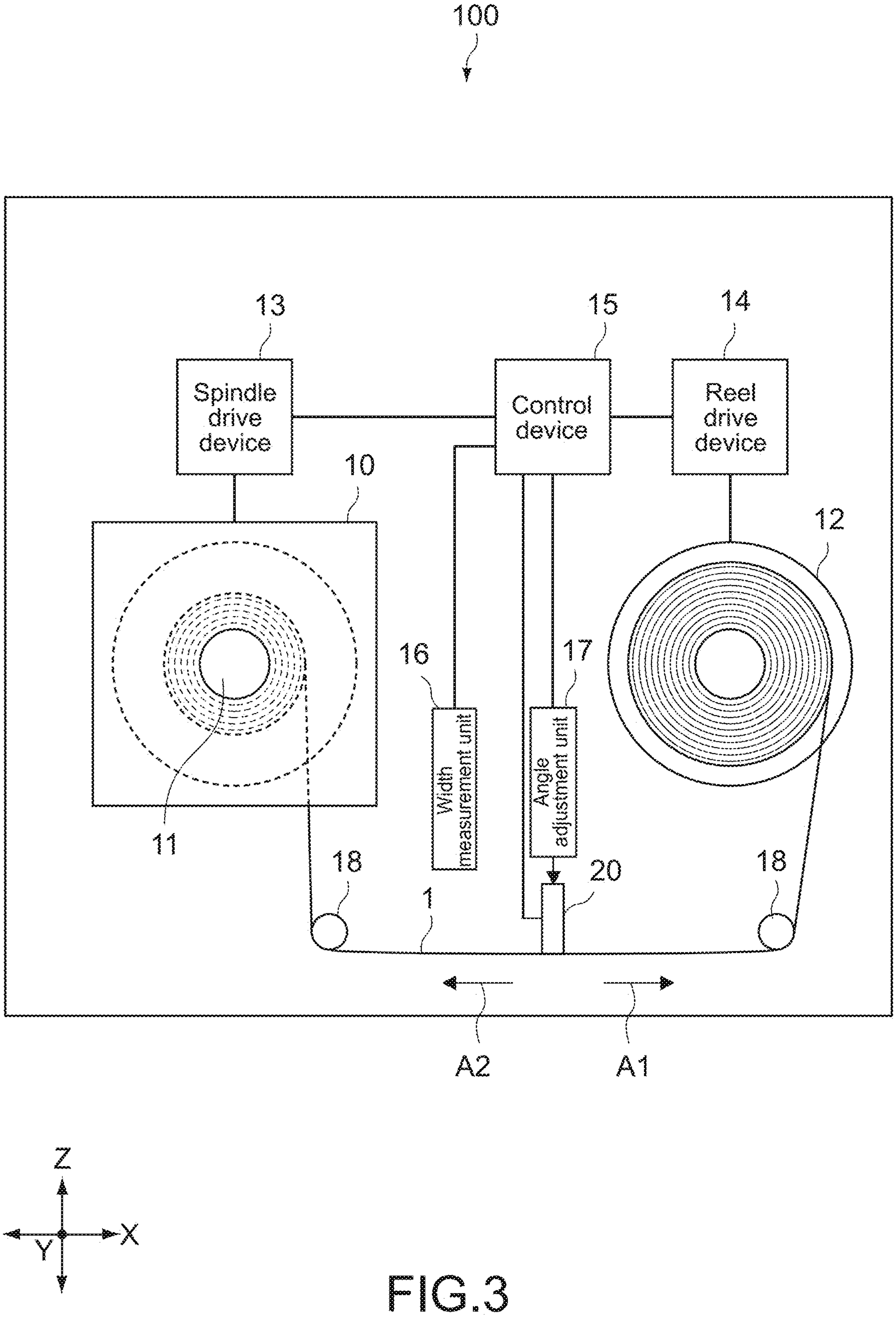
FIG. 3 is a diagram showing a data recording/reproduction apparatus.

FIG. 3 is a diagram showing the data recording/reproduction apparatus 100. The data recording/reproduction apparatus 100 is capable of recording data on the magnetic tape 1 and reproducing the data recorded on the magnetic tape 1.

The data recording/reproduction apparatus 100 is configured such that a cartridge 10 can be loaded therein. The cartridge 10 is configured to be capable of rotatably housing the wound magnetic tape 1 therein. The data recording/reproduction apparatus 100 may be configured such that one cartridge 10 can be loaded therein or a plurality of cartridges 10 can be simultaneously loaded therein.

The data recording/reproduction apparatus 100 includes a spindle 11, a take-up reel 12, a spindle drive device 13, a reel drive device 14, the data write head 20, a control device 15, a width measurement unit 16, an angle adjustment unit 17, and a plurality of guide rollers 18.

The spindle 11 is configured to be capable of causing the magnetic tape 1 housed in the cartridge 10 to rotate by the rotation thereof. The spindle drive device 13 causes the spindle 11 to rotate in accordance with a command from the control device 15.

The take-up reel 12 is configured to be capable of fixing the tip of the magnetic tape 1 pulled out from the cartridge 10 via a tape loading mechanism (not shown). The reel drive device 14 causes the take-up reel 12 to rotate in accordance with a command from the control device 15.

The plurality of guide rollers 18 guides the travelling of the magnetic tape 1 such that the conveying path formed between the cartridge 10 and the take-up reel 12 has a predetermined relative positional relationship with respect to the data write head 20.

The data write head 20 is configured to be capable of recording data on the data band d (recording track 6) of the magnetic tape 1 when the magnetic tape 1 passes below the data write head 20, in accordance with a command from the control device 15, and reproducing the recorded data.

When data is recorded/reproduced on the magnetic tape 1 by the data write head 20, the spindle 11 and the take-up reel 12 are caused to rotate by the spindle drive device 13 and the reel drive device 14 and the magnetic tape 1 travels. Regarding the travelling direction of the magnetic tape 1, the magnetic tape 1 can be reciprocated in the forward direction indicated by an arrow A1 in FIG. 6 (direction of unwinding from the side of the spindle 11 to the side of the take-up reel 12) and the reverse direction indicated by an arrow A2 (direction of rewinding from the side of the take-up reel 12 to the side of the spindle 11).

The data write head 20 is capable of recording/reproducing data in both directions of travelling of the magnetic tape 1 in the forward direction and travelling of the magnetic tape 1 in the reverse direction.

In particular, in this embodiment, the data write head 20 is disposed such that the longitudinal direction (Y'-axis direction) of the data write head 20 is inclined at a predetermined angle θ (a first head the azimuth angle θ) with respect to the width direction (Y-axis direction) of the magnetic tape 1 (see FIG. 4 described below).

In the description of this embodiment, the angle at which the longitudinal direction (Y'-axis direction) of the data write head 20 is disposed to be inclined with respect to the width direction (Y-axis direction) of the magnetic tape 1 is referred to as the azimuth angle θ of the data write head 20. Note that details of the configuration of the data write head 20 will be described below with reference to FIG. 4 and the like.

The width measurement unit 16 is configured to be capable of measuring the width of the magnetic tape 1 when the magnetic tape 1 passes below the width measurement unit 16. That is, the width measurement unit 16 is configured to be capable of measuring the width of the magnetic tape 1 when the data write head 20 records/reproduces data on/from the magnetic tape 1. The width measurement unit 16 measures the width of the magnetic tape 1 and transmits the measured width to the control device 15.

The width measurement unit 16 includes, for example, various sensors such as an optical sensor. As the width measurement unit 16, any sensor may be used as long as it is capable of measuring the width of the magnetic tape 1. Note that the width of the magnetic tape 1 can also be measured by reading the servo patterns 7 adjacent to each other and obtaining the difference between the position signals. In this case, the width measurement unit 16 can be omitted.

The angle adjustment unit 17 is configured to be capable of rotatably holding the data write head 20 around an axis in the up-and-down direction (Z-axis). The angle adjustment unit 17 is configured to be capable of adjusting the azimuth angle θ of the data write head 20 in accordance with a command from the control device 15.

The control device 15 includes, for example, a control unit, a storage unit, a communication unit, and the like. The control unit includes a CPU (Central Processing Unit) or the like, and integrally controls the respective units of the data recording/reproduction apparatus 100 in accordance with a program stored in the storage unit.

The storage unit includes a non-volatile memory on which various types of data and various programs are to be recorded, and a volatile memory to be used as a work area of the control unit. The various programs described above may be read from a portable recording medium such as an optical disc and a semiconductor memory, or may be downloaded from a server apparatus in a network. The communication unit is configured to be capable of communicating with other devices such as a PC (Personal Computer) and a server apparatus.

In particular, in this embodiment, the control device 15 (control unit) acquires information regarding the width of the magnetic tape 1 from the width measurement unit 16 (or predicts the width of the magnetic tape from the servo signal) and adjusts the azimuth angle θ (see FIG. 4) of the data write head 20 by the angle adjustment unit 17 on the basis of the information regarding the width of the magnetic tape 1.

In this embodiment, by adjusting the azimuth angle θ of the data write head 20, the fluctuations in the width of the magnetic tape 1 are dealt with. Typically, the azimuth angle θ of the data write head 20 is made small when the width of the magnetic tape 1 becomes relatively wide, and conversely, the azimuth angle θ of the data write head 20 is made large when the width of the magnetic tape 1 becomes relatively narrow.

The width of the magnetic tape 1 fluctuates in some cases for various reasons such as temperature, humidity, and tension applied in the longitudinal direction of the magnetic tape 1.

[Data Write Head 20]

Next, the configuration of the data write head 20 will be described. FIG. 4 is a schematic diagram of the data write head 20 as viewed from below (back layer side).

In the description of the data write head 20, the longitudinal direction of the data write head 20 is the Y'-axis direction, the width direction of the data write head 20 is the X'-axis direction, and the up-and-down direction of the data write head 20 is the Z'-axis direction. Further, the longitudinal direction (travelling direction) of the magnetic tape 1 is the X-axis direction, the width direction of the magnetic tape 1 is the Y-axis direction, and the thickness direction of the magnetic tape 1 is the Z-axis direction. Note that the direction of the magnetic tape 1 is based on the direction of the magnetic tape 1 when passing below the data write head 20.

As shown in FIG. 4, the data write head 20 includes a first data write head 20*a* and a second data write head 20*b*. Note that in the description of the present specification, in the case where the two data write heads 20 are not particularly distinguished from each other, they are collectively referred to simply as the data write head 20. In the case where the two data write heads 20 are particularly distinguished from each other, they are referred to as the first data write head 20*a* and the second data write head 20*b*.

The first data write head 20*a* and the second data write head 20*b* are configured symmetrically in the width direction (Y'-axis direction) of the data write head 20, but have basically the same configuration. The first data write head 20 and the second data write head 20 are capable of moving integrally in the width direction (Y-axis direction) of the magnetic tape 1, thereby making it possible to write data to one of all the data bands d0 to d3.

The first data write head 20*a* is a head used when the magnetic tape 1 travels in the forward direction (A1 direction in FIG. 3). Meanwhile, the second data write head 20*b* is a head used when the magnetic tape 1 travels in the reverse direction (A2 direction in FIG. 3).

The data write head 20 has a facing surface 21 that faces the magnetic tape 1. The facing surface 21 has a shape that is long in the longitudinal direction (Y'-axis direction) of the data write head 20 and short in the width direction (X'-axis direction) of the data write head 20. Two servo read units 22 and a plurality of data write/read units 23 are provided on the facing surface 21.

One servo read unit 22 is provided on each of both sides of the data write head 20 in the longitudinal direction (Y'-axis direction). The servo read unit 22 is configured to be capable of reproducing a servo signal by reading, by an MR element (MR: Magneto Resistive effect) or the like, the magnetic field generated by the servo pattern 7 recorded on the servo band s of the magnetic tape 1.

As the MR element, for example, an anisotropic magnetoresistive element (AMR: Anisotropic Magneto Resistive effect), a giant magnetoresistive element (GMR: Giant Magneto Resistive effect), a tunnel magnetoresistive element (TMR: Tunnel Magneto Resistive effect), or the like is used.

The data write/read units 23 are arranged at equal intervals along the longitudinal direction (Y'-axis direction) of the data write head 20. Further, the data write/read units 23 are arranged at positions sandwiched between the two servo read units 22. The number of data write/read units 23 is, for example, approximately 20 to 40. However, this number is not particularly limited.

The data write/read unit 23 includes a data write unit 24 and a data read unit 25. The data write unit 24 is configured to be capable of recording data on the data band d of the magnetic tape 1 by the magnetic field generated from the magnetic gap.

Further, the data read unit 25 is configured to be capable of reproducing a data signal by reading, by an MR element or the like, the magnetic field generated from the data recorded on the data band d of the magnetic tape 1. As the MR element, an anisotropic magnetoresistive element (AMR), a giant magnetoresistive element (GMR), a tunnel magnetoresistive element (TMR), or the like is used.

In the first data write head 20*a*, the data write unit 24 is disposed on the left side of the data read unit 25 (on the upstream side in the case where the magnetic tape 1 flows in the forward direction). Meanwhile, in the second data write head 20*b*, the data write unit 24 is disposed on the right side of the data read unit 25 (on the upstream side in the case where the magnetic tape 1 flows in the reverse direction).

The data read unit 25 is capable of reproducing, immediately after the data write unit 24 paired with the data read unit 25 writes data to the magnetic tape 1, this data signal. Note that instead of the above, the data written by the data write unit 24 of one data write head 20 of the first data write head 20*a* and the second data write head 20*b* may be reproduced by the data read unit 25 of the other data write head 20.

While the magnetic tape 1 is reciprocated many times with the travelling direction changed in the forward direction and the reverse direction, data is recorded on the recording track 6 by the first data write head 20*a* and the second data write head 20*b*.

The angle adjustment unit 17 is capable of rotatably holding the first data write head 20*a* and the second data write head 20*b* around the axis (Z'-axis) in the up-and-down direction. Further, the angle adjustment unit 17 is capable of causing the first data write head 20*a* and the second data write head 20*b* to individually rotate around the axis in the up-and-down direction.

The angle adjustment unit 17 adjusts the angles of the first data write head 20*a* and the second data write head 20*b* such that the longitudinal directions of the first data write head 20*a* and the second data write head 20*b* are disposed to be inclined at the azimuth angle θ with respect to the width direction of the magnetic tape 1.

Here, the positions of the servo read unit 22 and the data write/read unit 23 of the first data write head 20*a* in the Y-axis direction (width direction of the magnetic tape 1) and the positions of the servo read unit 22 and the data write/read unit 23 of the second data write head 20*b* in the Y-axis direction are the same. These positional relationships do not change even if the first data write head 20 and the second data write head 20 rotate around the Z-axis.

That is, the angle adjustment unit 17 is capable of causing the first data write head 20*a* and the second data write head 20*b* to individually rotate such that the positions of the servo read unit 22 and the data write/read unit 23 of the first data write head 20 in the Y-axis direction (width direction of the magnetic tape 1) and the positions of the servo read unit 22 and the data write/read unit 23 of the second data write head 20*b* in the Y-axis direction are the same.

In this embodiment, a reference angle Refθ to be used as a reference is set for the azimuth angle θ of the data write head 20, and an angle range represented by the reference angle Refθ±x° is set for the azimuth angle θ of the data write head 20.

In the example shown in FIG. 4, an example in which the reference angle Refθ is set in the clockwise direction (as viewed from the lower side: the side of the magnetic tape 1) with respect to the width direction of the magnetic tape 1 is shown. Meanwhile, the reference angle Refθ may be set in the counterclockwise direction (as viewed from the lower side: the side of the magnetic tape 1) with respect to the width direction of the magnetic tape 1.

[Reference Angle Refθ and Angle Range Refθ±x°, Etc.]

Next, the reference angle Refθ for the azimuth angle θ of the data write head 20 and the angle range Refθ±x° of the azimuth angle θ of the data write head 20.

Figure 5:
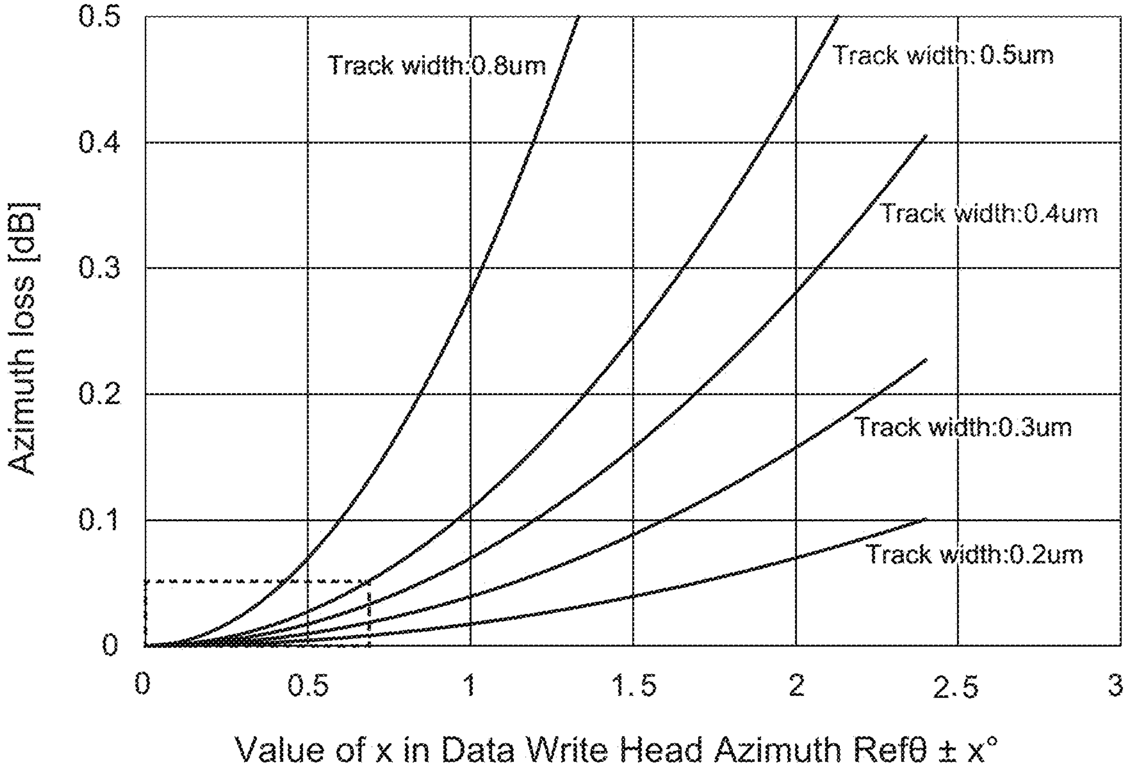
FIG. 5 is a diagram showing a relationship between an angle range Refθ±x° of an azimuth angle of a data write head and an azimuth loss $L_\theta$ (recording wavelength: 0.1 μm).

FIG. 5 is a diagram showing a relationship between the angle range Refθ±x° of the azimuth angle θ of the data write head 20 and an azimuth loss $L_\theta$ (recording wavelength: 0.1 μm). In FIG. 5, the horizontal axis indicates the value of x in the angle range Refθ±x° of the azimuth angle θ of the data write head 20, and the vertical axis indicates the azimuth loss $L_\theta$.

The azimuth loss $L_\theta$ [dB] is represented by the following formula.

$$L_\theta = -20\mathrm{Log}_{10}\left[\sin\{(\pi W/\lambda)\tan\theta\}/(\pi W/\lambda)\tan\theta\right]$$

In the formula, W represents the reproduction track width, λ represents the recording wavelength of data, and θ represents the azimuth angle of the data write head 20.

In FIG. 5, five graphs in which the reproduction track width W was set to 0.8 μm, 0.5 μm, 0.4 μm, 0.3 μm, and 0.2 μm are shown. In FIG. 5, the recording wavelength A was set to 0.1 μm. Here, the graph in which the reproduction track width W was set to 0.8 μm corresponds to LTO-9, and the graphs in which the reproduction track width W was set to 0.5 μm, 0.4 μm, 0.3 μm, and 0.2 μm correspond to LTO-10 and subsequent LTOs (estimated values).

As can be understood from FIG. 5, It can be seen that in the case where the angle range Refθ±x° of the azimuth angle θ of the data write head 20 is the same, the narrower the reproduction track width W is, the smaller the azimuth loss $L_\theta$ is.

This means that the magnetic tape 1 having a larger number of recording tracks 6 and a narrower reproduction track width W (e.g., LTO-10 and subsequent LTOs) is more advantageous from the viewpoint of the azimuth loss $L_\theta$ in the case where the variations in the width of the magnetic tape 1 are dealt with by adjusting the azimuth angle θ of the data write head 20 as in this embodiment.

Here, assumption is made that the allowable value of the azimuth loss $L_\theta$ is 0.05 [dB] or less. Further, assumption is made that the reproduction track width W in the magnetic tape 1 is 0.5 μm or less (LTO-10 and subsequent LTOs (estimated values)).

In this case, as shown by the dotted line in FIG. 5, the angle range of the azimuth angle θ of the data write head 20 is at most Refθ±0.7°. For this reason, in this embodiment, in the angle range of the azimuth angle θ of the data write head 20, the value of x of Refθ±x° is typically 0.7° or less.

Figure 6:
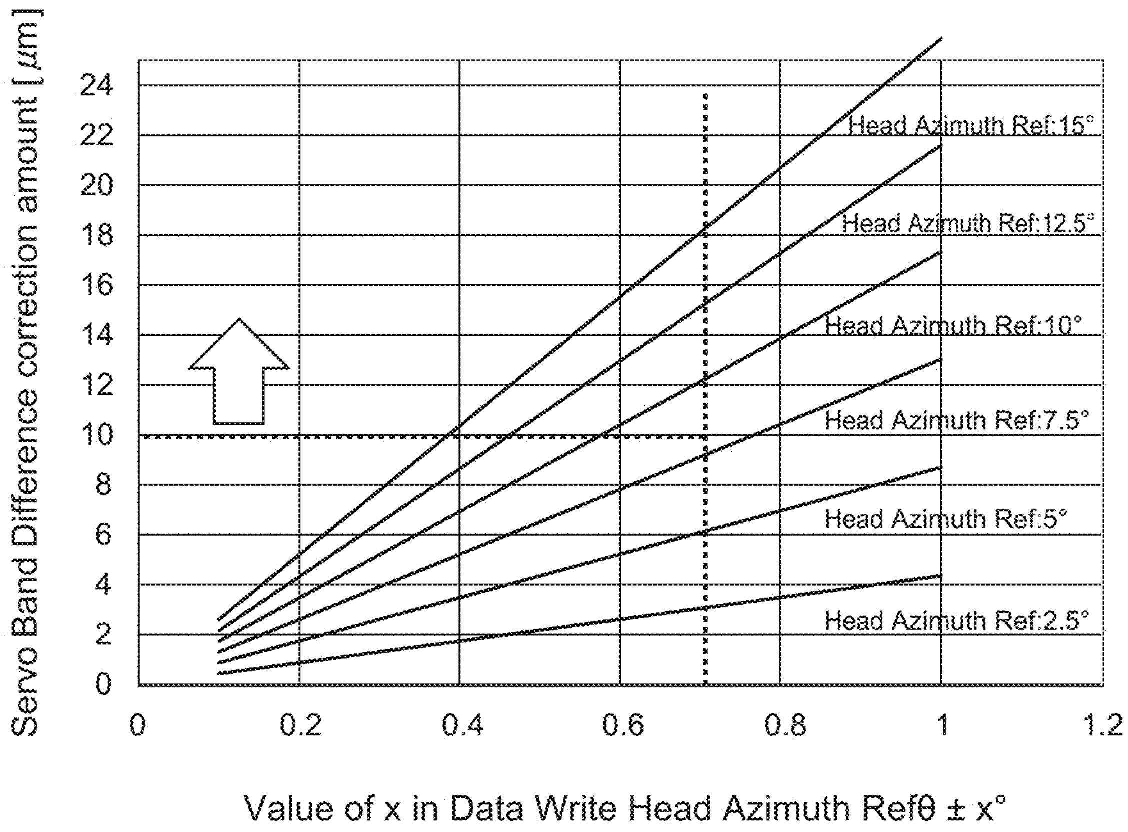
FIG. 6 is a diagram showing a relationship between the angle range Refθ±x° of the azimuth angle θ of the data write head and a correction amount for a servo band pitch difference based on a width fluctuation of a magnetic tape 1.

FIG. 6 is a diagram showing a relationship between the angle range Refθ±x° of the azimuth angle θ of the data write head 20 and the correction amount for a servo band pitch difference based on the width fluctuation of the magnetic tape 1.

In FIG. 6, the horizontal axis indicates the value of x in the angle range Refθ±x° of the azimuth angle θ of the data write head 20, and the vertical axis indicates the correction amount for a servo band pitch difference based on the width fluctuation of the magnetic tape 1.

Figure 7:
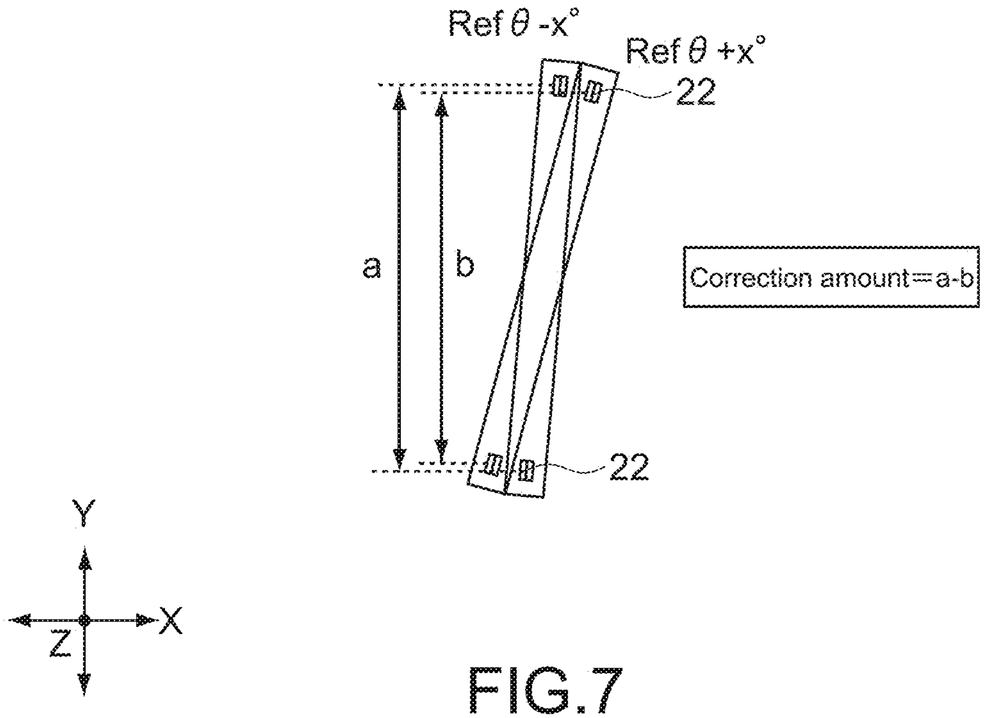
FIG. 7 is a diagram showing the correction amount for a servo band pitch difference based on the width fluctuation of the magnetic tape.

FIG. 7 is a diagram showing a correction amount for a servo band pitch difference based on the width fluctuation of the magnetic tape 1. As shown in FIG. 7, this correction amount is represented by a-b.

Here, the value of a represents the distance between the two servo read units 22 in the width direction (Y-axis direction) of the magnetic tape 1 in the case where the azimuth angle θ of the data write head 20 is set to Refθ−x°. Meanwhile, the value of b represents the distance between the two servo read units 22 in the width direction (Y-axis direction) of the magnetic tape 1 in the case where the azimuth angle θ of the data write head 20 is set to Refθ+x°.

Returning to FIG. 6, six graphs in which the reference angle Refθ for the azimuth angle θ of the data write head 20 was changed to 2.5°, 5°, 7.5°, 10°, 12.5°, and 15° are shown in FIG. 6.

From FIG. 6, it can be seen that when the angle range Refθ±x° is the same, the larger the reference angle Refθ is, the larger correction amount is.

Here, assuming that the azimuth loss $L_\theta$ is 0.05 [dB] or less and the reproduction track width W is 0.5 μm or less as described above, thg angle range of the azimuth angle θ of the data write head 20 is at most Refθ±0.7° (see the vertical broken line in FIG. 6). In addition to this condition, assumption is further made that the correction amount is 10 μm or more (see the horizontal broken line in FIG. 6).

As can be understood from FIG. 6, it can be seen that in order to satisfy these conditions, the reference angle Refθ of the data write head 20 of 7.5° is slightly insufficient and the reference angle Refθ of 10° is sufficient. That is, in order to satisfy the above conditions, the reference angle Refθ is 8° or more.

Note that the description here does not mean that the reference angle Refθ has to be 8° or more in this embodiment. That is, in this embodiment, the reference angle Refθ can be set to 2.5° or more, 5° or more, 7.5° or more, 8° or more, 10° or more, 12.5° or more, 15° or more, and the like as appropriate.

Figure 8:
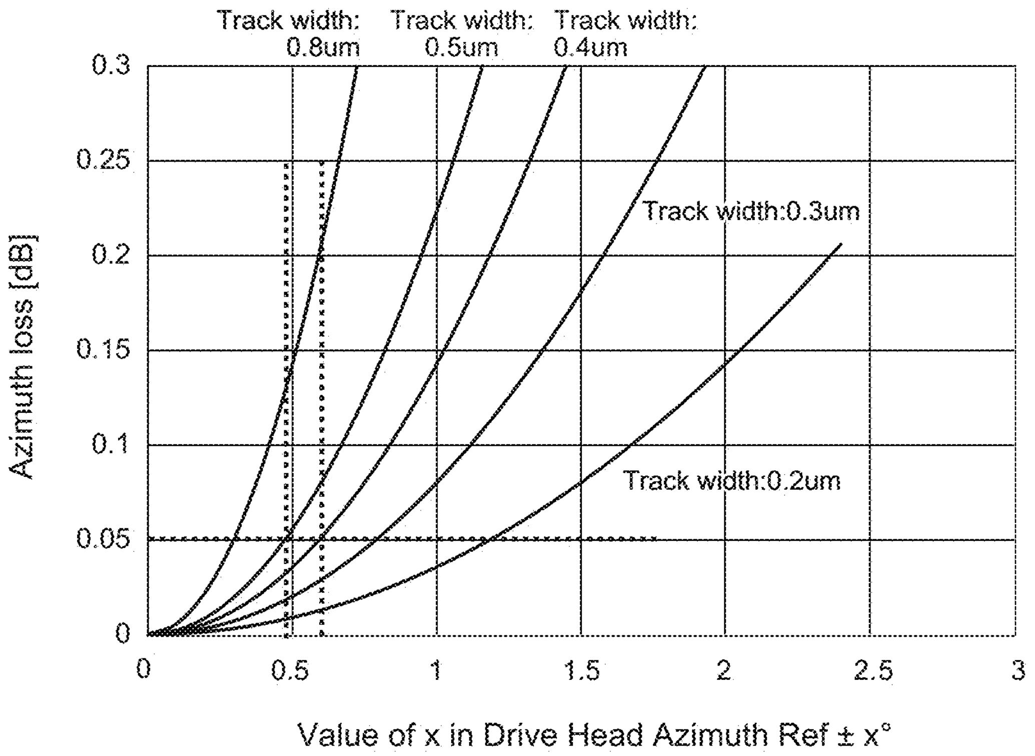
FIG. 8 is a diagram showing the angle range Refθ±x° of the azimuth angle θ of the data write head and the azimuth loss $L_\theta$ (recording wavelength: 0.07 μm).

FIG. 8 is a diagram showing a relationship between the angle range Refθ±x° of the azimuth angle θ of the data write head 20 and the azimuth loss $L_\theta$ (recording wavelength: 0.07 μm). In FIG. 8, the horizontal axis indicates the value of x in the angle range Refθ±x° of the azimuth angle θ of the data write head 20, and the vertical axis indicates the azimuth loss $L_\theta$. In FIG. 8, the recording wavelength A of data was set to 0.07 μm.

The difference between FIG. 5 and FIG. 8 is that the recording wavelength A of data is 0.1 μm in FIG. 5, whereas the recording wavelength A of data is 0.07 μm in FIG. 8. Note that in the LTO-10 and subsequent LTOs, the recording wavelength A of data is estimated to be set to 0.1 μm or less, 0.07 μm or less, or the like.

As can be understood from the composition of FIG. 5 and FIG. 8, it can be seen that the azimuth loss increases as the recording wavelength A of data decreases.

In FIG. 8, attention is paid to the graph in which the reproduction track width W is 0.5 μm. In order to make the azimuth loss 0.05 [dB] or less in the case where the recording wavelength λ of data is 0.07 μm and the reproduction track width W is 0.5 μm, it only needs to set the value of x in the angle range Refθ±x° of the azimuth angle θ of the data write head 20 to 0.480 or less.

In FIG. 6, attention is paid to the graph in which the value of x in the angle range Refθ±x° of the azimuth angle θ of the data write head 20 is 0.48° (see the horizontal axis in FIG. 6). It can be seen that in order to make the correction amount 10 μm or more in the case where the angle range of the azimuth angle θ of the data write head 20 is Refθ±0.48°, it only needs to set the reference angle Refθ to 12.5° or more.

Further, in FIG. 8, attention is paid to the graph in which the reproduction track width W is 0.4 μm. In order to make the azimuth loss 0.05 [dB] or less in the case where the recording wavelength λ of data is 0.07 μm and the reproduction track width W is 0.4 μm, it only needs to set the value of x in the angle range Refθ±x° of the azimuth angle θ of the data write head 20 to 0.6° or less.

In FIG. 6, attention is paid to the position where the value of x in the angle range Refθ±x° of the azimuth angle θ of the data write head 20 is 0.6° (see the horizontal axis in FIG. 6). It can be seen that in order to make the correction amount 10 μm or more in the case where the angle range of the azimuth angle θ of the data write head 20 is Refθ±0.6°, it only needs to set the reference angle Refθ to 10° or more.

Note that as understood from the description here, the angle range Refθ±x° of the azimuth angle θ of the data write head 20 becomes smaller as the recording wavelength λ of data decreases. Further, the angle range Refθ±x° of the azimuth angle θ of the data write head 20 becomes larger as the reproduction track width W becomes smaller (see FIG. 5 and FIG. 8).

Further, the reference angle Refθ for the azimuth angle θ of the data write head 20 becomes larger as the recording wavelength λ of data decreases. Further, the reference angle Refθ for the azimuth angle θ of the data write head 20 becomes smaller as the reproduction track width W becomes smaller (see FIG. 6).

Here, as the generation of the LTO standard progresses from LTO-9 to LTO-10, LTO-11, . . . , it is predicted that the recording wavelength λ of data sequentially decreases and the reproduction track width W also becomes sequentially smaller. In accordance with this, it only needs to set the value of x in the angle range Refθ±x° of the azimuth angle θ of the data write head 20 to an appropriate value (e.g., 0.7° or less, 0.6° or less, 0.5° or less, 0.4° or less, . . . ) and set the reference angle Refθ for the azimuth angle θ of the data write head 20 to an appropriate value (e.g., 2.5° or more, 5° or more, 7.5° or more, 8° or more, 10° or more, 12.5° or more, 15° or more, . . . ).

<Servo Recording/Reproduction Apparatus 101>

Figure 9:
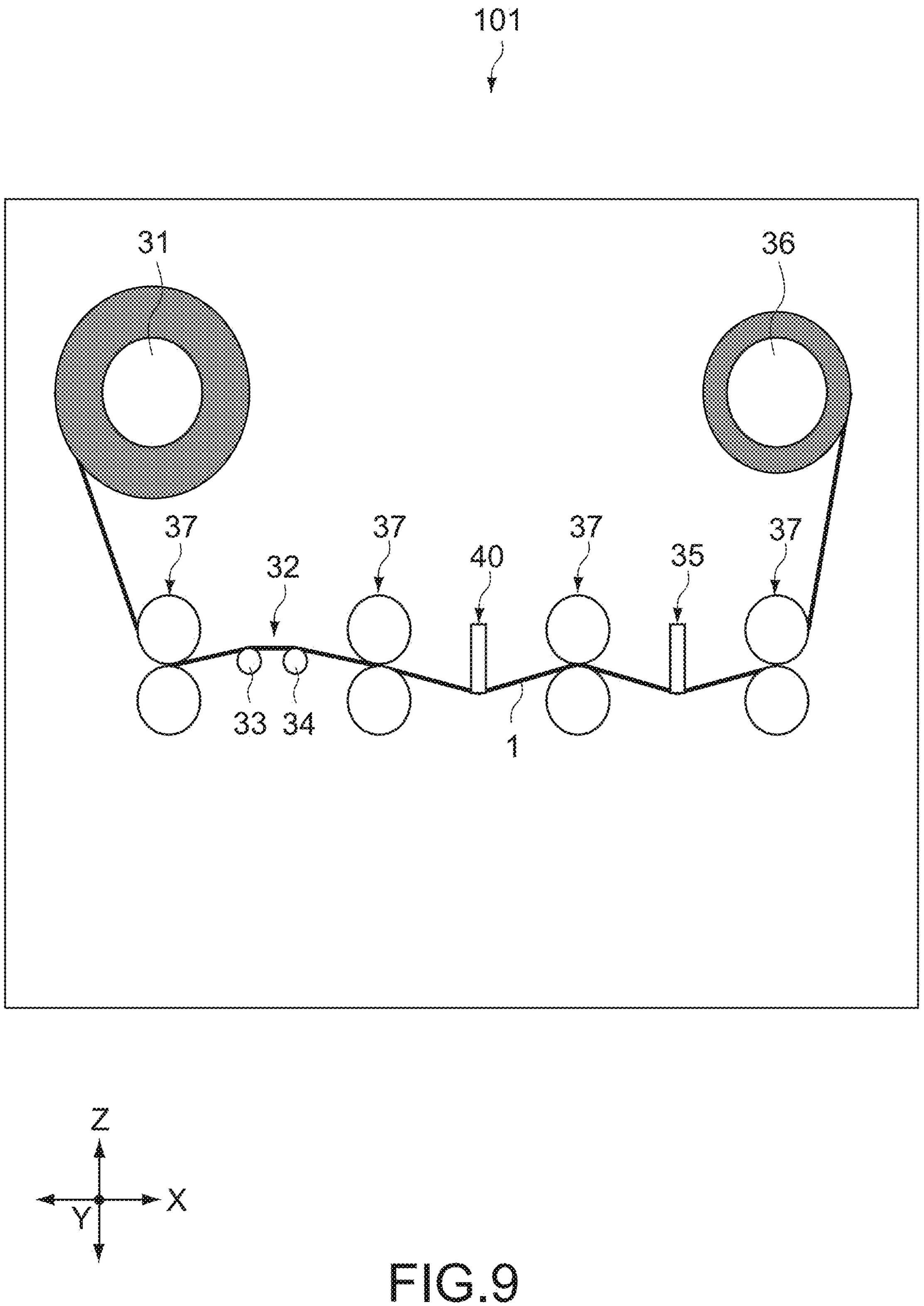
FIG. 9 is a diagram showing a servo recording/reproduction apparatus according to a first embodiment of the present technology.

Next, the servo recording/reproduction apparatus 101 according to an embodiment of the present technology will be described. FIG. 9 is a diagram showing the servo recording/reproduction apparatus 101 according to the first embodiment of the present technology.

As shown in FIG. 9, the servo recording/reproduction apparatus 101 includes a feed roller 31, a demagnetizing unit 32, a servo write head 40, a servo read head 35, a winding roller 36, and four pairs of capstan rollers 37.

The feed roller 31 is capable of rotatably supporting the rolled magnetic tape 1. The feed roller 31 rotates in accordance with driving of a motor or the like, and feeds out the magnetic tape 1 toward the downstream side in accordance with the rotation.

The winding roller 36 is capable of rotatably supporting the rolled magnetic tape 1. The winding roller 36 rotates in accordance with driving of a motor or the like, and winds up the magnetic tape 1 in accordance with the rotation.

The four pairs of capstan rollers 37 are capable of sandwiching the magnetic tape 1 from both sides in the up-and-down direction. The four pairs of capstan rollers 37 rotate in accordance with rotation of a motor or the like, and convey the magnetic tape 1 along the conveying path in accordance with the rotation.

The feed roller 31, the winding roller 36, and the four pairs of capstan rollers 37 are capable of conveying the magnetic tape 1 at a constant speed within the conveying path.

The servo write head 40 is disposed above, for example, the magnetic tape 1 (on the side of the magnetic layer 4). The servo write head 40 applies a magnetic field to the servo band s at a predetermined timing in accordance with a pulse signal of a square wave to record the servo pattern 7 on the servo band s.

The servo write head 40 is capable of recoding the servo pattern 7 on all the servo bands s (s0 to s4) when the magnetic tape 1 passes below the servo write head 40. Note that details of the configuration of the servo write head 40 will be described below with reference to FIG. 10 to FIG. 16.

The demagnetizing unit 32 is disposed below, for example, the magnetic tape 1 (on the side of the base material 2) on the upstream side of the servo write head 40. The demagnetizing unit 32 includes, for example, two permanent magnets 33 and 34. The permanent magnets 33 and 34 apply, before the servo write head 40 records the servo pattern 7, a magnetic field to the entire magnetic layer 4 using a DC magnetic field to demagnetize the entire magnetic layer 4.

The servo read head 35 is disposed above the magnetic tape 1 (on the side of the magnetic layer 4) on the downstream side of the servo write head 40. The servo read head 35 is configured to be capable of reproducing information of the servo pattern 7 by reading the magnetic field generated from the servo pattern 7 recorded on the magnetic tape 1.

The servo read head 35 is capable of reading the servo pattern 7 from all the servo bands s (s0 to s4) when the magnetic tape 1 passes below the servo read head 35. The information of the servo pattern 7 read by the servo read head 35 is used to check whether or not the servo pattern 7 has been accurately recorded.

Examples of the type of servo read head 35 include an inductive type, an MR type (Magneto Resistive), a GMR type (Giant Magneto Resistive), and a TMR type (Tunnel Magneto Resistive).

Although not shown, the servo recording/reproduction apparatus 101 includes a control device that integrally controls the respective units of the servo recording/reproduction apparatus 101.

The control device includes, for example, a control unit, a storage unit, a communication unit, and the like. The control unit includes, for example, a CPU (Central Processing Unit) and integrally controls the respective units of the servo recording/reproduction apparatus 101 in accordance with a program stored in the storage unit.

The storage unit includes a non-volatile memory on which various types of data and various programs are to be recorded and a volatile memory to be used as a work area of the control unit. The various programs may be read from a portable recording medium such as an optical disc and a semiconductor memory, or may be downloaded from a server apparatus in a network. The communication unit is configured to be capable of communicating with, for example, other devices such as a PC and a server apparatus.

[Servo Write Head 40]

Next, the configuration of the servo write head 40 will be described in detail. As described above, the data write head 20 in the data recording/reproduction apparatus 100 is disposed so as to be inclined with respect to the width direction of the magnetic tape 1. Therefore, the first servo pattern 7*a* ("/") and the second servo pattern 7*b* ("¥") are written to be asymmetric with respect to the width direction of the magnetic tape 1 such that the servo patterns 7 can be accurately read by the data write head 20. This asymmetric writing of the servo patterns 7 is executed by the servo write head 40 according to this embodiment.

In this embodiment, there are two forms of servo write head 40: First Example and Second Example. In First Example, the longitudinal direction (Y"-axis direction) of a servo write head 40*a* is disposed parallel to the width direction (Y-axis direction) of the magnetic tape 1 (see FIG. 10 to FIG. 12 described below). Meanwhile, in Second Example, the longitudinal direction (Y"-axis direction) of a servo write head 40*b* is disposed to be inclined at a predetermined angle with respect to the width direction (Y-axis direction) of the magnetic tape 1 (see FIG. 13 to FIG. 16 described below).

First Example

Figure 10:
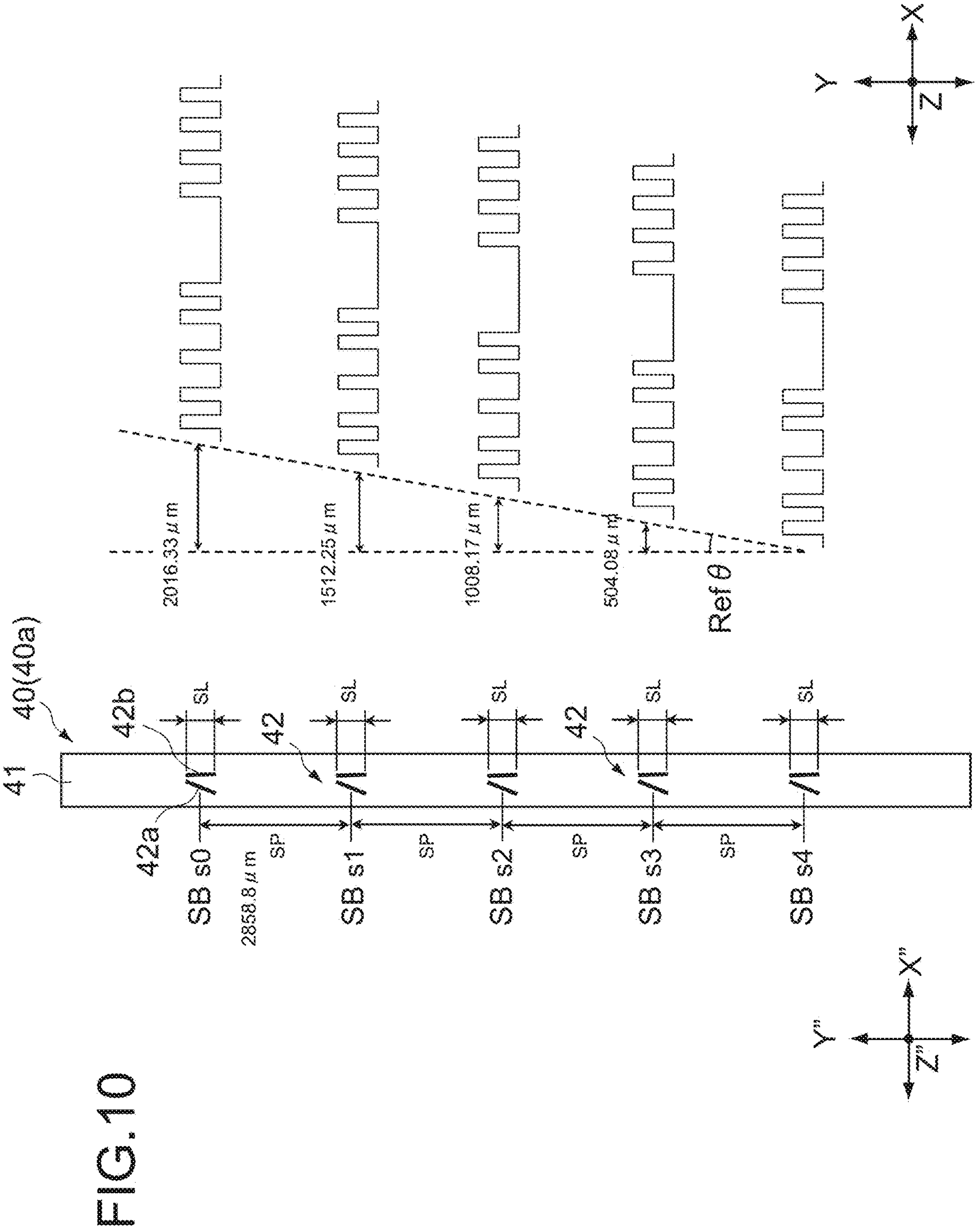
FIG. 10 is a diagram showing a servo write head according to First Example and a pulse signal to be input to the servo write head.
Figure 12:
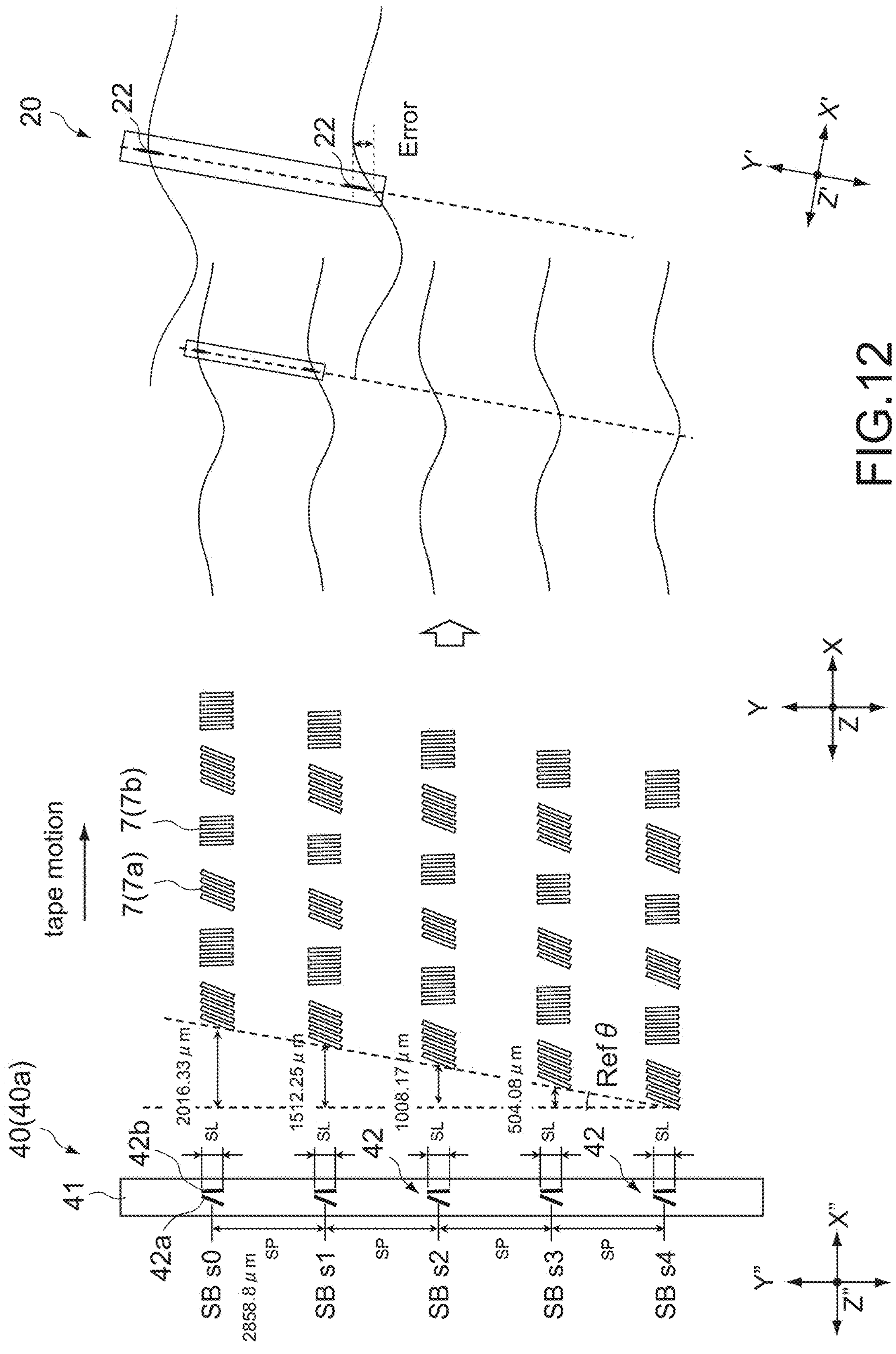
FIG. 12 is a diagram showing how a servo pattern is written to the magnetic tape by the servo write head according to First Example.

First, First Example of the servo write head 40 will be described. FIG. 10 is a diagram showing the servo write head 40*a* and a pulse signal to be input to the servo write head 40*a*. FIG. 11 is an enlarged view of a servo element 42 included in the servo write head 40*a*. FIG. 12 is a diagram showing how the servo pattern 7 is written to the magnetic tape 1 by the servo write head 40*a*. Note that in FIG. 10 to FIG. 12, a surface of the servo write head 40*a* facing the magnetic tape 1 is shown.

As shown in these figures, the servo write head 40*a* has a shape that is long in the longitudinal direction (Y"-axis direction) and short in the width direction (X"-axis direction). Note that in FIG. 10 and FIG. 11, the longitudinal direction of the servo write head 40*a* is the Y"-axis direction, the width direction of the servo write head 40*a* is the X"-axis direction, and the up-and-down direction of the servo write head 40*a* is the Z"-axis direction. Further, the longitudinal direction (conveying direction) of the magnetic tape 1, the width direction of the magnetic tape 1 is the Y-axis direction, and the thickness direction of the magnetic tape 1 is the Z-axis direction. Note that the same applies to FIG. 13 to FIG. 16.

In First Example, the longitudinal direction (Y"-axis direction) of the servo write head 40*a* matches the width direction (Y-axis direction) of the magnetic tape 1, and the width direction (X"-axis direction) of the servo write head 40*a* matches the longitudinal direction (X-axis direction) of the magnetic tape 1.

The servo write head 40*a* has a facing surface 41 that faces the magnetic tape 1. The facing surface 41 has a shape that is long in the longitudinal direction (Y"-axis direction) and short in the width direction (X"-axis direction).

The servo write head 40*a* includes five pairs of servo elements 42 (magnetic gaps) on the facing surface 41. The five pairs of servo elements 42 are arranged at predetermined intervals (servo element pitches: SP) in the longitudinal direction (Y"-axis direction) of the servo write head 40*a*.

In the longitudinal direction of the servo write head 40*a* (Y"-axis direction) (width direction of the magnetic tape 1: Y-axis direction), the interval between the two pairs of servo elements 42 adjacent to each other is set to, for example, 2858.8±4.6 μm. Note that in the magnetic tape 1, this value corresponds to the interval (servo band pitch: SP) of the two servo bands s adjacent to each other in the width direction (Y-axis direction) of the magnetic tape 1.

One pair of servo elements 42 includes the first servo element 42*a* ("/") and the second servo element 42*b* ("¥") configured to be asymmetric with respect to the longitudinal direction of the servo write head 40*a* (Y"-axis direction) (width direction of the magnetic tape 1: Y-axis direction) (see, particularly, see FIG. 11).

The first servo element 42*a* ("/") is inclined at the first angle θs1 with respect to the longitudinal direction of the servo write head 40*a* (Y"-axis direction) (width direction of the magnetic tape 1: Y-axis direction). The second servo element 42*b* ("¥") is inclined opposite to the first angle θs1 at the second angle θs2 with respect to the longitudinal direction of the servo write head 40*a* (Y"-axis direction) (width direction of the magnetic tape 1: Y-axis direction).

The first angle θs1 and the second angle θs2 are related to the reference angle Refθ of the data write head 20 and are represented by the following formulae.

$$\theta s1 = Ref\theta + \theta a$$

$$\theta s2 = Ref\theta - \theta a$$

Here, Refθ represents the reference angle Refθ of the data write head 20 and θa represents the servo azimuth angle.

If the reference angle Refθ of the data write head 20 is 10° and the servo azimuth angle θa is 12°, the first angle θs1 of the first servo element 42*a* ("/") is set to 22° and the second angle θs2 of the second servo element 42*b* ("¥") is set to 2°.

In the width direction of the servo write head 40*a* (X"-axis direction) (longitudinal direction of the magnetic tape 1: X-axis direction), the interval between the first servo element 42*a* ("/") and the second servo element 42*b* ("¥") is set to 38 μm at the position of ½ of a width direction component SL of the servo element length, for example.

Here, in the first servo element 42*a* ("/"), the direction along the first angle θs1 (direction at 22° with respect to the width direction of the magnetic tape 1) is the longitudinal direction of the first servo element 42*a* ("/"). Further, in the second servo element 42*b* ("¥"), the direction along the second angle θs2 (direction at −2° with respect to the width direction of the magnetic tape 1) is the longitudinal direction of the second servo element 42*b* ("¥").

The length in the longitudinal direction of the first servo element 42*a* ("/") is different from the length in the longitudinal direction of the second servo element 42*b* ("¥"). In this example, the length in longitudinal direction of the first servo element 42*a* ("/") is longer than the length in the longitudinal direction of the second servo element 42*b* ("¥").

Meanwhile, a component SL (Y-axis direction) in the width direction of the magnetic tape 1 in the length in the longitudinal direction of the first servo element 42*a* ("/") and a component SL (Y-axis direction) in the width direction of the magnetic tape 1 in the longitudinal direction of the second servo element 42*b* ("¥") are the same. The width direction component SL of the length of the servo element 42 is, for example, 96±3 μm.

FIG. 10 shows pulse signals to be input to the five pairs of servo elements 42. Further, FIG. 12 shows the servo patterns 7 written to the servo bands s of the magnetic tape 1 by inputting the pulse signals to the five pairs of servo elements 42.

Here, as described above, the data write head 20 is disposed to be inclined at the azimuth angle θ with respect to the width direction of the magnetic tape 1. In this case, assumption is made that pulse signals of the same phase are input to the five pairs of servo elements 42 at the same time and the servo patterns 7 of the same phase are written at positions parallel to the width direction of the magnetic tape 1. In this case, the phases of the servo patterns 7 read at the same time by the two servo read units 22 of the data write head 20 disposed to be inclined differ.

In this regard, in First Example, by making the phases of pulse signals to be input to the five pairs of servo elements 42 at the same time be different from each other, the servo patterns 7 of the same phase are written non-parallel to the width direction of the magnetic tape 1.

The phase difference of pulse signals to be input to two pairs of servo elements 42 adjacent to each other in the longitudinal direction of the servo write head 40*a* (Y"-axis direction: width direction of the magnetic tape 1) corresponds to SP×tan (Refθ). Here, SP (servo band pitch=servo element pitch) represents the interval between two servo bands s adjacent to each other in the width direction of the magnetic tape 1 or the interval between two pairs of servo elements 42 adjacent to each other in the width direction of the magnetic tape 1. Further, Refθ represents the reference angle in the data write head 20.

If the value of SP is 2858.8 μm and the reference angle Refθ in the data write head 20 is 10°. In this case, the phase difference of pulse signals to be input to two pairs of servo elements 42 adjacent to each other corresponds to 2858.8 μm×tan 10°=504.08 μm.

Here, the phase differences of input pulses of the servo element 42 of the servo band s3, the servo band s2, the servo band s1, and the servo band s0 with reference to the input pulse of the servo element 42 of the servo band s4 are phases corresponding to 504.08 μm, 1008.17 μm, 1512.25 μm, and 2016.33 μm, respectively.

Regarding the phases of pulse signals to be input at the same time to the five pairs of servo elements 42 corresponding to the five servo bands s, the input pulse of the most advanced phase is input to the servo element 42 of the servo band s0. The order of phases of input pulses is then the servo element 42 of the servo band s1, the servo element 42 of the servo band s2, the servo element 42 of the servo band s3, and the servo element 42 of the servo band s4.

For example, in the case where description is made with the servo element 42 of the servo band s0 and the servo element 42 of the servo band s1, the pulse signal of the phase earlier than the servo element 42 of the servo band s1 by the phase corresponding to 504.08 μm is input to the servo element 42 of the servo band s0 at the same time.

Similarly, the phase difference in the width direction of the magnetic tape 1 (Y-axis direction) of the servo patterns 7 to be written to two servo bands s adjacent to each other in the width direction of the magnetic tape 1 is represented by SP×tan (Refθ).

Assumption is made that the value of SP is 2858.8 μm and the reference angle Refθ in the data write head 20 is 10°. In this case, the phase difference in the width direction of the magnetic tape 1 (Y-axis direction) of the servo patterns 7 to be written to two servo bands s adjacent to each other corresponds to 2858.8 μm×tan 10°=504.08 μm.

The phase differences of the servo patterns 7 of the servo band s3, the servo band s2, the servo band s1, and the servo band s2 with reference to the servo pattern 7 of the servo band s4 are phases corresponding to 504.08 μm, 1008.17 μm, 1512.25 μm, and 2016.33 μm, respectively.

Of the servo patterns 7 written to the five servo bands s, the servo pattern 7 of the servo band s0 has the most advanced phase in the width direction of the magnetic tape 1 (Y-axis direction). The order of the phases is then the servo pattern 7 of the servo band s1, the servo pattern 7 of the servo band s2, the servo pattern 7 of the servo band s3, and the servo pattern 7 of the servo band s4.

For example, in the case where description is made with the servo pattern 7 of the servo band s0 and the servo pattern 7 of the servo band s1, the phase of the servo pattern 7 of the servo band s0 in the width direction of the magnetic tape 1 is earlier than the servo pattern 7 of the servo band s1 by the phase corresponding to 504.08 μm.

In the magnetic tape 1, the phases of the servo patterns 7 written to the five servo bands s are the same in the direction at the reference angle Refθ (10°) of the data write head 20 with respect to the width direction of the magnetic tape 1 (Y-axis direction).

Second Example

Next, Second Example of the servo write head 40 will be described. FIG. 13 is an enlarged view of the servo write head 40*b* according to Second Example and the servo element 42 included in the servo write head 40*b*. FIG. 14 is a diagram showing how the servo pattern 7 is written to the magnetic tape 1 by the servo write head 40*b* according to Second Example. In FIG. 13 and FIG. 14, the surface of the servo write head 40*b* facing the magnetic tape 1 is shown. Note that similarly, the surface of the servo write head 40 facing the magnetic tape 1 is shown also in FIG. 15 to FIG. 19 described below.

As shown in these figures, the servo write head 40*b* has a shape that is long in the longitudinal direction (Y"-axis direction) and short in the width direction (X"-axis direction).

In Second Example, the longitudinal direction of the servo write head 40*b* (Y"-axis direction) is disposed to be inclined at a predetermined angle (second head azimuth angle) with respect to the width direction of the magnetic tape 1. The angle at which the longitudinal direction of the servo write head 40*b* (Y"-axis direction) is disposed to be inclined with respect to the width direction of the magnetic tape 1 (Y-axis direction) is related to the reference angle Refθ of the data write head 20 and matches the reference angle Refθ of the data write head 20 (e.g., 10°).

The servo write head 40*b* has the facing surface 41 facing the magnetic tape 1. The facing surface 41 has a shape that is long in the longitudinal direction (Y"-axis direction) and short in the width direction (X"-axis direction).

The servo write head 40*b* includes the five pairs of servo elements 42 (magnetic gaps) on the facing surface 41. The five pairs of servo elements 42 are arranged at predetermined intervals (servo element pitches: SP1) in the width direction of the magnetic tape 1 (Y-axis direction).

The interval (servo element pitch: SP1) between two pairs of servo elements 42 adjacent to each other in the width direction of the magnetic tape 1 (Y-axis direction) is, for example, 2858.8±4.6 μm. Note that this value corresponds to, in the magnetic tape 1, the interval (servo band pitch: SP1) between two servo bands s adjacent to each other in the width direction of the magnetic tape 1 (Y-axis direction).

Further, in two pairs of servo elements 42 adjacent to each other, the difference in position in the longitudinal direction of the magnetic tape (X-axis direction) is represented by SP1×tan (Refθ). Here, SP1 (servo band pitch=servo element pitch) represents the interval between two servo bands s adjacent to each other in the width direction of the magnetic tape 1 or the interval between two pairs of servo elements 42 adjacent to each other in the width direction of the magnetic tape 1. Further, Refθ represents a reference angle in the data write head 20.

Assumption is made that the value of SP1 is 2858.8 μm and the reference angle Refθ in the data write head 20 is 10°. In this case, in two pairs of servo elements 42 adjacent to each other, the difference in position in the longitudinal direction (X-axis direction) of the magnetic tape is 2858.8 μm×tan 10°=504.08 μm.

Figure 13:
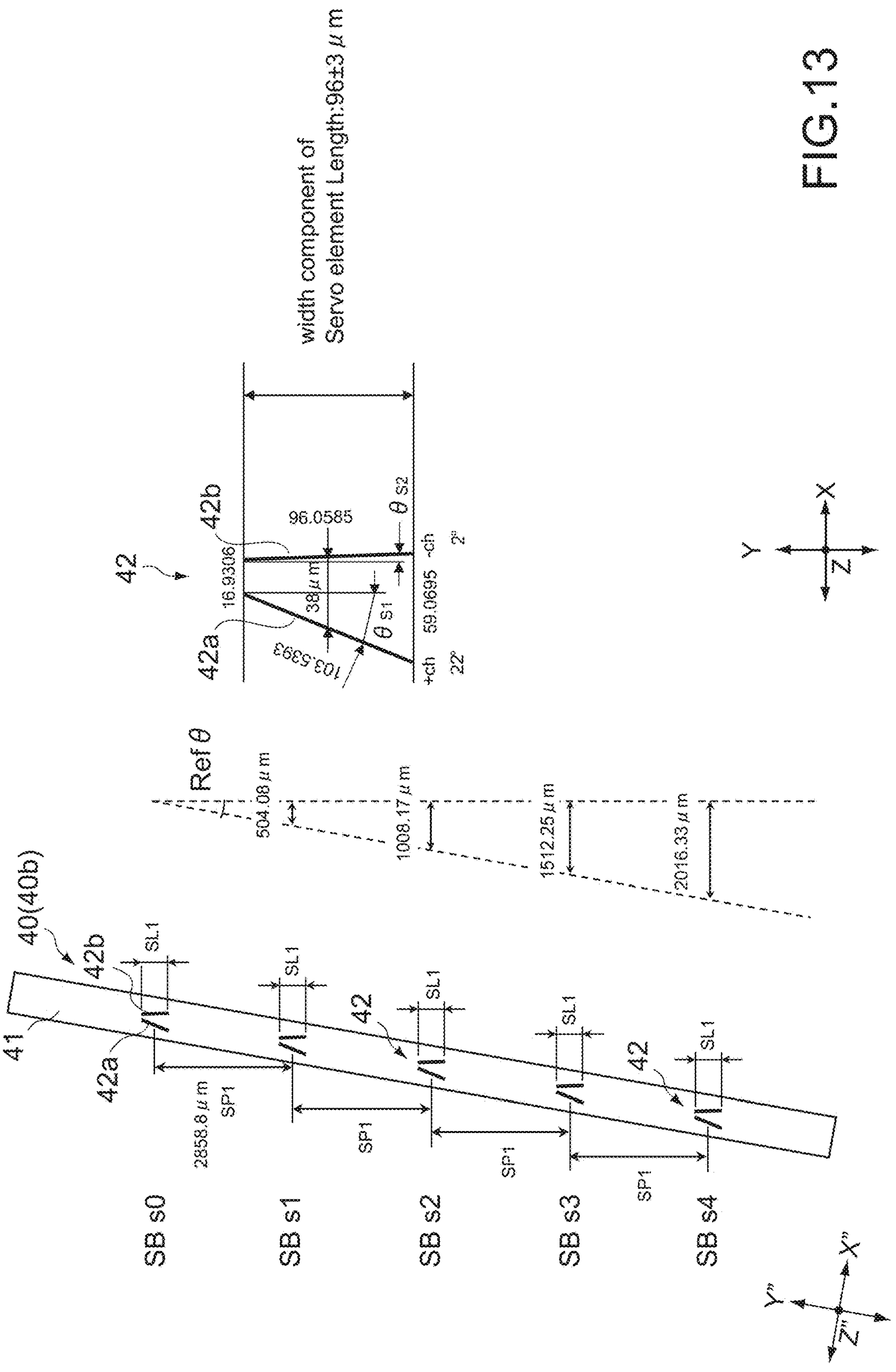
FIG. 13 is an enlarged view of a servo write head according to Second Example and a servo element included in the servo write head.
Figure 14:
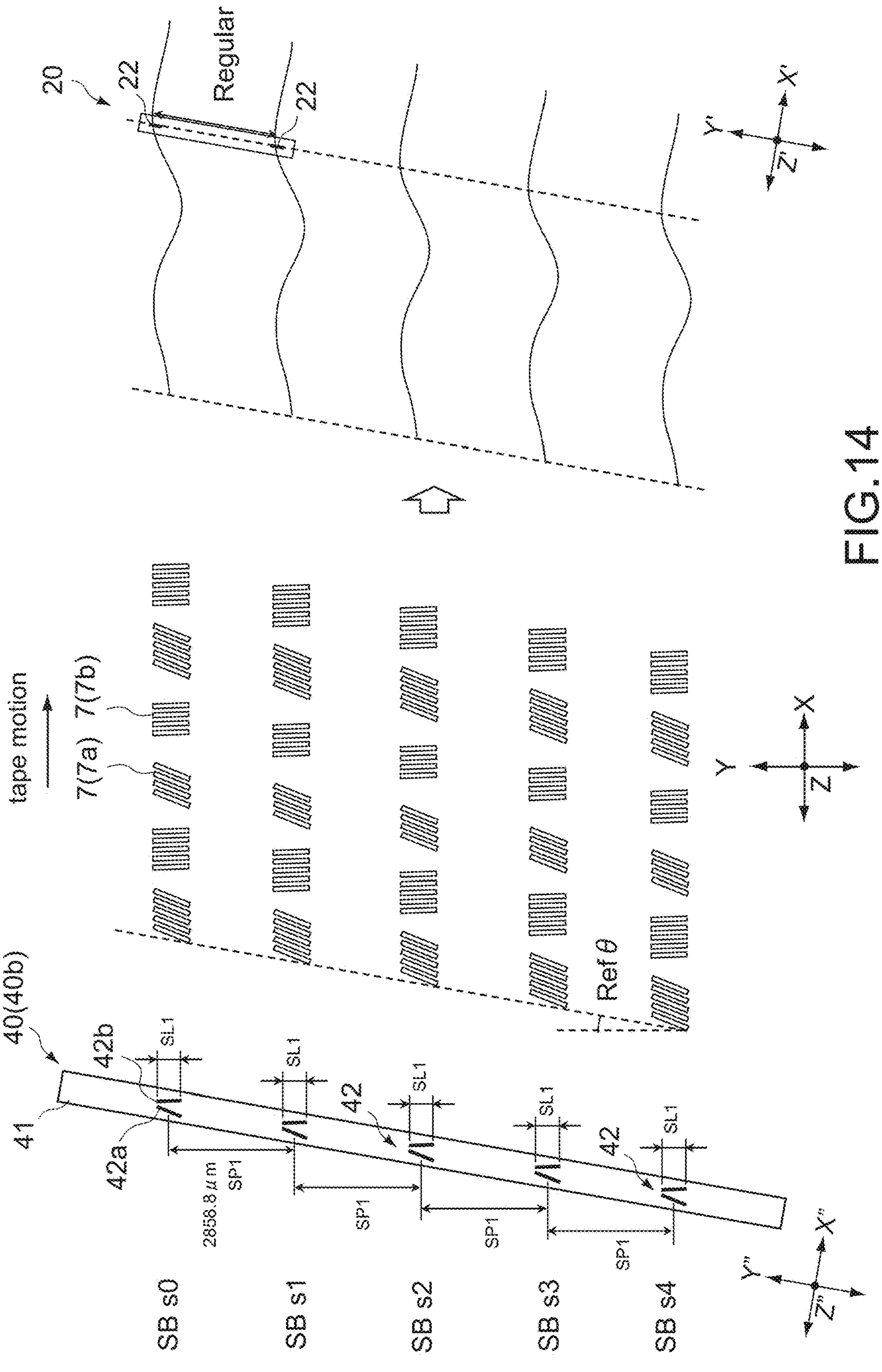
FIG. 14 is a diagram showing how a servo pattern is written to the magnetic tape by the servo write head according to Second Example.

One pair of servo elements 42 includes the first servo element 42*a* ("/") and the second servo element 42*b* ("¥") configured to be asymmetric with respect to the width direction of the magnetic tape 1 (Y-axis direction) (see, particularly, the right side of FIG. 13).

The first servo element 42*a* ("/") is inclined at the first angle θs1 with respect to the width direction of the magnetic tape 1 (Y-axis direction). The second servo element 42*b* ("¥") is inclined opposite to the first angle θs1 at the second angle θs2 with respect to the width direction of the magnetic tape 1 (Y-axis direction).

The first angle θs1 and the second angle θs2 are related to the reference angle Refθ of the data write head 20 and are represented by the following formulae.

$$\theta s1 = Ref\theta + \theta a$$

$$\theta s2 = Ref\theta - \theta a$$

Here, Refθ represents the reference angle Refθ of the data write head 20 and θa represents a servo azimuth angle.

If the reference angle Refθ of the data write head 20 is 10° and the servo azimuth angle θa is 12°, the first angle θs1 of the first servo element 42*a* ("/") is 22° and the second angle θs2 of the second servo element 42*b* ("¥") is 2°.

In the longitudinal direction of the magnetic tape 1 (X-axis direction), the interval between the first servo element 42*a* ("/") and the second servo element 42*b* ("¥") is, for example, 38 μm at the position of ½ of the width direction component SL of the length of the servo element 42.

Here, in the first servo element 42*a* ("/"), the direction along the first angle θs1 (direction at 220 with respect to the width direction of the magnetic tape 1) is the longitudinal direction of the first servo element 42*a* ("/"). Further, in the second servo element 42*b* ("¥"), the direction along the second angle θs2 (direction at −2° with respect to the width direction of the magnetic tape 1) is the longitudinal direction of the second servo element 42*b* ("¥").

The length in the longitudinal direction of the first servo element 42*a* ("/") is different from the length in the longitudinal direction of the second servo element 42*b* ("¥"). In this example, the length in longitudinal direction of the first servo element 42*a* ("/") is longer than the length in the longitudinal direction of the second servo element 42*b* ("¥").

Meanwhile, a width direction (Y-axis direction) component SL1 of the magnetic tape 1 in the length in the longitudinal direction of the first servo element 42*a* ("/") and a width direction (Y-axis direction) component SL1 of the magnetic tape 1 in the length in the longitudinal direction of the second servo element 42*b* ("¥") are the same. The width direction component SL1 of the length of the servo element 42 is, for example, 96±3 μm.

Figure 18:
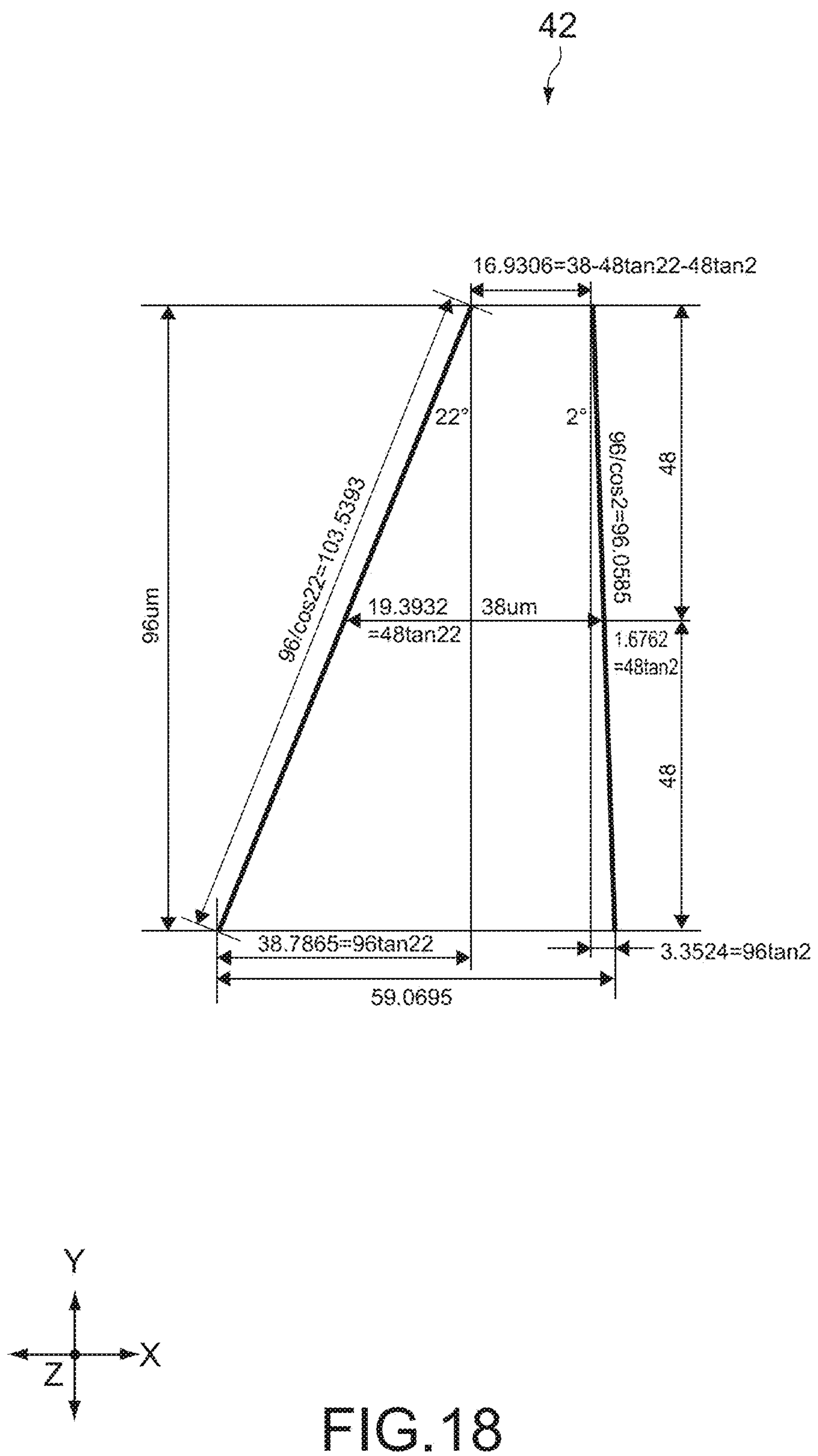
FIG. 18 is an enlarged view of the right side view of FIG. 13 and shows an example of specific dimensions of a first servo element and a second servo element (with reference to the XYZ coordinate system).

FIG. 18 is an enlarged view of the right side view of FIG. 13 and is a diagram showing an example of specific dimensions in the first servo element 42*a* ("/") and the second servo element 42*b* ("¥") (with reference to the XYZ coordinate system).

As shown in FIG. 18, the length in the longitudinal direction of the first servo element 42*a* ("/") is 103.5393 μm (=96 μm/cos 22°). Further, the length in the longitudinal direction of the second servo element 42*b* ("¥") is 96.0585 μm (=96 μm/cos 2°).

Further, the interval (X-axis direction) between the upper end portion of the first servo element 42*a* and the upper end portion of the second servo element 42*b* is 16.9306 μm (=38 μm−48 μm×tan 22°×48 μm×tan 2°=38 μm−19.3932 μm−1.6762 μm).

Further, the interval (X-axis direction) between the lower end portion of the first servo element 42*a* and the lower end portion of the second servo element 42*b* is 59.0695 μm (=96 μm×tan 22°+16.9306 μm+96 μm×tan 2°=38.7865 μm+16.9306 μm+3.3524 μm).

Here, in the above-mentioned first embodiment, a phase difference has been set in the pulse signals to be input to the five pairs of servo elements 42. Meanwhile, in Second Example, since the servo write head 40*b* is disposed to be inclined, there is no need to set a phase difference for pulse signals. That is, pulse signals corresponding to the same phase are input to the five pairs of servo elements 42 at the same time.

FIG. 14 shows the servo patterns 7 written to the five servo bands s by the five pairs of servo elements 42.

The phase difference in the width direction of the magnetic tape 1 of the servo patterns 7 to be written to two servo bands s adjacent to each other in the width direction of the magnetic tape 1 (Y-axis direction) is represented by SP1×tan (Refθ).

Assumption is made that the value of SP1 is 2858.8 μm and the reference angle Refθ in the data write head 20 is 10°. In this case, the phase difference of the servo patterns 7 to be written to two servo bands s adjacent to each other is 2858.8 μm×tan 10°=504.08 μm.

Note that the phase differences of the servo patterns 7 of the servo band s3, the servo band s2, the servo band s1, and the servo band s1 with reference to the servo pattern 7 of the servo band s4 are phases corresponding to 504.08 μm, 1008.17 μm, 1512.25 μm, and 2016.33 μm, respectively.

Of the servo patterns 7 written to the five servo bands s, the servo pattern 7 of the servo band s0 has the most advanced phase in the width direction of the magnetic tape 1 (Y-axis direction). The order of the phases is then the servo pattern 7 of the servo band s1, the servo pattern 7 of the servo band s2, the servo pattern 7 of the servo band s3, and the servo pattern 7 of the servo band s4.

For example, in the case where description is made with the servo pattern 7 of the servo band s0 and the servo pattern 7 of the servo band s1, the phase of the servo pattern 7 of the servo band s0 in the width direction of the magnetic tape 1 is earlier than the servo pattern 7 of the servo band s1 by the phase corresponding to 504.08 μm.

In the magnetic tape 1, the phases of the servo patterns 7 written to the five servo bands s are the same in the direction at the reference angle Refθ (10°) of the data write head 20 with respect to the width direction of the magnetic tape 1 (Y-axis direction).

In the above description, the configuration of the servo write head 40*b* with reference to the coordinate system (XYZ coordinate system) of the magnetic tape 1 has been described. The configuration of the servo write head 40*b* with reference to the coordinate system (X"Y"Z" coordinate system) of the servo write head 40*b* will be described below.

Figure 15:
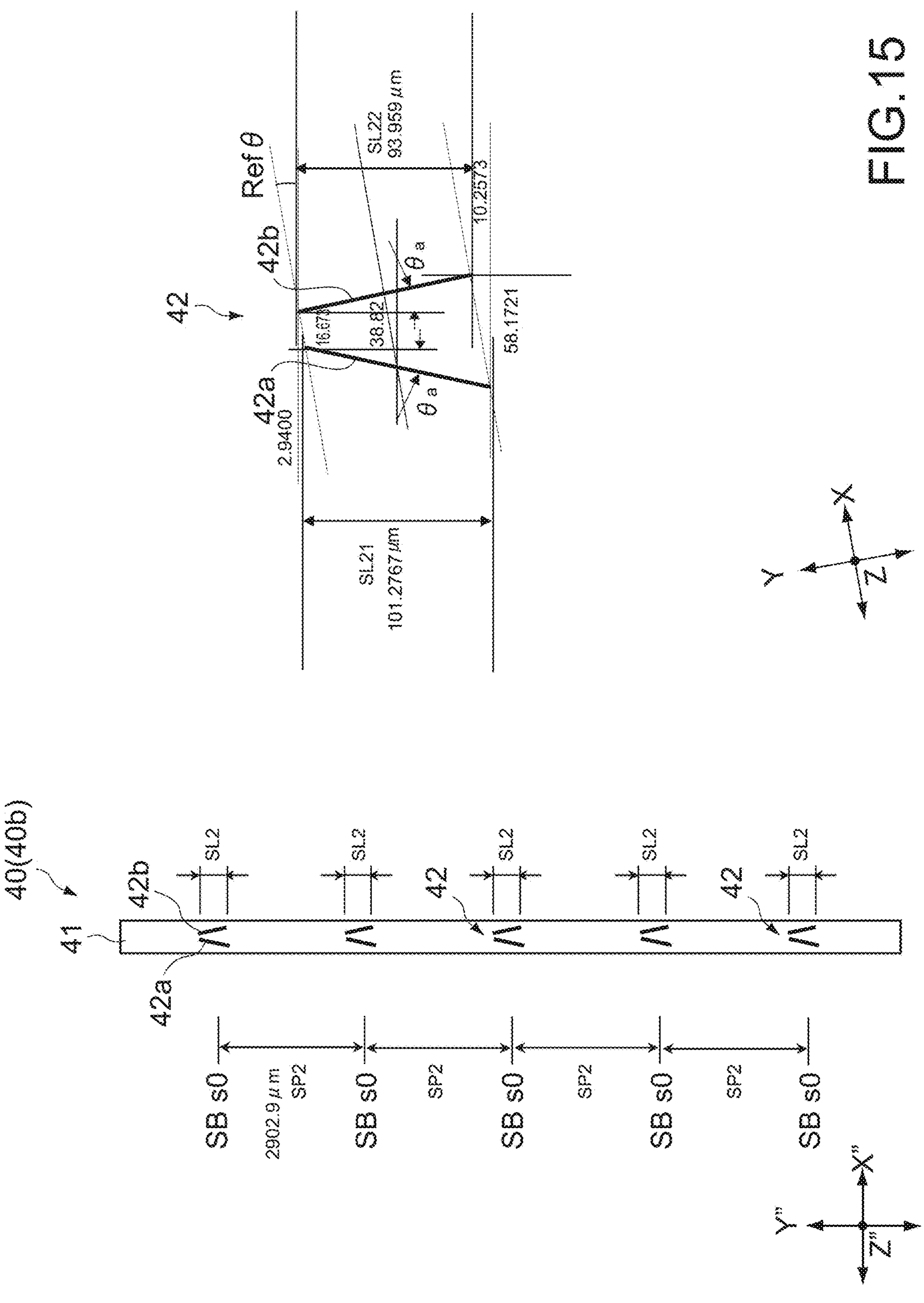
FIG. 15 is a diagram showing the servo write head with reference to the coordinate system of the servo write head in Second Example.

FIG. 15 is a diagram showing the servo write head 40*b* with reference to the coordinate system of the servo write head 40*b* in Second Example.

As shown in FIG. 15, the five pairs of servo elements 42 are arranged at predetermined intervals (servo element pitches: SP2) in the longitudinal direction of the servo write head 40*b* (Y"-axis direction). In the longitudinal direction of the servo write head 40*b* (Y"-axis direction), the interval between two pairs of servo elements 42 adjacent to each other (servo element pitch: SP2) is represented by SP1×cos$^{-1}$(Refθ).

For example, assumption is made that in the width direction of the magnetic tape 1 (Y-axis direction), the interval between two pairs of servo elements 42 adjacent to each other (servo element pitch: SP1) is 2858.8 μm and the reference angle Refθ of the data write head 20 is 10°. In this case, in the longitudinal direction of the servo write head 40*b* (Y"-axis direction), the interval between two pairs of servo elements 42 adjacent to each other (servo element pitch: SP2) is 2902.9 μm.

Here, in the above-mentioned First Example, the symmetry axis of the first servo element 42*a* ("/") and the second servo element 42*b* ("¥") has been non-parallel to the width direction of the magnetic tape 1 (Y-axis direction) as well as to the longitudinal direction of the servo write head 40*b* (Y"-axis direction). Meanwhile, in Second Example, the symmetry axis of the first servo element 42*a* ("/") and the second servo element 42*b* ("¥") is non-parallel to the width direction of the magnetic tape 1 (Y-axis direction) but is parallel to the longitudinal direction of the servo write head 40*b* (Y"-axis direction).

The first servo element 42*a* ("/") is inclined at the servo azimuth angle θa with respect to the longitudinal direction of the servo write head 40*b* (Y"-axis direction). Meanwhile, the second servo element 42*b* ("¥") is inclined opposite to the first servo element 42*a* ("/") at the same servo azimuth angle θa as that of the first servo element 42*a* ("/") with respect to the longitudinal direction of the servo write head 40*b* (Y"-axis direction).

Here, in the first servo element 42*a* ("/"), the direction along the servo azimuth angle θa (direction of +12° with respect to the longitudinal direction of the servo write head 40*b*) is the longitudinal direction of the first servo element 42*a* ("/"). Further, in the second servo element 42*b* ("¥"), the direction along the servo azimuth angle θa (direction of −12° with respect to the longitudinal direction of the servo write head 40*b*) is the longitudinal direction of the second servo element 42*b* ("V").

The length in the longitudinal direction of the first servo element 42*a* ("/") is different from the length in the longitudinal direction of the second servo element 42*b* ("¥"). In this example, the length in longitudinal direction of the first servo element 42*a* ("/") is longer than the length in the longitudinal direction of the second servo element 42*b* ("¥").

Further, a longitudinal direction (Y"-axis direction) component SL21 of the servo write head 40*b* in the length in the longitudinal direction of the first servo element 42*a* ("/") and a longitudinal direction (Y"-axis direction) component SL22 of the servo write head 40*b* in the length in the longitudinal direction of the second servo element 42*b* ("¥") are also different from each other.

Figure 19:
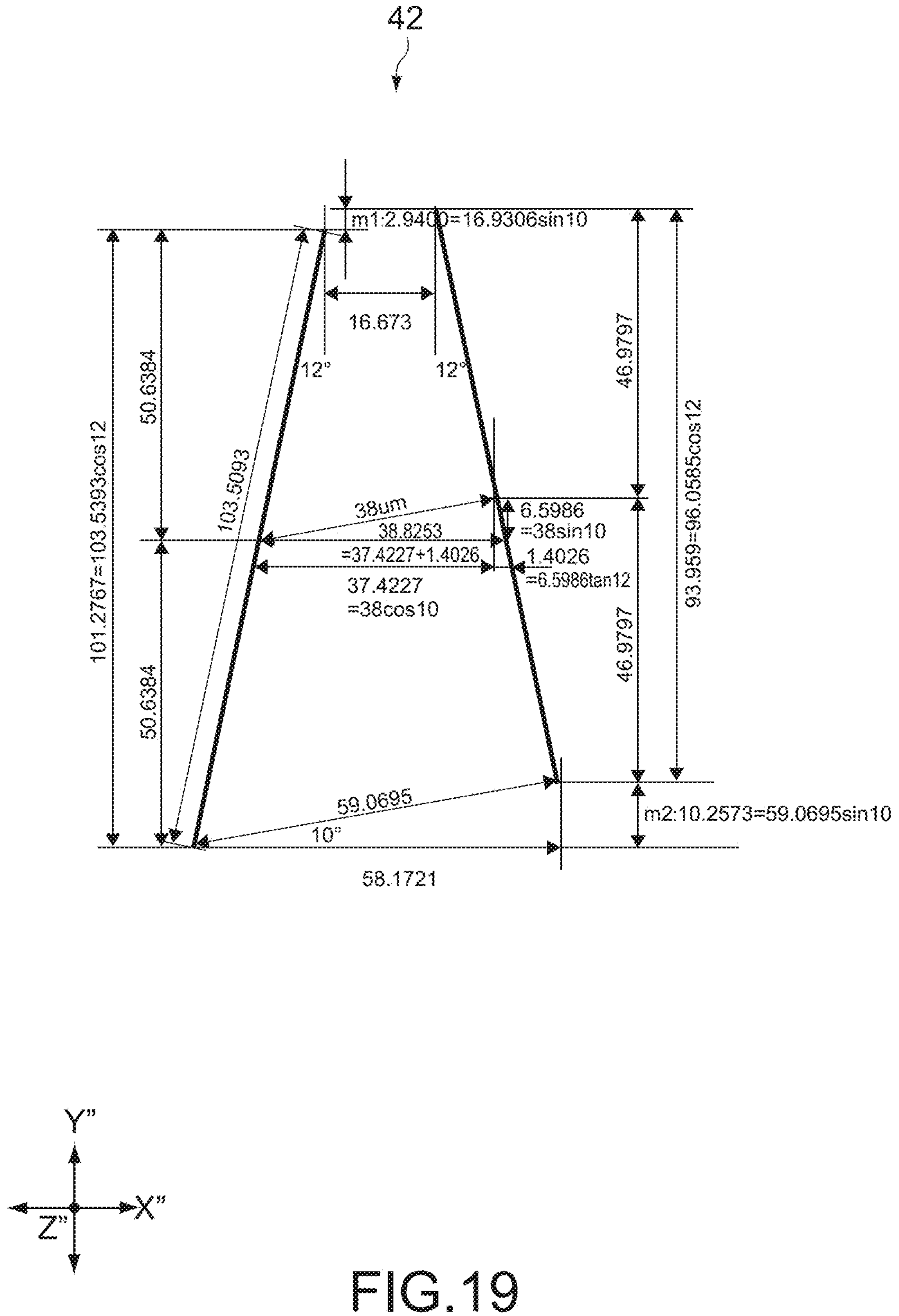
FIG. 19 is an enlarged view of the right side view of FIG. 15 and shows an example of specific dimensions of the first servo element and the second servo element (with reference to the X"Y"Z" coordinate system).

FIG. 19 is an enlarged view of the right side view of FIG. 15 and is a diagram showing an example of specific dimensions in the first servo element 42*a* ("/") and the second servo element 42*b* ("¥") (with reference to the X"Y"Z" coordinate system).

Assumption is made that the width direction (Y-axis direction) component SL1 of the magnetic tape 1 in the length of the servo element 42 is 96 μm, the reference angle Refθ of the data write head 20 is 10°, and the servo azimuth angle θa is 12°. In this case, the longitudinal direction (Y"-axis direction) component SL21 of the servo write head 40*b* in the length of the first servo element 42*a* ("/") is 101.2767 μm (=103.5093 μm×cos 12°). Further, in this case, the longitudinal direction (Y"-axis direction) component SL22 of the servo write head 40*b* in the length of the second servo element 42*b* ("¥") is 93.959 μm (=96.0585 μm×cos 12°) μm.

Further, in the width direction of the servo write head 40*b* (X"-axis direction), the interval between the upper end portion of the first servo element 42*a* and the upper end portion of the second servo element 42*b* is 16.673 μm (=16.9306 μm×cos 10°). Further, in the longitudinal direction of the servo write head 40*b* (Y"-axis direction), the difference between the position of the upper end portion of the first servo element 42*a* ("/") and the position of the upper end portion of the second servo element 42*b* ("¥") is 2.94 μm (=16.9306 μm×sin 10°).

Further, in the width direction of the servo write head 40*b* (X"-axis direction), the interval between the lower end portion of the first servo element 42*a* and the lower end portion of the second servo element 42*b* is 58.1721 μm (=59.0695 μm×cos 10°). Further, in the longitudinal direction of the servo write head 40*b* (Y"-axis direction), the difference between the position of the lower end portion of the first servo element 42*a* ("/") and the position of lower end portion of the second servo element 42*b* ("¥") is 10.2573 μm (=59.0695 μm×sin 10°).

Further, in the width direction of the servo write head 40*b* (X"-axis direction), the interval between (centers) of the first servo element 42*a* ("/") and the second servo element 42*b* ("¥") is, for example, 38.8253 μm (38 μm×cos 10°+(38 μm×sin 10°)×tan 12°=37.4227 μm+6.5986 μm×tan 12°=37.4227 μm+1.4026 μm).

Comparison of First Example and Second Example

Next, comparison of First Example and Second Example will be described.

The right side of FIG. 12 shows how the servo patterns 7 written by the servo write head 40*a* according to First Example are read by the two servo read units 22 of the data write head 20.

As described above, the servo write head 40*a* according to First Example uses a method in which the servo write head 40*a* is disposed not to be inclined with respect to the width direction of the magnetic tape 1 and the servo pattern 7 is written by and adjusting the phase of the pulse signal to be input to the servo element 42.

Here, when writing the servo pattern 7 to the magnetic tape 1 by the servo write head 40*a*, the magnetic tape 1 moves slightly in the width direction (Y-axis direction) in some cases.

Assumption is made that in the servo write head 40*a* according to First Example, the servo element 42 of the servo band s0 writes the servo pattern 7 of a phase ph1 to the servo band s0 at a certain time t1. Assumption is made that the servo element 42 of the servo band s1 writes the servo pattern 7 of the phase ph1 to the servo band s1 at a time t2 (time when the magnetic tape 1 was conveyed by 504.08 μm in the conveying direction) after the time t1.

Assumption is made that in this case, the magnetic tape 1 has moved slightly in the width direction between the time t1 and the time t2. In this case, the interval (direction of the reference angle Refθ (10°)) between the position of the servo pattern 7 of the phase ph1 in the servo band s0 and the position of the servo pattern 7 of the phase ph1 in the servo band s1 is different from a predetermined value (interval between the two servo read units 22: direction of the reference angle Refθ (10°)).

This causes an error and the data write head 20 cannot accurately servo-trace the servo pattern 7 in some cases.

Meanwhile, the right side of FIG. 14 shows how the servo pattern 7 written by the servo write head 40*b* according to Second Example is read by the two servo read units 22 of the data write head 20.

The servo write head 40*b* according to Second Example uses a method in which the servo write head 40*b* is inclined with respect to the width direction of the magnetic tape 1 and the servo pattern 7 is written with pulse signals having the same phase to be input to the servo element 42.

Assumption is made that in the servo write head 40*b* according to Second Example, the servo element 42 of the servo band s0 and the servo element 42 of the servo band s1 respectively write the servo patterns 7 of the same phase ph1 to the servo band s0 and the servo band s1 at the same time t1.

Assumption is made that after that, the servo element 42 of the servo band s0 and the servo element 42 of the servo band s1 respectively write the servo patterns 7 of the same phase ph2 to the servo band s0 and the servo band s1 at the same time t2.

Assumption is made that in this case, the magnetic tape 1 has moved slightly in the width direction between the time t1 and the time t2. In this case, the interval (direction of the reference angle Refθ (10°)) between the position of the servo pattern 7 of the phase ph1 in the servo band s0 and the position of the servo pattern 7 of the phase ph1 in the servo band s1 is the same as the interval between the position of the servo pattern 7 of the phase ph2 in the servo band s0 and the position of the servo pattern 7 of the phase ph2 in the servo band s1. These intervals are the same as the predetermined value (interval between the two servo read units 22: direction of the reference angle Refθ (10°)) and are regular intervals.

That is, in Second Example, the interval (direction of the reference angle Refθ) between the servo patterns 7 of the same phase in the servo bands s adjacent to each other can be made regular regardless of the slight movement in the width direction of the magnetic tape 1 during writing of the servo pattern 7. This allows the data write head 20 to accurately servo-trace the servo pattern 7.

As will be understood from the description here, Second Example is more advantageous than First Example from the viewpoint of slight movement in the width direction of the magnetic tape 1 during writing of the servo pattern 7. However, this does not mean that the method according to First Example cannot be adopted, and First Example is also included as an example of the present technology. For example, in the case where the slight movement in the width direction of the magnetic tape 1 during writing of the servo pattern 7 is at a negligible level or the slight movement in the width direction of the magnetic tape 1 during writing of the servo pattern 7 can be suppressed to a negligible extent, the method according to First Example may be adopted.

[Low Friction Processing of Facing Surface 41]

The facing surface 41 of the servo write head 40 may be subjected to low friction processing for intentionally drawing air between the facing surface 41 and the magnetic tape 1 to reduce frictional resistance.

Figure 16:
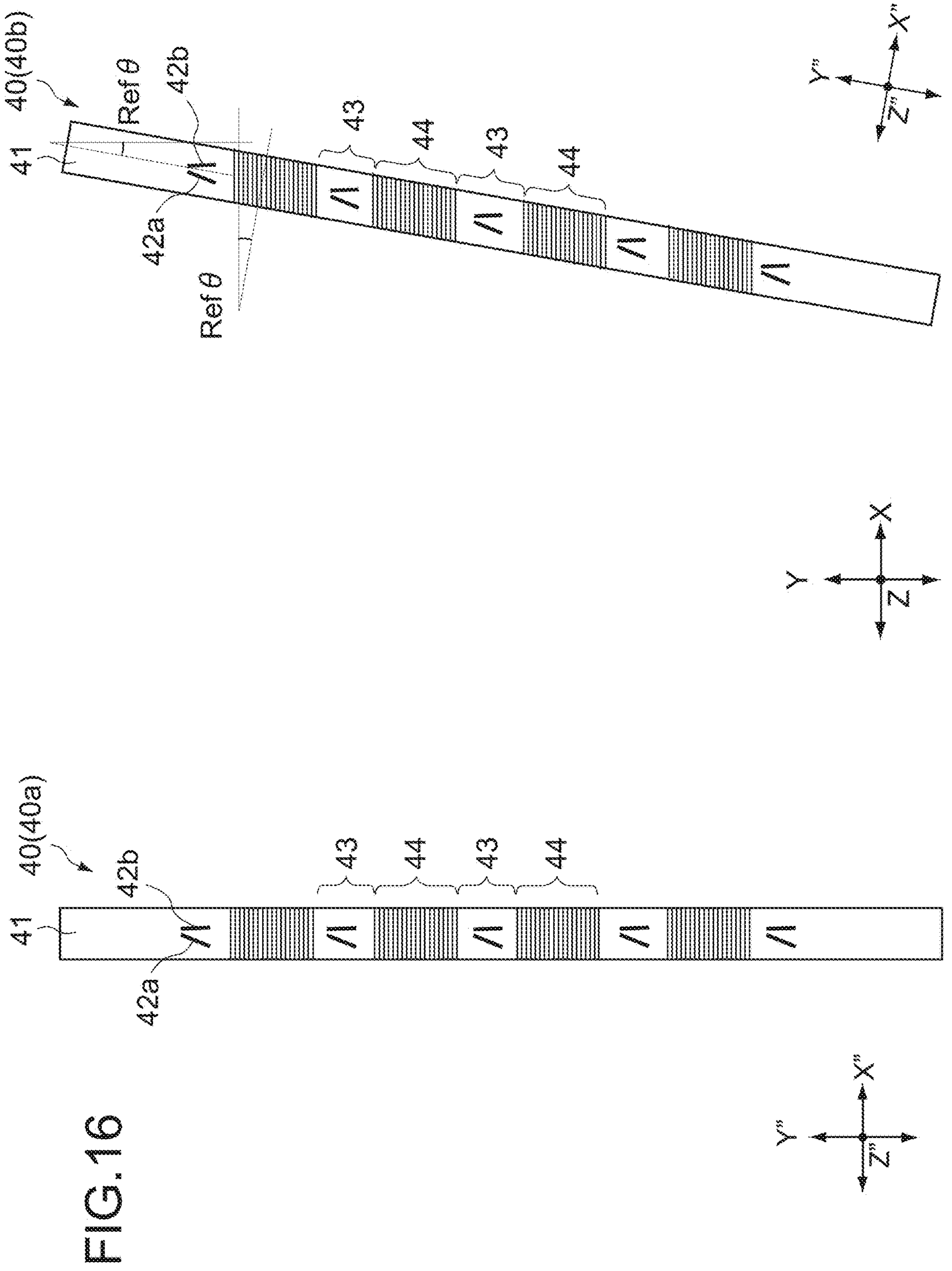
FIG. 16 is a diagram showing the state of the facing surface of the servo write head subjected to low friction processing.

FIG. 16 is a diagram showing the state of the facing surface 41 of the servo write head 40 subjected to low friction processing. The left side of FIG. 16 shows the state of the facing surface 41 of the servo write head 40*a* according to First Example subjected to low friction processing. Further, the right side of FIG. 16 shows the state of the facing surface 41 of the servo write head 40*b* according to Second Example subjected to low friction processing.

With reference to the left side of FIG. 16 (First Example), the facing surface 41 of the servo write head 40*a* has, in the longitudinal direction of the servo write head 40 (Y-axis direction: width direction of the magnetic tape 1), a first region 43 corresponding to the region where the servo element 42 is provided and a second region 44 corresponding to the region where the servo element 42 is not provided.

In the second region 44, a plurality of grooves along the width direction of the servo write head 40*a* (X-axis direction: longitudinal direction of the magnetic tape 1) is aligned along the longitudinal direction of the servo write head 40*a* (Y-axis direction: width direction of the magnetic tape 1).

With reference to the right side of FIG. 16 (Second Example), the facing surface 41 of the servo write head 40*b* has, in the longitudinal direction of the servo write head 40 (direction at the reference angle Refθ with respect to the width direction of the magnetic tape 1), the first region 43 corresponding to the region where the servo element 42 is provided and the second region 44 corresponding to the region where the servo element 42 is not provided.

In the second region 44, a plurality of grooves along the direction at the reference angle Refθ (X-axis direction: longitudinal direction of the magnetic tape 1) with respect to the width direction of the servo write head 40*b* (X"-axis direction) is aligned along the direction at the reference angle Refθ (Y-axis direction: width direction of the magnetic tape 1) with respect to the longitudinal direction of the servo write head 40 (Y"-axis direction).

Here, in the example on the left side of FIG. 16 (First Example), a plurality of grooves along a direction parallel to the width direction of the servo write head 40*a* is aligned along a direction parallel to the longitudinal direction of the servo write head 40*a*. Meanwhile, in the example on the right side of FIG. 16 (Second Example), a plurality of grooves along a direction that is not parallel to the width direction of the servo write head 40*b* is aligned along a direction that is not parallel to the longitudinal direction of the servo write head 40.

In the two examples shown in FIG. 16 (First Example and Second Example), since the facing surface 41 is subjected to low friction processing, it is possible to suppress vibration of the magnetic tape 1 due to friction and thus accurately wright the servo pattern 7.

In particular, in the example on the right side of FIG. 16, a plurality of grooves along the direction at the reference angle Refθ (X-axis direction: longitudinal direction of the magnetic tape 1) with respect to the width direction of the servo write head 40*b* (X"-axis direction) is aligned along the direction at the reference angle Refθ (Y-axis direction: width direction of the magnetic tape 1) with respect to the longitudinal direction of the servo write head 40 (Y"-axis direction). As a result, even if the servo write head 40 is disposed to be inclined at the reference angle Refθ with respect to the width direction of the magnetic tape 1, it is possible to appropriately reduce the friction between the servo write head 40 and the magnetic tape 1.

<Effects, Etc.>

As described above, in this embodiment, it is possible to write, by the servo write head 40, the first servo pattern 7*a* ("/") and the second servo pattern 7*b* ("¥") that are asymmetric with respect to the width direction of the magnetic tape 1 to the respective servo bands s0 to s4. As a result, in the case where the data write head 20 is disposed so as to be inclined with respect to the width direction of the magnetic tape 1, the servo pattern 7 can be accurately read by the data write head 20.

Figure 17:
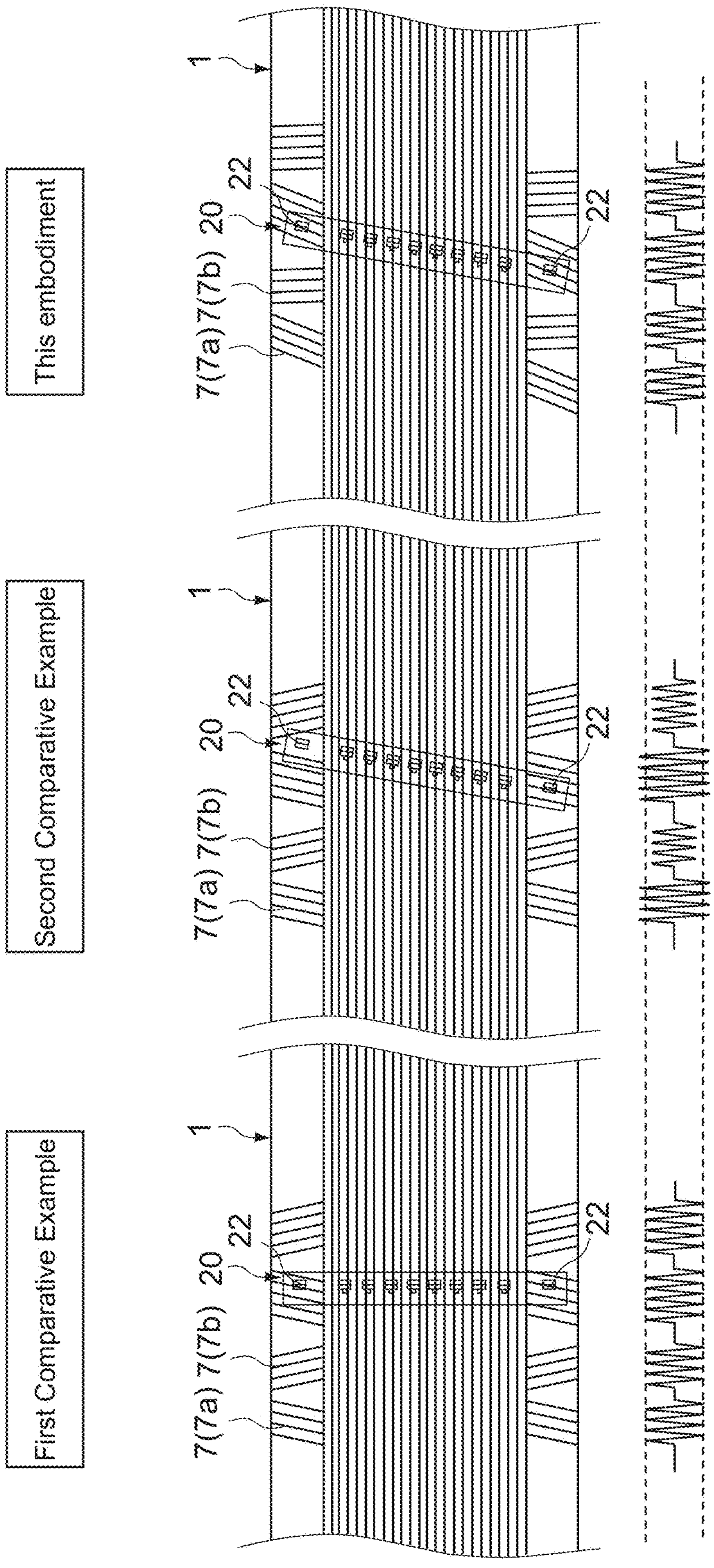
FIG. 17 is a diagram showing how a servo pattern is read by a servo read unit of a data write head in First Comparative Example, Second Comparative Example, and this embodiment.

FIG. 17 is a diagram showing how the servo pattern 7 is read by the servo read unit 22 of the data write head 20 in First Comparative Example, Second Comparative Example, and this embodiment.

With reference to the left side of FIG. 17, in First Comparative Example, in the magnetic tape 1, the first servo pattern 7*a* ("/") and the second servo pattern 7*b* ("¥") are symmetric with respect to the width direction of the magnetic tape 1. Further, the longitudinal direction of the data write head 20 is parallel to the width direction of the magnetic tape 1.

In First Comparative Example, the azimuth loss of the servo pattern 7 with respect to the servo read unit 22 of the data write head 20 is the same for each group of the servo patterns 7. Therefore, when the servo pattern 7 is read by the servo read unit 22 of the servo write head 40, the output of the servo signal is the same for each servo burst corresponding to the group of the servo patterns 7.

With reference to the center of FIG. 17, in Second Comparative Example, in the magnetic tape 1, the first servo pattern 7*a* ("/") and the second servo pattern 7*b* ("¥") are symmetric with respect to the width direction of the magnetic tape 1. Meanwhile, the longitudinal direction of the data write head 20 is disposed to be inclined with respect to the width direction of the magnetic tape 1.

In Second Comparative Example, the azimuth loss of the servo pattern 7 with respect to the servo read unit 22 of the data write head 20 differs for each group of the servo patterns 7. Therefore, when the servo pattern 7 is read by the servo read unit 22 of the servo write head 40, in the servo signal, the output of the servo burst corresponding to the group of the servo patterns 7 with low azimuth loss becomes larger while the output of the servo burst corresponding to the group of the servo patterns 7 with large azimuth loss becomes smaller. Therefore, there is a possibility that an error occurs in the tracking reference position.

With reference to the right side of FIG. 17, in this embodiment, in the magnetic tape 1, the first servo pattern 7*a* ("/") and the second servo pattern 7*b* ("¥") are asymmetric with respect to the width direction of the magnetic tape 1. Further, the longitudinal direction of the data write head 20 is non-parallel to the width direction of the magnetic tape 1.

In this embodiment, the azimuth loss of the servo pattern 7 with respect to the servo read unit 22 of the data write head 20 is the same for each group of the servo patterns 7. Therefore, when the servo pattern 7 is read by the servo read unit 22 of the servo write head 40, the output of the servo signal is the same for each servo burst corresponding to the group of the servo patterns 7.

As described above, in this embodiment, since the first servo pattern 7*a* ("/") and the second servo pattern 7*b* ("¥") are asymmetric with respect to the width direction of the magnetic tape 1, in the case where the data write head 20 is disposed so as to be inclined with respect to the width direction of the magnetic tape 1, the servo pattern 7 can be accurately read by the data write head 20.

Further, in this embodiment, the longitudinal direction of the data write head 20 in the data recording/reproduction apparatus 100 is disposed to be inclined at the azimuth angle θ with respect to the width direction of the magnetic tape 1 and the azimuth angle θ is adjusted. As a result, it is possible to deal with the fluctuation in the width of the magnetic tape 1.

Further, in this embodiment, in the data write head 20 of the data recording/reproduction apparatus 100, the azimuth angle θ of the data write head 20 is adjusted within the range of the reference angle Refθ±x°.

At this time, by setting the value of x to 0.7° or less, it is possible to reduce the azimuth loss $L_\theta$ while dealing with the magnetic tape 1 having a small reproduction track width W (e.g., 0.5 μm or less). Further, at this time, by setting the reference angle Refθ to 8° or more, it is possible to increase the above correction amount (e.g., 10 μm or more).

Further, in this embodiment, in the servo recording/reproduction apparatus 101, the first servo element 42*a* ("/") and the second servo element 42*b* ("¥") are provided in the servo write head 40 so as to be asymmetric with respect to the width direction of the magnetic tape 1. As a result, it is possible to appropriately write the servo patterns 7 asymmetric with respect to the width direction of the magnetic tape 1 by the first servo element 42*a* ("/") and the second servo element 42*b* ("¥").

Further, in this embodiment, the first servo element 42*a* ("/") is inclined at the first angle θs1 with respect to the width direction of the magnetic tape 1, and the second servo element 42*b* ("¥") is inclined opposite to the first angle θs1 at the second angle θs2 different from the first angle θs1 with respect to the width direction of the magnetic tape 1.

Then, in this embodiment, the first angle θs1 and the second angle θs2 are related to the reference angle Refθ of the data write head 20. This allows the first servo element 42*a* ("/") and the second servo element 42*b* ("¥") to appropriately write the asymmetric servo patterns 7 that can be accurately read by the data write head 20.

Further, in this embodiment, the length in the longitudinal direction of the first servo element 42*a* ("/") and the length in the longitudinal direction of the first servo element 42*a* ("/") are different from each other, but the component in the width direction of the magnetic tape 1 in the length of the first servo element 42*a* ("/") and the component in the width direction of the magnetic tape 1 in the length of the second servo element 42*b* ("¥") are the same. As a result, regarding the first servo pattern 7*a* ("/") and the second servo pattern 7*b* ("¥") to be written by the first servo element 42*a* ("/") and the second servo element 42*b* ("¥"), the lengths in the width direction of the magnetic tape 1 can be made the same.

Further, in this embodiment, the longitudinal direction of the servo write head 40 may be disposed so as to be inclined at a predetermined angle with respect to the width direction of the magnetic tape 1 (see Second Example). In this case, it is possible to appropriately deal with slight movement in the width direction of the magnetic tape 1 during writing of the servo pattern 7.

Further, in this embodiment, the angle at which the longitudinal direction of the servo write head 40 is disposed to be inclined with respect to the width direction of the magnetic tape 1 may be related to the reference angle Refθ of the data write head 20, and this angle may match the reference angle Refθ of the data write head 20. As a result, it is possible to appropriately write the asymmetric servo patterns 7 that can be accurately read by the data write head 20 disposed to be inclined.

Further, in the magnetic tape 1 according to this embodiment, the phase difference in the width direction of the magnetic tape 1 of the servo patterns 7 in the servo bands s adjacent to each other is related to the reference angle Refθ of the servo write head 40 and is represented by SP×tan (Refθ). This allows the data write head 20 disposed to be inclined to accurately read the servo pattern 7.

<Method of Checking Whether or not the Magnetic Tape 1 is the Magnetic Tape 1 to be Used in the Data Recording/Reproduction Apparatus 100 of a Data-Write-Head Inclined Type>

Next, a method of checking whether or not the magnetic tape 1 is the magnetic tape 1 to be used in the data recording/reproduction apparatus 100 of a type in which the data write head 20 is disposed to be inclined with respect to the width direction of the magnetic tape 1 (Y-axis direction) will be described.

Checking Method: First Example

Figure 20:
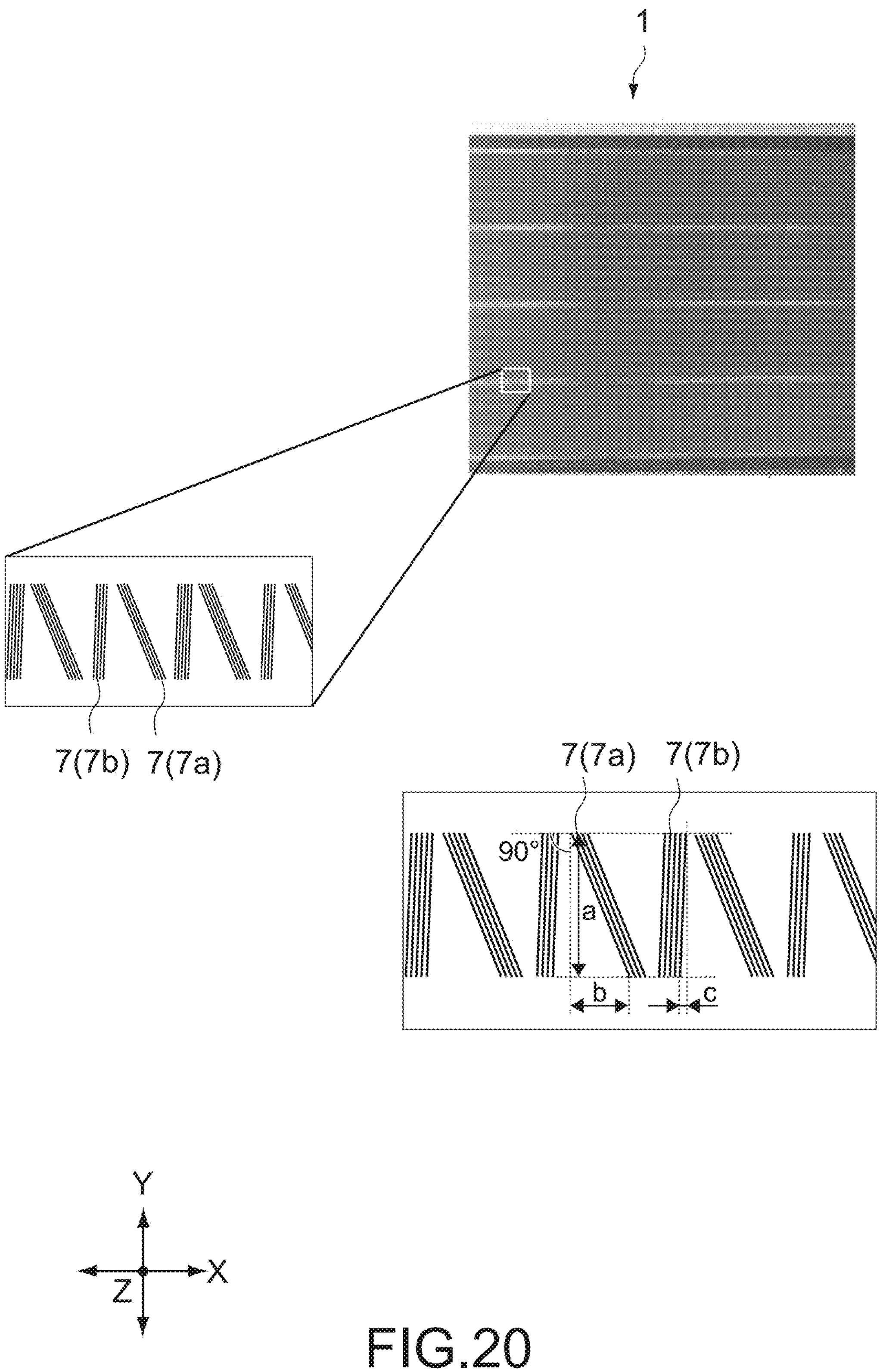
FIG. 20 is a diagram showing a first example of a method of checking whether a magnetic tape is one to be used in a data recording/reproduction apparatus of a data-write-head inclined type.

FIG. 20 is a diagram showing a first example of a method of checking whether or not the magnetic tape 1 is the magnetic tape 1 to be used in the data recording/reproduction apparatus 100 of a data-write-head inclined type. In the first example, the following checking is performed on the basis of the angle at which the first servo pattern 7*a* ("/") is disposed to be inclined with respect to the width direction of the magnetic tape 1 (Y-axis direction) (the first angle θs1) and the angle at which the second servo pattern 7*b* ("¥") is disposed to be inclined with respect to the width direction of the magnetic tape (the second angle θs2).

Note that FIG. 20 shows the magnetic tape 1 as viewed from above (magnetic layer side) (therefore, in the first servo pattern 7*a* ("/") and the second servo pattern 7*b* ("¥"), the reference symbols of "/" and "¥" are opposite to what they appear.

As shown in FIG. 20, first, the magnetic layer 4 of the magnetic tape 1 is developed by applying a developer such as a ferricolloid developer (e.g., SigMarker Q(registered trademark) manufactured by Sigma Hi-Chemical Inc.). After that, the shape of the servo pattern 7 is checked by observing the developed magnetic layer 4 of the magnetic tape 1 with an optical microscope.

At this time, first, the upper end portion and the lower end portion of the first servo pattern 7*a* ("/") and the upper end portion and the lower end portion of the second servo pattern 7*b* ("¥") are measured as measurement points. Then, in the width direction of the magnetic tape 1 (Y-axis direction), a distance a (corresponding to the servo band width) between the upper end portion and the lower end portion of the servo pattern 7 is measured.

Further, in the longitudinal direction of the magnetic tape 1 (X-axis direction), a distance b between the upper end portion and the lower end portion of the first servo pattern 7*a* ("/") is measured. Further, in the longitudinal direction of the magnetic tape 1 (X-axis direction), a distance c between the upper end portion and the lower end portion of the second servo pattern 7*b* ("¥") is measured.

In this case, the angle at which the first servo pattern 7*a* ("/") is disposed to be inclined with respect to the width direction of the magnetic tape 1 (Y-axis direction) (the first angle θs1) is obtained by $\tan^{-1}(b/a)$. The angle at which the second servo pattern 7*b* ("¥") is disposed to be inclined with respect to the width direction of the magnetic tape 1 (Y-axis direction) (the second angle θs2) is obtained by $\tan^{-1}(c/a)$.

For example, assumption is made that the value of a is 96 μm, the value of b is 39 μm, and the value of c is 3 μm. In this case, the angle at which the first servo pattern 7*a* ("/") is disposed to be inclined with respect to the width direction of the magnetic tape 1 (Y-axis direction) (the first angle θs1) is $\tan^{-1}(39/96)=21.59°$, which is approximately 22°. Further, the angle at which the second servo pattern 7*b* ("¥") is disposed to be inclined with respect to the width direction of the magnetic tape 1 (Y-axis direction) (the second angle θs2) is $\tan^{-1}(3/96)=1.79°$, which is approximately 2°.

Next, the predetermined angle is obtained by (the inclination angle of the first servo pattern 7*a* ("/") (the first angle θs1)—the inclination angle of the second servo pattern 7*b* ("¥") (the second angle θs2))/2((22−2)/2=10°). The angle obtained at this time corresponds to the angle at which the symmetry axis of the first servo pattern 7*a* and the second servo pattern 7*b* is disposed to be inclined with respect to the width direction of the magnetic tape 1 (Y-axis direction).

Assumption is made that the angle obtained by (the first angle θs1−the second angle θs2)/2 matches the angle at which the data write head 20 is disposed to be inclined with respect to the width direction of the magnetic tape 1 (Y-axis direction) (reference angle) (θs1−θs2)/2=refθ) (which may include some degree of error).

In this case, as already described with reference to the right side of FIG. 17, the azimuth loss of the servo pattern 7 with respect to the servo read unit 22 of the data write head 20 is the same for each group of servo patterns 7. As a result, when the servo read unit 22 of the servo write head 40 reads the servo pattern 7, the output of the servo signal is the same for each servo burst corresponding to the group of servo patterns 7.

Therefore, in the case where the angle obtained by (θs1−θs2)/2 matches the angle at which the data write head 20 is disposed to be inclined with respect to the width direction of the magnetic tape 1 (Y-axis direction) (reference angle), this magnetic tape 1 can be regarded as the magnetic tape 1 to be used in the data recording/reproduction apparatus 100 of the type in which the data write head 20 is disposed to be inclined with respect to the width direction of the magnetic tape 1 (Y-axis direction).

Checking Method: Second Example

Figure 21:
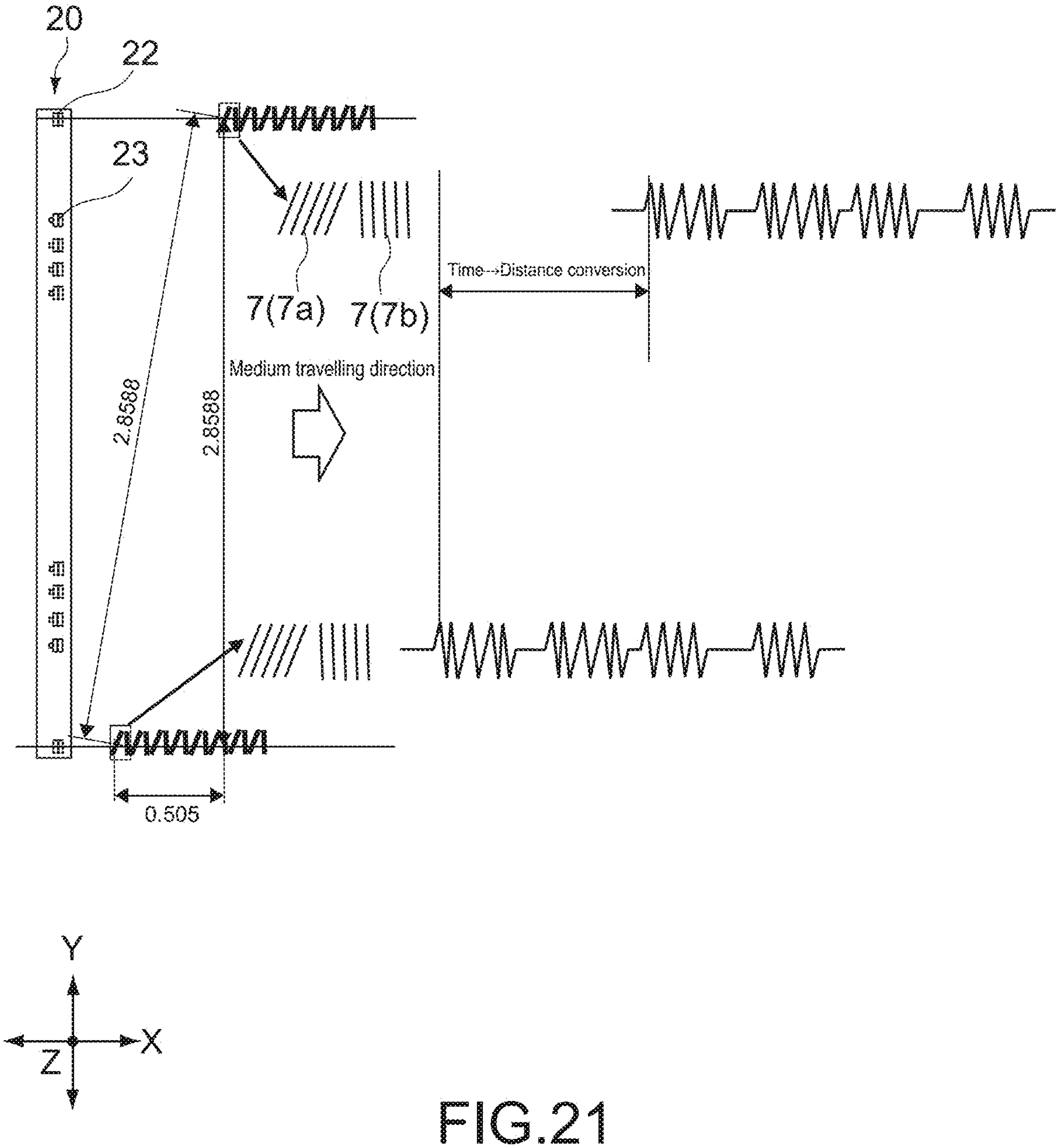
FIG. 21 is a diagram showing a second example of the method of checking whether or not a magnetic tape is one to be used in a data recording/reproduction apparatus of a data-write-head inclined type.

FIG. 21 is a diagram showing a second example of a method of checking whether or not the magnetic tape 1 is the magnetic tape 1 to be used in the data recording/reproduction apparatus 100 of a data-write-head inclined type. In the second example, the above checking is performed on the basis of a phase difference of the servo patterns 7 in servo bands adjacent to each other.

In this second example, a data recording/reproduction apparatus is used, and the data write head 20 is disposed parallel to the width direction of the magnetic tape 1 (Y-axis direction) in this data recording/reproduction apparatus.

First, the two servo read units 22 of the data write head 20 read the servo patterns 7 in the servo bands adjacent to each other, and the servo signals are reproduced.

The phase of the servo signal reproduced by the lower servo read unit 22 is earlier than the phase of the servo signal reproduced by the upper servo read unit 22, resulting in a phase difference. At this time, the difference in time at which the same LPOS (Longitudinal Position) information was read between the servo signal reproduced by the lower servo read unit 22 and the servo signal reproduced by the upper servo read unit 22 is obtained. Then, this time difference is converted into a distance to obtain a phase difference d in the length direction of the magnetic tape (e.g., 0.505 μm).

Next, on the basis of the obtained phase difference d (e.g., 0.505 μm) and the (known) servo band pitch SP (e.g., 2.8588 μm), the predetermined angle is obtained by $\tan^{-1}(d/SP)$ ($\tan^{-1}(0.505/2.8588)=10.017°$).

The angle obtained at this time corresponds to the angle formed by the straight line connecting the positions where information of the same phase was written in the servo pattern 7 of one servo band and the servo pattern 7 of the other servo band with respect to the width direction of the magnetic tape.

Assumption is made that the angle obtained by $\tan^{-1}(d/SP)$ matches the angle at which the data write head 20 is disposed to be inclined with respect to the width direction of the magnetic tape 1 (Y-axis direction) (reference angle) ($\tan^{-1}(d/SP)=\text{ref}\theta$) (which may include some degree of error). In this case, this magnetic tape 1 can be regarded as the magnetic tape 1 to be used in the data recording/reproduction apparatus 100 of the type in which the data write head 20 is disposed to be inclined with respect to the width direction of the magnetic tape 1 (Y-axis direction).

<Details of Magnetic Tape 1>

Subsequently, details of the magnetic tape 1 will be described.

The magnetic tape 1 has a long tape shape and is caused to travel in the longitudinal direction during recording and reproduction of data and the servo pattern 7. Note that the surface of the magnetic layer 4 is a surface on which the data write head 20 and the servo write head 40 are caused to travel. The magnetic tape 1 is favorably used in a recording/reproduction apparatus including a ring-type head as a recording head. The magnetic tape 1 is favorably used in a recording/reproduction apparatus configured to be capable of recording data with a data track width of 1200 nm or less or 1000 nm or less.

(Base Material 2)

As shown in FIG. 2, the base material 2 is a non-magnetic support that supports the underlayer 3 and the magnetic layer 4. The base material 2 has a long film shape. The upper limit value of the average thickness of the base material 2 is favorably 4.4 μm or less, more favorably 4.2 μm or less, still more favorably 4.0 μm or less, and most favorably 3.6 μm or less. When the upper limit value of the average thickness of the base material 2 is 4.4 μm or less, it is possible to make the recording capacity of a single data cartridge 10 larger than that of a general magnetic tape 1. The lower limit value of the average thickness of the base material 2 is favorably 3 μm or more, and more favorably 3.2 μm or more. When the lower limit value of the average thickness of the base material 2 is 3 μm or more, it is possible to suppress a decrease in the strength of the base material 2.

The average thickness of the base material 2 is obtained as follows. First, the magnetic tape 1 having a width of ½ inch is prepared and cut into a length of 250 mm to prepare a sample. Subsequently, the layers of the sample other than the base material 2 (i.e., the underlayer 3, the magnetic layer 4, and the back layer 5) are removed with a solvent such as MEK (methyl ethyl ketone) and dilute hydrochloric acid. Next, a Laser Hologage (LGH-110C) manufactured by Mitutoyo Corporation is used as a measuring apparatus to measure the thickness of the sample (base material 2) at five or more positions, and the measured values are simply averaged (arithmetically averaged) to calculate the average thickness of the base material 2. Note that the measurement positions are randomly selected from the sample.

The base material 2 favorably contains polyester. The Young's modulus of the base material 2 in the longitudinal direction is, for example, 2.5 GPa or more and 10 GPa or less, favorably 2.5 GPa or more and 7.8 GPa or less, and more favorably 3.0 GPa or more and 7.0 GPa or less.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), and polyethylene bisphenoxycarboxylate. In the case where the base material 2 contains two or more types of polyesters, the two or more types of polyesters may be mixed, may be copolymerized, or may be stacked. At least one of the terminal or the side chain of the polyester may be modified.

The fact that the base material 2 contains polyester can be confirmed, for example, as follows. First, the magnetic tape 1 is prepared and cut into a length of 250 mm to prepare a sample and then the layers of the sample other than the base material 2 are removed in a way similar to that in the measurement method of the average thickness of the base material 2. Next, the IR spectrum of the sample (base material 2) is acquired using the infrared absorption spectrometry (IR). On the basis of this IR spectrum, the fact that the base material 2 contains polyester can be confirmed.

The base material 2 may further contain, for example, polyamide, polyetheretherketone, polyimide, polyamideimide, polyetheretherketone (PEEK), polyolefins, a cellulose derivative, a vinyl resin, or another polymer resin in addition to polyester, or the polyamide may be aromatic polyamide (aramid). The polyimide may be aromatic polyimide. The polyamideimide may be aromatic polyamideimide.

The base material 2 may contain at least one of polyamide, polyetheretherketone, polyimide, polyamideimide, or polyetheretherketone (PEEK), or may contain a resin such as polyamide, polyimide, polyamideimide, polyolefins, a cellulose derivative, and a vinyl resin as a main component.

In the case where the base material 2 contains a polymer resin other than polyester, the base material 2 favorably contains polyester as a main component. Here, the main component means the component with the highest content (mass ratio), of the polymer resins contained in the base material 2. In the case where the base material 2 contains a polymer resin other than polyester, the polyester and the polymer resin other than the polyester may be mixed or may be copolymerized.

The base material 2 may be biaxially stretched in the longitudinal direction and the width direction. The polymer resin contained in the base material 2 is favorably oriented in an oblique direction with respect to the width direction of the base material 2.

(Magnetic Layer 4)

The magnetic layer 4 is a recording layer for recording a signal with a magnetization pattern. The magnetic layer 4 may be a recording layer of a perpendicular recording type or may be a recording layer of a longitudinal recording type. The magnetic layer 4 contains, for example, a magnetic powder, a binder, and a lubricant. The magnetic layer 4 may further contain at least one additive of an antistatic agent, an abrasive, a curing agent, a rust inhibitor, a non-magnetic reinforcing particle, or the like as necessary. The magnetic layer 4 does not necessarily need to include a coating film of a magnetic material and may include a sputtering film or a deposition film of a magnetic material.

An arithmetic average roughness Ra of the surface of the magnetic layer 4 is 2.0 nm or less, favorably 1.8 nm or less, and more favorably 1.6 nm or less. When the arithmetic average roughness Ra is 2.0 nm or less, since the output reduction due to spacing loss can be suppressed, excellent electromagnetic conversion characteristics can be achieved. The lower limit value of the arithmetic average roughness Ra of the surface of the magnetic layer 4 is favorably 1.0 nm or more, and more favorably 1.2 nm or more. When the lower limit value of the arithmetic average roughness Ra of the surface of the magnetic layer 4 is 1.0 nm or more, it is possible to suppress deterioration of the travelling property due to an increase in friction.

The arithmetic average roughness Ra can be obtained as follows. First, the surface of the magnetic layer 4 is observed by an AFM (Atomic Force Microscope) to obtain an AFM image of 40 μm×40 μm. Nano Scope IIIa D3100 manufactured by Digital Instruments is used as the AFM, one formed of silicon single crystal is used as a cantilever (Note 1), and measurement is performed by tuning at 200 to 400 Hz as the tapping frequency. Next, the AFM image is divided into 512×512 (=262, 144) measurement points, a height Z(i) (i: measurement point numbers, i=1 to 262, 144) is measured at each measurement point, and the heights Z(i) at the respective measurement points are simply averaged (arithmetically averaged) to obtain an average height (average surface) Zave (=(Z(1)+Z(2)+ . . . +Z(262, 144))/262, 144). Subsequently, a deviation Z"(i) from an average center line at each measurement point (=Z(i)−Zave) is obtained to calculate the arithmetic average roughness Ra [nm] (=(Z"(1)+Z"(2)+ . . . +Z"(262, 144))/262, 144). At this time, one that has been subjected to filtering by second-order Flatten and third-order planefit in XY as image processing is used as data.

(Note 1) SPM Probe NCH of a Normal Type, PointProbe Manufactured by Nano World

L (cantilever length)=125 μm

The upper limit value of an average thickness $t_m$ of the magnetic layer 4 is 80 nm or less, favorably 70 nm or less, and more favorably 50 nm or less. When the upper limit value of the average thickness $t_m$ of the magnetic layer 4 is 80 nm or less, the influence of the demagnetizing field can be reduced in the case where a ring-type head is used as the recording head, and thus, more excellent electromagnetic conversion characteristics can be achieved.

The lower limit value of the average thickness $t_m$ of the magnetic layer 4 is favorably 35 nm or more. When the lower limit value of the average thickness $t_m$ of the magnetic layer 4 is 35 nm or more, the output can be ensured in the case where an MR-type head is used as the reproduction head, and thus, more excellent electromagnetic conversion characteristics can be achieved.

The average thickness $t_m$ of the magnetic layer 4 is obtained as follows. First, the magnetic tape 1 housed in the cartridge 10 is unwound, and the magnetic tape 1 is cut at three positions of 10 m, 30 m, and 50 m from one end thereof on the outermost periphery side to prepare three samples. Subsequently, each sample (the magnetic tape 1 to be measured) is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 4 and on the side of the back layer 5 by a vapor deposition method and the tungsten layer is further formed on the surface on the side of the magnetic layer 4 by a vapor deposition method or a sputtering method. The slicing is performed along the longitudinal direction of the magnetic tape 1 (longitudinal direction). That is, the slicing forms a cross section parallel to both the longitudinal direction and the thickness direction of the magnetic tape 1.

The cross section described above of the obtained sliced sample is observed through a transmission electron microscope (TEM) under the following conditions to obtain a TEM image of each sliced sample. Note that the magnification and the acceleration voltage may be adjusted as appropriate in accordance with the type of apparatus.

Apparatus: TEM (H9000NAR manufactured by Hitachi, Ltd.)

Acceleration voltage: 300 kV

Magnification: 100,000 times

Next, the thickness of the magnetic layer 4 is measured at at least ten or more positions of each sliced sample using the obtained TEM image of each sliced sample. Note that since the slicing is performed along the longitudinal direction of the magnetic tape 1 as described above, the 10 measurement positions of each sliced sample are randomly selected from the test piece such that they are different positions in the longitudinal direction of the magnetic tape 1. The average value obtained simply averaging (arithmetically averaging) the obtained measured values of each sliced sample (thickness of the magnetic layer 4 at a total of 30 points) is used as the average thickness $t_m$ [nm] of the magnetic layer 4.

(Magnetic Powder)

The magnetic powder includes a plurality of magnetic particles. The magnetic particles are, for example, particles including hexagonal ferrite (hereinafter, referred to as "hexagonal ferrite particles".), particles including epsilon-type iron oxide (ε-iron oxide) (hereinafter, referred to as "ε-iron oxide particles".), or particles including Co-containing spinel ferrite (hereinafter, referred to as "cobalt ferrite particles".). The magnetic powder favorably has magnetocrystalline anisotropy and uniaxial anisotropy.

(Hexagonal Ferrite Particles)

Each of the hexagonal ferrite particles has a plate shape such as a hexagonal plate shape or a columnar shape such as a hexagonal columnar shape (where the thickness or height is smaller than the major axis of the plate surface or bottom surface). In the present specification, the hexagonal plate shape includes a substantially hexagonal plate shape. The hexagonal ferrite contains favorably at least one of Ba, Sr, Pb, or Ca, and more favorably at least one of Ba or Sr. The hexagonal ferrite may specifically be barium ferrite or strontium ferrite, for example. The barium ferrite may further contain at least one of Sr, Pb, or Ca in addiction to Ba. The strontium ferrite may further contain at least one of Ba, Pb, or Ca in addition to Sr.

More specifically, the hexagonal ferrite has an average composition represented by a general formula $MFe_{12}O_{19}$. However, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the general formula described above, some Fes may be substituted by another metal element.

In the case where the magnetic powder includes a powder of hexagonal ferrite particles, the average particle size of the magnetic powder is favorably 13 nm or more and 22 nm or less, more favorably 13 nm or more and 19 nm or less, still more favorably 13 nm or more and 18 nm or less, particularly favorably 14 nm or more and 17 nm or less, most favorably 14 nm or more and 16 nm or less. When the average particle size of the magnetic powder is 22 nm or less, more excellent electromagnetic conversion characteristics (e.g., SNR) can be achieved in the magnetic tape 1 having high recording density. Meanwhile, when the average particle size of the magnetic powder is 13 nm or more, the dispersibility of the magnetic powder is further improved and further excellent electromagnetic conversion characteristics (e.g., SNR) can be achieved.

In the case where the magnetic powder includes a powder of hexagonal ferrite particles, the average aspect ratio of the magnetic powder is favorably 1.0 or more and 3.0 or less, more favorably 1.5 or more and 2.8 or less, and still more favorably 1.8 or more and 2.7 or less. When the average aspect ratio of the magnetic powder is within the range of 1.0 or more and 3.0 or less, agglomeration of the magnetic powder can be suppressed. Further, the resistance applied to the magnetic powder when perpendicularly orienting the magnetic powder in the process of forming the magnetic layer 4 can be suppressed. Therefore, it is possible to improve the perpendicular orientation property of the magnetic powder.

In the case where the magnetic powder includes a powder of hexagonal ferrite particles, the average particle size and the average aspect ratio of the magnetic powder are obtained as follows. First, the magnetic tape 1 to be measured is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 4 and on the side of the back layer 5 by a vapor deposition method and the tungsten layer is further formed on the surface on the side of the magnetic layer 4 by a vapor deposition method or a sputtering method. The slicing is performed along the longitudinal direction of the magnetic tape 1 (longitudinal direction). That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained sliced sample such that the entire magnetic layer 4 is included with respect to the thickness direction of the magnetic layer 4 at the acceleration voltage: 200 kV and the total magnification: 500,000 times to take a TEM photograph. The number of TEM photographs to be prepared is the number that 50 particles for which a plate diameter DB and a plate thickness DA (see FIG. 34) shown below can be measured can be extracted.

In the present specification, regarding the size of the hexagonal ferrite particles (hereinafter, referred to as a "particle size".), in the case where the shape of the particle observed in the TEM photograph described above is a plate shape or a columnar shape (where the thickness or height is smaller than the major axis of the plate surface or bottom surface.), the major axis of the plate surface or bottom surface is used as the value of the plate diameter DB. The thickness or height of the particle observed in the TEM photograph described above is used as the value of the plate thickness DA. In the case where the thickness or height of the particle is not constant in one particle, the maximum thickness or height of the particle is used as the plate thickness DA.

Next, 50 particles to be extracted from the taken TEM photograph are selected on the basis of the following criteria. Particles partially protruding outside the field of view of the TEM photograph are not measured, and particles with clear contours and present in isolation are measured. In the case where particles overlap, each of particles is measured as a single particle if the boundary between the particles is clear and the shape of the entire particle can be determined. However, particles whose boundaries are unclear and whose overall shape cannot be determined are not measured because the shape of the particle cannot be determined.

The plate thickness DA of each of the selected 50 particles is measured. The plate thicknesses DA obtained in this way are simply averaged (arithmetically averaged) to obtain an average plate thickness $DA_{ave}$. The average plate thickness $DA_{ave}$ is the average particle plate thickness. Subsequently, the plate diameter DB of each magnetic powder is measured. In order to measure the plate diameter DB of the particle, 50 particles whose plate diameter DB can be clearly observed are selected from the taken TEM photograph. The plate diameter DB of each of the selected 50 particles is measured. The plate diameters DB obtained in this way are simply averaged (arithmetically averaged) to obtain an average plate diameter $DB_{ave}$. The average plate diameter $DB_{ave}$ is the average particle size. Then, an average aspect ratio ($DB_{ave}/DA_{ave}$) of the particles is obtained on the basis of the average plate thickness $DA_{ave}$ and the average plate diameter $DB_{ave}$.

In the case where the magnetic powder includes a powder of hexagonal ferrite particles, the average particle volume of the magnetic powder is favorably 500 $nm^3$ or more and 2500 $nm^3$ or less, more favorably 500 $nm^3$ or more and 1600 $nm^3$ or less, still more favorably 500 $nm^3$ or more and 1500 $nm^3$ or less, particularly favorably 600 $nm^3$ or more and 1200 $nm^3$ or less, and most favorably 600 $nm^3$ or more and 1000 $nm^3$ or less. When the average particle volume of the magnetic powder is 2500 $nm^3$ or less, an effect similar to that in the case where the average particle size of the magnetic powder is 22 nm or less can be achieved. Meanwhile, when the average particle volume of the magnetic powder is 500 $nm^3$ or more, an effect similar to that in the case where the average particle size of the magnetic powder is 13 nm or more can be achieved.

The average particle volume of the magnetic powder is obtained as follows. First, as described above with respect to the method of calculating the average particle size of the magnetic powder, the average major-axis length $DA_{ave}$ and the average plate diameter $DB_{ave}$ are obtained. Next, an average volume V of the magnetic powder is obtained in accordance with the following formula.

$$V = \frac{3\sqrt{3}}{8} \times DA_{ave} \times DB_{ave} \times DB_{ave} \quad \text{(Math. 1)}$$

(ε-Iron Oxide Particles)

The ε-iron oxide particles are hard magnetic particles capable of achieving a high coercive force even as minute particles. The ε-iron oxide particles each have a spherical shape or a cubic shape. In the present specification, the spherical shape includes a substantially spherical shape. Further, the cubic shape includes a substantially cubic shape. Since the ε-iron oxide particles have the shape as described above, it is possible to reduce the contact area of the particles in the thickness direction of the magnetic tape 1 and suppress agglomeration of the particles in the case where the ε-iron oxide particles are used as the magnetic particles, as compared with the case where barium ferrite particles having a hexagonal plate shape are used as the magnetic particles. Therefore, it is possible to enhance the dispersibility of the magnetic powder and achieve further excellent electromagnetic conversion characteristics (e.g., SNR).

Each of the ε-iron oxide particles has a composite particle structure such as a core-shell structure, a Janus structure, and a surface-joined structure.

Part of the composite structure contains ε-iron oxide. The ε-iron oxide is favorably one having $\varepsilon$—$Fe_2O_3$ crystals as the main phase, and more favorably one formed of single-phase $\varepsilon$—$Fe_2O_3$.

In other parts of the composite structure, it is favorable that the ε-iron oxide part and the other parts are exchange-coupled and behave like a single particle as the magnetic properties.

The other parts are favorably the soft magnetic layer 4, and contains a soft magnetic material such as α-Fe, a Ni—Fe alloy, and an Fe—Si—Al alloy. The α-Fe may be obtained by reducing the ε-iron oxide contained in the core portion. Alternatively, even if it is not soft magnetic, it may have higher σs and lower Hc than ε-iron oxide.

The ε-iron oxide particles may include an additive instead of the above structure or may include an additive while having the above structure. In this case, some Fes of the ε-iron oxide particles are substituted by the additive. Also with the ε-iron oxide particles including the additive, a coercive force Hc of the entire ε-iron oxide particles can be adjusted to the coercive force Hc suitable for recording, and thus, it is possible to improve the easiness of recording. The additive is a metal element other than iron, favorably a trivalent metal element, more favorably at least one of Al, Ga, or In, and still more favorably at least one of Al or Ga.

Specifically, the ε-iron oxide including the additive is $\varepsilon$—$Fe_{2-x}M_xO_3$ crystals. The additive includes a metal element other than iron, more favorably at least one of Al (aluminum), Ga (gallium), In (indium), Co (cobalt), Mn (manganese), Zr (zirconium), Hf (hafnium), Cs (cesium) and Ti (titanium), Sm (samarium), Nd (neodymium), Pr (praseodymium), or Tb (terbium).

In the case where the magnetic powder includes the ε-iron oxide particles, the average particle size of the magnetic powder is favorably 10 nm or more and 20 nm or less, more favorably 10 nm or more and 18 nm or less, still more favorably 10 nm or more and 16 nm or less, particularly favorably 10 nm or more and 15 nm or less, and most favorably 10 nm or more and 14 nm or less. In the magnetic tape 1, a region having a size of ½ of the recording wavelength is an actual magnetized region. For this reason, by setting the average particle size of the magnetic powder to half or less of the shortest recording wavelength, it is possible to achieve more excellent electromagnetic conversion characteristics (e.g., SNR). Therefore, when the average particle size of the magnetic powder is 20 nm or less, it is possible to achieve more excellent electromagnetic conversion characteristics (e.g., SNR) in the magnetic tape 1 having high recording density (e.g., the magnetic tape 1 configured to be capable of recording a signal at the shortest recording wavelength of 40 nm or less). Meanwhile, when the average particle size of the magnetic powder is 10 nm or more, the dispersibility of the magnetic powder is further improved and it is possible to achieve more excellent electromagnetic conversion characteristics (e.g., SNR).

In the case where the magnetic powder includes the ε-iron oxide particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within the range of 1.0 or more and 3.0 or less, it is possible to suppress agglomeration of the magnetic powder. Further, the resistance applied to the magnetic powder when perpendicularly orienting the magnetic powder in the process of forming the magnetic layer 4 can be suppressed. Therefore, it is possible to improve the perpendicular orientation property of the magnetic powder.

In the case where the magnetic powder includes a powder of ε-iron oxide particles, the average particle size and the average aspect ratio of the magnetic powder are obtained as follows. First, the magnetic tape 1 to be measured is processed by an FIB (Focused Ion Beam) method or the like to obtain a slice. In the case of using an FIB method, a carbon layer and a tungsten layer are formed as protective layers as pre-processing for observing a TEM image of a cross section described below. The carbon layer is formed on each of the surfaces of the magnetic tape 1 on the side of the magnetic layer 4 and on the side of the back layer 5 by a vapor deposition method and the tungsten layer is further formed on the surface on the side of the magnetic layer 4 by a vapor deposition method or a sputtering method. The slicing is performed along the longitudinal direction of the magnetic tape 1 (longitudinal direction). That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained sliced sample such that the entire magnetic layer 4 is included with respect to the thickness direction of the magnetic layer 4 at the acceleration voltage: 200 kV and the total magnification: 500,000 times to take a TEM photograph. Next, 50 particles, which have the shape that can be clearly observed, are selected from the taken TEM photograph, and a major-axis length DL and a minor-axis length DS of each particle are measured. Here, the major-axis length DL means the maximum one (so-called maximum Feret diameter) of distances between two parallel lines drawn at any angle so as to be in contact with the outline of each particle. Meanwhile, the minor-axis length DS means the maximum one of particle lengths in a direction orthogonal to a major axis (DL) of the particle. Subsequently, the measured major-axis lengths DL of the 50 particles are simply averaged (arithmetically averaged) to obtain an average major-axis length $DL_{ave}$. The average major-axis length $DL_{ave}$ obtained in this way is used as the average particle size of the magnetic powder. Further, the measured minor-axis length DS of the 50 particles are simply averaged (arithmetically averaged) to obtain an average minor-axis length $DS_{ave}$. Then, an average aspect ratio ($DL_{ave}/DS_{ave}$) of the particle is obtained on the basis of the average major-axis length $DL_{ave}$ and the average minor-axis length $DS_{ave}$.

In the case where the magnetic powder includes the ε-iron oxide particles, the average particle volume of the magnetic powder is favorably 500 $nm^3$ or more and 4000 $nm^3$ or less, more favorably 500 $nm^3$ or more and 3000 $nm^3$ or less, still more favorably 500 $nm^3$ or more and 2000 $nm^3$ or less, particularly favorably 600 $nm^3$ or more and 1600 $nm^3$ or less, and most favorably 600 $nm^3$ or more and 1300 $nm^3$ or less. Since noise of the magnetic tape 1 is generally inversely proportional to the square root of the number of particles (i.e., proportional to the square root of the particle volume), it is possible to achieve more excellent electromagnetic conversion characteristics (e.g., SNR) by making the particle volume smaller. Therefore, when the average particle volume of the magnetic powder is 4000 $nm^3$ or less, it is possible to achieve more excellent electromagnetic conversion characteristics (e.g., SNR) as in the case where the average particle size of the magnetic powder is 20 nm or less. Meanwhile, when the average particle volume of the magnetic powder is 500 $nm^3$ or more, an effect similar to that in the case where the average particle size of the magnetic powder is 10 nm or more can be achieved.

In the case where the ε-iron oxide particles each have a spherical shape, the average particle volume of the magnetic powder is obtained as follows. First, the average major-axis length $DL_{ave}$ is obtained in a way similar to the method of calculating the average particle size of the magnetic powder described above. Next, the average volume V of the magnetic powder is obtained in accordance with the following formula.

$$V = (\pi/6)DL_{ave}^3$$

In the case where the ε-iron oxide particles each have a cubic shape, the average volume of the magnetic powder can be obtained as follows. The magnetic tape 1 is processed by an FIB (Focused Ion Beam) method or the like to obtain a slice. In the case of using an FIB method, a carbon film and a tungsten thin film are formed as protective films as pre-processing for observing a TEM image of a cross section described below. The carbon film is formed on each of the surfaces of the magnetic tape 1 on the side of the magnetic layer 4 and on the side of the back layer 5 by a vapor deposition method and the tungsten thin film is further formed on the surface on the side of the magnetic layer by a vapor deposition method or a sputtering method. The slicing is performed along the longitudinal direction of the magnetic tape 1 (longitudinal direction). That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section of the obtained sliced sample such that the magnetic layer 4 is include with respect to the thickness direction of the magnetic layer 4 at the acceleration voltage: 200 kV and the total magnification: 500,000 times to take a TEM photograph. Note that the magnification and the acceleration voltage may be adjusted as appropriate in accordance with the type of apparatus. Next, 50 particles, which have a clear shape, are selected from the taken TEM photograph, and a length DC of a side of each particle is measured. Subsequently, the measured lengths DC of the 50 particles are simply averaged (arithmetically averaged) to obtain an average side length $DC_{ave}$. Next, an average volume $V_{ave}$(particle volume) of the magnetic powder is obtained on the basis of the following formula by using the average side length $DC_{ave}$.

$$V_{ave} = DC_{ave}^3$$

(Cobalt Ferrite Particles)

It is favorable that the cobalt ferrite particles each have uniaxial crystal anisotropy. Since the cobalt ferrite particle has uniaxial crystal anisotropy, it is possible to make the magnetic powder preferentially crystal-oriented in the thickness direction (perpendicular direction) of the magnetic tape 1. The cobalt ferrite particle has, for example, a cubic shape. In the present specification, the cubic shape includes a substantially cubic shape. The Co-containing spinel ferrite may further contain at least one of Ni, Mn, Al, Cu, or Zn in addition to Co.

The Co-containing spinel ferrite has an average composition represented by the following formula, for example.

$$Co_xM_yFe_2O_z$$

(where M represents, for example, at least one metal of Ni, Mn, Al, Cu, or Zn. x represents a value in a range of $0.4 \le x \le 1.0$. y represents a value in a range of $0 \le y \le 0.3$. However, x and y satisfy the relationship of $(x+y) \le 1.0$. z represents a value in a range of $3 \le z \le 4$. Some Fes may be substituted by another metal element.)

In the case where the magnetic powder includes a powder of cobalt ferrite particles, the average particle size of the magnetic powder is favorably 8 nm or more and 16 nm or less, more favorably 8 nm or more and 13 nm or less, and still more favorably 8 nm or more and 10 nm or less. When the average particle size of the magnetic powder is 16 nm or less, it is possible to achieve more excellent electromagnetic conversion characteristics (e.g., SNR) in the magnetic tape 1 having high recording density. Meanwhile, when the average particle size of the magnetic powder is 8 nm or more, the dispersibility of the magnetic powder is further improved, and it is possible to achieve more excellent electromagnetic conversion characteristics (e.g., SNR). The method of calculating the average particle size of the magnetic powder is similar to the method of calculating the average particle size of the magnetic powder in the case where the magnetic powder includes a powder of the ε-iron oxide particles.

In the case where the magnetic powder includes a powder of cobalt ferrite particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within the range of 1.0 or more and 3.0 or less, it is possible to suppress agglomeration of the magnetic powder. Further, the resistance applied to the magnetic powder when perpendicularly orienting the magnetic powder in the process of forming the magnetic layer 4 can be suppressed. Therefore, it is possible to improve the perpendicular orientation property of the magnetic powder. The method of calculating the average aspect ratio of the magnetic powder is similar to the method of calculating the average aspect ratio of the magnetic powder in the case where the magnetic powder includes a powder of the ε-iron oxide particles.

In the case where the magnetic powder includes a powder of cobalt ferrite particles, the average particle volume of the magnetic powder is favorably 500 $nm^3$ or more and 4000 $nm^3$ or less, more favorably 600 $nm^3$ or more and 2000 $nm^3$ or less, and still more favorably 600 $nm^3$ or more and 1000 $nm^3$ or less. When the average particle volume of the magnetic powder is 4000 $nm^3$ or less, an effect similar to that in the case where the average particle size of the magnetic powder is 16 nm or less can be achieved. Meanwhile, when the average particle volume of the magnetic powder is 500 $nm^3$ or more, an effect similar to that in the case where the average particle size of the magnetic powder is 8 nm or more can be achieved. The method of calculating the average particle volume of the magnetic powder is similar to the method of calculating the average particle volume in the case where the ε-iron oxide particle has a cubic shape.

(Binder)

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenolic resin, an epoxy resin, a polyurethane curable resin, a urea resin, a melamine resin, an alkyd resin, a silicone resin, a polyamine resin, and a urea-formaldehyde resin.

For the purpose of improving the dispersibility of the magnetic powder, $—SO_3M$, $—OSO_3M$, —COOM, $P{=}O(OM)_2$ (where M represents a hydrogen atom or an alkali metal such as lithium, potassium, and sodium), a side chain amine having a terminal group represented by —NR1R2, $—NR1R2R3^+X^-$, a main chain amine represented by $>NR1R2^+X^-$ (where R1, R2, and R3 each represent a hydrogen atom or a hydrocarbon group, and $X^-$ represents a halogen element ion such as fluorine, chlorine, bromine, and iodine, an inorganic ion, or an organic ion.), and a polar functional group such as —OH, —SH, —CN, and an epoxy group may be introduced into all the binders described above. The amount of the polar functional groups introduced into the binders is favorably $10^{-1}$ to $10^{-8}$ mol/g, and more favorably $10^{-2}$ to $10^{-6}$ mol/g.

(Lubricant)

The lubricant contains, for example, at least one of a fatty acid or a fatty acid ester, and favorably both a fatty acid and a fatty acid ester. Containing a lubricant in the magnetic layer 4, particularly, containing both a fatty acid and a fatty acid ester in the magnetic layer 4, contributes to improving the travelling stability of the magnetic tape 1. Particularly, when the magnetic layer 4 contains a lubricant and has a pore, favorable travelling stability can be achieved. It is conceivable that the improvement in the travelling stability can be achieved because the dynamic friction coefficient of the surface of the magnetic tape 1 on the side of the magnetic layer 4 is adjusted to the value suitable for travelling of the magnetic tape 1 by the lubricant described above.

The fatty acid may favorably be a compound represented by the following general formula (1) or (2). For example, one of the compound represented by the following general formula (1) and the compound represented by the general formula (2) may be contained as a fatty acid, or both of them may be contained.

Further, the fatty acid ester may favorably be a compound represented by the following general formula (3) or (4). For example, one of the compound represented by the following general formula (3) and the compound represented by the general formula (4) may be contained as the fatty acid ester, or both of them may be contained.

When the lubricant contains one or both of the compound represented by the general formula (1) and the compound represented by the general formula (2) and one or both of the compound represented by the general formula (3) and the compound represented by the general formula (4), it is possible to suppress an increase in dynamic friction coefficient due to repeated recording or reproduction of the magnetic tape 1.

$$CH_3(CH_2)_kCOOH \tag{1}$$

(However, in the general formula (1), k represents an integer selected from a range of 14 or more and 22 or less, and more favorably a range of 14 or more and 18 or less.)

$$CH_3(CH_2)_nCH=CH(CH_2)_mCOOH \tag{2}$$

(However, in the general formula (2), the sum of n and m is an integer selected from a range of 12 or more and 20 or less, and more favorably a range of 14 or more and 18 or less.)

$$CH_3(CH_2)_pCOO(CH_2)_qCH_3 \tag{3}$$

(However, in the general formula (3), p represents an integer selected from a range of 14 or more and 22 or less, and more favorably a range of 14 or more and 18 or less, and q represents an integer selected from a range of 2 or more and 5 or less, and more favorably a range of 2 or more and 4 or less.)

$$CH_3(CH_2)_rCOO-(CH_2)_sCH(CH_3)_2 \quad (4)$$

(However, in the general formula (4), r represents an integer selected from a range of 14 or more and 22 or less, and s represents an integer selected from a range of 1 or more and 3 or less.)

$$CH_3(CH_2)_rCOO-CH(CH_3)(CH_2)_sCH(CH_3) \quad (5)$$

(However, in the general formula (5), r represents an integer selected from a range of 14 or more and 22 or less, an s represents an integer selected from a range of 1 or more and 3 or less.)

(Antistatic Agent)

Examples of the antistatic agent include carbon black, natural surfactant, nonionic surfactant, and cationic surfactant.

(Abrasive)

Examples of the abrasive include α-alumina, β-alumina, and γ-alumina having an α-transformation rate of 90% or more, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating a raw material of magnetic iron oxide and performing annealing treatment thereon, and those obtained by performing surface treatment on them with aluminum and/or silica as necessary.

(Curing Agent)

Examples of the curing agent include a polyisocyanate. Examples of the polyisocyanate include an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound. The weight average molecular weight of the polyisocyanates is desirably in a range of 100 to 3000.

(Rust Inhibitor)

Examples of the rust inhibitor include phenols, naphthols, quinones, a heterocyclic compound containing a nitrogen atom, a heterocyclic compound containing an oxygen atom, and a heterocyclic compound containing a sulfur atom.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, and titanium oxide (rutile or anatase titanium oxide).

(Underlayer 3)

The underlayer 3 is for reducing the recesses and projections on the surface of the base material 2 and adjusting the recesses and projections on the surface of the magnetic layer 4. The underlayer 3 is a non-magnetic layer 4 containing a non-magnetic powder, a binder, and a lubricant. The underlayer 3 supplies the lubricant to the surface of the magnetic layer 4. The underlayer 3 may further contain at least one additive of an antistatic agent, a curing agent, a rust inhibitor, or the like as necessary.

An average thickness $t_2$ of the underlayer 3 is favorably 0.3 μm or more and 1.2 μm or less, more favorably 0.3 μm or more and 0.9 μm or less, and 0.3 μm or more and 0.6 μm or less. Note that the average thickness $t_2$ of the underlayer 3 is obtained in a way similar to that for the average thickness $t_1$ of the magnetic layer 4. However, the magnification of the TEM image is adjusted as appropriate in accordance with the thickness of the underlayer 3. When the average thickness $t_2$ of the underlayer 3 is 1.2 μm or less, the stretchability of the magnetic tape 1 due to external force further increases, and thus, adjustment of the width of the magnetic tape 1 by tension adjustment becomes easier.

(Non-Magnetic Powder)

The non-magnetic powder includes, for example, at least one of an inorganic particle powder or an organic particle powder. Further, the non-magnetic powder may include a carbon powder such as carbon black. Note that one type of non-magnetic powder may be used alone or two or more types of non-magnetic powder may be used in combination. The inorganic particles contain, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

(Binder and Lubricant)

The binder and the lubricant are similar to those of the magnetic layer 4 described above.

(Additive)

The antistatic agent, the curing agent, and the rust inhibitor are similar to those of the magnetic layer 4 described above.

(Back Layer 5)

The back layer 5 contains a binder and a non-magnetic powder. The back layer 5 may further contain at least one additive of a lubricant, a curing agent, an antistatic agent, or the like as necessary. The binder and the non-magnetic powder are similar to those of the underlayer 3 described above.

The average particle size of the non-magnetic powder is favorably 10 nm or more and 150 nm or less, and more favorably 15 nm or more and 110 nm or less. The average particle size of the non-magnetic powder is obtained in a way similar to that for the average particle size of the magnetic powder described above. The non-magnetic powder may include a non-magnetic powder having two or more granularity distributions.

The upper limit value of the average thickness of the back layer 5 is favorably 0.6 μm or less. When the upper limit value of the average thickness of the back layer 5 is 0.6 μm or less, the underlayer 3 and the base material 2 can be kept thick even in the case where the average thickness of the magnetic tape 1 is 5.6 μm or less, and thus, it is possible to maintain the travelling stability of the magnetic tape 1 in the recording/reproduction apparatus. The lower limit value of the average thickness of the back layer 5 is not particularly limited, but is, for example, 0.2 μm or more.

An average thickness $t_b$ of the back layer 5 is obtained as follows. First, an average thickness $t_T$ of the magnetic tape 1 is measured. The measurement method of the average thickness $t_T$ is as described in the following "Average thickness of magnetic tape 1". Subsequently, the back layer 5 of the sample is removed with a solvent such as MEK (methyl ethyl ketone) and dilute hydrochloric acid. Next, a Laser Hologage (LGH-110C) manufactured by Mitutoyo Corporation is used to measure the thickness of the sample at five or more positions, and the measured values are simply averaged (arithmetically averaged) to calculate an average value $t_B$ [μm]. After that, the average thickness $t_b$ [μm] of the back layer 5 is obtained in accordance with the following formula. Note that the measurement positions are randomly selected from the sample.

$$t_b[\mu m] = t_T[\mu m] - t_B[\mu m]$$

The back layer 5 has a surface provided with numerous protruding portions. The numerous protruding portions are for forming numerous hole portions in the surface of the magnetic layer 4 under a state in which the magnetic tape 1 has been wound in a roll shape. The numerous hole portions are formed by numerous non-magnetic particles protruding from the surface of the back layer 5, for example.

(Average Thickness of Magnetic Tape 1)

The upper limit value of the average thickness (average total thickness) $t_T$ of the magnetic tape 1 is 5.4 μm or less, favorably 5.2 μm or less, more favorably 4.9 μm or less, and still more favorably 4.6 μm or less. When the average thickness $t_T$ of the magnetic tape 1 is 5.4 μm or less, it is possible to make the recording capacity of a single data cartridge 10 larger than that of a general magnetic tape 1. The lower limit value of the average thickness $t_T$ of the magnetic tape 1 is not particularly limited, but is, for example, 3.5 μm or more.

The average thickness $t_T$ of the magnetic tape 1 is obtained as follows. First, the magnetic tape 1 having a width of ½ inch is prepared and cut into a length of 250 mm to prepare a sample. Next, a Laser Hologage (LGH-110C) manufactured by Mitutoyo Corporation is used as a measuring apparatus to measure the thickness of the sample at five or more positions, and the measured values are simply averaged (arithmetically averaged) to calculate an average value $t_T$ [μm]. Note that the measurement positions are randomly selected from the sample.

(Coercive Force Hc)

The upper limit value of a coercive force Hc2 of the magnetic layer 4 in the longitudinal direction of the magnetic tape 1 is favorably 2200 Oe or less, more favorably 2000 Oe or less, more favorably 1800 Oe or less, and still more favorably 1600 Oe or less. When the coercive force Hc2 of the magnetic layer 4 in the longitudinal direction is 2200 Oe or less, sufficient electromagnetic conversion characteristics can be provided even with high recording density.

The lower limit value of the coercive force Hc2 of the magnetic layer 4 measured in the longitudinal direction of the magnetic tape 1 is favorably 1000 Oe or more. When the coercive force Hc2 of the magnetic layer 4 measured in the longitudinal direction is 1000 Oe or more, it is possible to suppress demagnetization due to leakage flux from the recording head.

The coercive force Hc2 described above is obtained as follows. First, the magnetic tape 1 housed in the cartridge 10 is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, a vibrating sample magnetometer (VSM) is used to measure the M-H loop of the measurement sample (the entire magnetic tape 1) corresponding to the longitudinal direction (travelling direction) of the magnetic tape 1. Next, acetone, ethanol, or the like is used to wipe off the coating film (the underlayer 3, the magnetic layer 4, the back layer 5, and the like) of the magnetic tape 1 cut as described above, leaving only the base material 2. Then, three obtained base materials 2 are superimposed with double sided tape, and then punched out with a punch of φ6.39 mm to prepare a sample for background correction (hereinafter, referred to simply as "correction sample"). After that, the M-H loop of the correction sample (base material 2) corresponding to the perpendicular direction of the base material 2 (perpendicular direction of the magnetic tape 1) is measured using the VSM.

In the measurement of the M-H loop of the measurement sample (the entire magnetic tape 1) and the M-H loop of the correction sample (base material 2), a highly sensitive vibrating sample magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 2) are obtained, the M-H loop of the correction sample (base material 2) is subtracted from the M-H loop of the measurement sample (the entire magnetic tape 1) to perform background correction, thereby obtaining the M-H loop after background correction. A measurement/analysis program attached to the "VSM-P7-15" is used for this calculation of background correction. The coercive force Hc2 is obtained on the basis of the obtained M-H loop after background correction. Note that the measurement/analysis program attached to the "VSM-P7-15" is used for this calculation. Note that the measurement of the M-H loop described above is performed at 25° C.±2° C. and 50% RH±5% RH. Further, the "demagnetizing field correction" in measuring the M-H loop in the longitudinal direction of the magnetic tape 1 is not performed.

(Squareness Ratio)

A squareness ratio S1 of the magnetic layer 4 in the perpendicular direction (thickness direction) of the magnetic tape 1 is favorably 60% or more, more favorably 65% or more, still more favorably 70% or more, particularly favorably 75% or more, and most favorably 80% or more. When the squareness ratio S1 is 60% or more, the perpendicular orientation property of the magnetic powder is sufficiently high, and thus, it is possible to achieve more excellent electromagnetic conversion characteristics (e.g., SNR).

The squareness ratio S1 in the perpendicular direction is obtained as follows. First, the magnetic tape 1 housed in the cartridge 10 is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, the M-H loop of the measurement sample (the entire magnetic tape 1) corresponding to the longitudinal direction (travelling direction) of the magnetic tape 1 is measured using a vibrating sample magnetometer (VSM). Next, acetone, ethanol, or the like is used to wipe off the coating film (the underlayer 3, the magnetic layer 4, the back layer 5, and the like) of the magnetic tape 1 cut as described above, leaving only the base material 2. Then, three obtained base materials 2 are superimposed with double sided tape, and then punched out with a punch of φ6.39 mm to prepare a sample for background correction (hereinafter, referred to simply as "correction sample"). After that, the M-H loop of the correction sample (base material 2) corresponding to the perpendicular direction of the base material 2 (perpendicular direction of the magnetic tape 1) is measured using the VSM.

In the measurement of the M-H loop of the measurement sample (the entire magnetic tape 1) and the M-H loop of the correction sample (base material 2), a highly sensitive vibrating sample magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 2) are obtained, the M-H loop of the correction sample (base material 2) is subtracted from the M-H loop of the measurement sample (the entire magnetic tape 1) to perform background correction, thereby obtaining the M-H loop after background correction. The measurement/analysis program attached to the "VSM-P7-15" is used for this calculation of background correction.

A saturation magnetization Ms (emu) and a residual magnetization Mr (emu) of the obtained M-H loop after background correction are substituted into the following formula to calculate the squareness ratio S1(%). Note that the measurement of the M-H loop described above is performed at 25° C.±2° C. and 50% RH±5% RH. Further, the "demagnetizing field correction" in measuring the M-H loop in the perpendicular direction of the magnetic tape 1 is not performed. Note that the measurement/analysis program attached to the "VSM-P7-15" is used for this calculation.

$$\text{Squareness ratio } S1\ (\%) = (Mr/Ms) \times 100$$

A squareness ratio S2 of the magnetic layer 4 in the longitudinal direction (travelling direction) of the magnetic tape 1 is favorably 35% or less, more favorably 30% or less, still more favorably 25% or less, particularly favorably 20% or less, and most favorably 15% or less. When the squareness ratio S2 is 35% or less, the perpendicular orientation property of the magnetic powder is sufficiently high, and thus, it is possible to achieve more excellent electromagnetic conversion characteristics (e.g., SNR).

The squareness ratio only needs to satisfy a value in one of the perpendicular direction and the longitudinal direction. In particular, in the magnetic tape 1 in which the magnetic layer is as thin as 100 nm or less, it is better to place more emphasis on the squareness ratio in the longitudinal direction than in the perpendicular direction where the influence of demagnetizing field tends to be different.

The squareness ratio S2 in the longitudinal direction is obtained in a way similar to that for the squareness ratio S1 except for measuring the M-H loop in the longitudinal direction (travelling direction) of the magnetic tape 1 and the base material 2.

(Surface Roughness $R_b$ of Back Surface)

A surface roughness $R_b$ of the back surface (surface roughness of the back layer 5) favorably satisfies the relationship of $R_b \leq 6.0$ [nm]. When the surface roughness $R_b$ of the back surface is within the range described above, it is possible to achieve more excellent electromagnetic conversion characteristics.

<Others>

The present technology may also take the following configurations.

(1) A servo recording apparatus, including:

a servo write head that writes a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle.

(2) The servo recording apparatus according to (1) above, in which the servo write head includes a plurality of pairs of servo elements corresponding to the plurality of servo bands, each of the pairs of servo elements including a first servo element that writes the first servo pattern and a second servo element that writes the second servo pattern.

(3) The servo recording apparatus according to (2) above, in which the first servo element and the second servo element are provided in the servo write head so as to be asymmetric with respect to the width direction of the magnetic tape.

(4) The servo recording apparatus according to (3) above, in which the first servo element is inclined with respect to the width direction of the magnetic tape at a first angle, and the second servo element is inclined opposite to the first angle at a second angle that is different from the first angle with respect to the width direction of the magnetic tape.

(5) The servo recording apparatus according to (4) above, in which the first head azimuth angle of the data write head is adjusted in the data recording apparatus.

(6) The servo recording apparatus according to (5) above, in which the first head azimuth angle of the data write head is adjusted within a reference angle±x° in the data recording apparatus.

(7) The servo recording apparatus according to (6) above, in which the first angle and the second angle are related to the reference angle.

(8) The servo recording apparatus according to (7) above, in which the first angle has a value obtained by adding a servo azimuth angle to the reference angle.

(9) The servo recording apparatus according to (7) or (8) above, in which the second angle has a value obtained by subtracting the servo azimuth angle from the reference angle.

(10) The servo recording apparatus according to (7) above, in which the servo write head is disposed such that a longitudinal direction of the servo write head is inclined with respect to the width direction of the magnetic tape by a second head azimuth angle.

(11) The servo recording apparatus according to (10) above, in which the first servo element and the second servo element are inclined opposite to each other at the same angle with respect to the longitudinal direction of the servo write head.

(12) The servo recording apparatus according to (10) or (11) above, in which the second head azimuth angle matches the reference angle.

(13) The servo recording apparatus according to any one of (4) to (12) above, in which the first servo element and the second servo element have longitudinal directions, and a length of the first servo element in the longitudinal direction and a length of the second servo element in the longitudinal direction are different from each other.

(14) The servo recording apparatus according to (13) above, in which a component of the width direction of the magnetic tape in the length of the first servo element and a component of the width direction of the magnetic tape in the length of the second servo element are the same.

(15) The servo recording apparatus according to any one of (10) to (14) above, in which the servo write head has a width direction, the servo write head has a facing surface that faces the magnetic tape, and the facing surface includes a plurality of grooves along a direction that is not parallel to the width direction of the servo write head.

(16) The servo recording apparatus according to any one of (6) to (15) above, in which the reference angle is 2.5° or more with respect to the width direction of the magnetic tape.

(17) The servo recording apparatus according to any one of (6) to (16) above, in which the x has a value of 0.7° or less.

(18) The servo recording apparatus according to any one of (6) to (17) above, in which a phase difference of servo patterns between servo bands adjacent to each other is represented by SP×tan (Refθ), the servo patterns including the first servo pattern and the second servo pattern, the Refθ being the reference angle, the SP being a pitch between the servo bands adjacent to each other in the width direction of the magnetic tape.

(19) A servo write head that writes a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle.

(20) A method of producing a magnetic tape, including:

writing, by a servo write head of a servo recording apparatus, a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle.

(21) A magnetic tape, including:

a base;

a non-magnetic layer that is stacked on the base; and a magnetic layer that is stacked on the non-magnetic layer, the magnetic tape having a plurality of servo bands to which servo patterns have been written, the servo patterns including a first servo pattern and a second servo pattern that are asymmetric with respect to a width direction of the magnetic tape, the servo patterns in servo bands adjacent to each other having a phase difference.

(22) The magnetic tape according to (21) above, in which the first servo pattern is inclined with respect to the width direction of the magnetic tape at a first angle, and the second servo pattern is inclined opposite to the first angle at a second angle that is different from the first angle with respect to the width direction of the magnetic tape.

(23) The magnetic tape according to (21) or (22) above, in which the first servo pattern and the second servo pattern have longitudinal directions, and, a length of the first servo pattern in the longitudinal direction and a length of the second servo pattern in the longitudinal direction are different from each other.

(24) The magnetic tape according to (23) above, in which a component of the width direction of the magnetic tape in the length of the first servo pattern and a component of the width direction of the magnetic tape in the length of the second servo pattern are the same.

(25) The magnetic tape according to (22) above, in which the magnetic tape is used in a data recording apparatus that includes a data write head disposed such that a longitudinal direction of the data write head is inclined with respect to the width direction of the magnetic tape by a first head azimuth angle.

(26) The magnetic tape according to (25) above, in which the first head azimuth angle is adjusted within a predetermined range with reference to a reference angle.

(27) The magnetic tape according to (26) above, in which the phase difference is related to the reference angle.

(28) The magnetic tape according to (27) above, in which the phase difference is represented by SP×tan (Refθ), the Refθ being the reference angle, the SP being a pitch between the servo bands adjacent to each other in the width direction of the magnetic tape.

(29) The magnetic tape according to any one of (26) to (28) above, in which phases of the servo pattern are the same in a direction of the reference angle with respect to the width direction of the magnetic tape.

(30) The magnetic tape according to any one of (26) to (29) above, in which the first angle and the second angle are related to the reference angle.

(31) The magnetic tape according to (30) above, in which the first angle has a value obtained by adding a servo azimuth angle to the reference angle.

(32) The magnetic tape according to (31) above, in which the second angle has a value obtained by subtracting the servo azimuth angle from the reference angle.

REFERENCE SIGNS LIST

1 magnetic tape
7 servo pattern

7*a* first servo pattern
7*b* second servo pattern
20 data write head
40 servo write head
42 servo element
42*a* first servo element
42*b* second servo element
100 data recording/reproduction apparatus
101 servo recording/reproduction apparatus

The invention claimed is:

1. A servo recording apparatus, comprising:

a servo write head that writes a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle, wherein the servo write bead includes a plurality of pairs of servo elements corresponding to the plurality of servo bands, each of the pairs of servo elements including a first servo element that writes the first servo pattern and a second servo element that writes the second servo pattern.

2. The servo recording apparatus according to claim 1, wherein the first servo element and the second servo element are provided in the servo write head so as to be asymmetric with respect to the width direction of the magnetic tape.

3. The servo recording apparatus according to claim 2, wherein the first servo element is inclined with respect to the width direction of the magnetic tape at a first angle, and the second servo element is inclined opposite to the first angle at a second angle that is different from the first angle with respect to the width direction of the magnetic tape.

4. The servo recording apparatus according to claim 3, wherein the first head azimuth angle of the data write head is adjusted in the data recording apparatus.

5. The servo recording apparatus according to claim 4, wherein the first head azimuth angle of the data write head is adjusted within a reference angle ±x° in the data recording apparatus.

6. The servo recording apparatus according to claim 5, wherein the first angle and the second angle are related to the reference angle.

7. The servo recording apparatus according to claim 6, wherein the first angle has a value obtained by adding a servo azimuth angle to the reference angle.

8. The servo recording apparatus according to claim 6, wherein the second angle has a value obtained by subtracting the servo azimuth angle from the reference angle.

9. The servo recording apparatus according to claim 6, wherein the servo write head is disposed such that a longitudinal direction of the servo write head is inclined with respect to the width direction of the magnetic tape by a second head azimuth angle.

10. The servo recording apparatus according to claim 9, wherein the first servo element and the second servo element are inclined opposite to each other at the same angle with respect to the longitudinal direction of the servo write head.

11. The servo recording apparatus according to claim 9, wherein the second head azimuth angle matches the reference angle.

12. The servo recording apparatus according to claim 9, wherein the servo write head has a width direction, the servo write head has a facing surface that faces the magnetic tape, and the facing surface includes a plurality of grooves along a direction that is not parallel to the width direction of the servo write head.

13. The servo recording apparatus according to claim 5, wherein the reference angle is 2.5° or more with respect to the width direction of the magnetic tape.

14. The servo recording apparatus according to claim 5, wherein the x has a value of 0.7° or less.

15. The servo recording apparatus according to claim 5, wherein a phase difference of servo patterns between servo bands adjacent to each other is represented by SP×tan (Refθ), the servo patterns including the first servo pattern and the second servo pattern, the Refθ being the reference angle, the SP being a pitch between the servo bands adjacent to each other in the width direction of the magnetic tape.

16. The servo recording apparatus according to claim 3, wherein the first servo element and the second servo element have longitudinal directions, and a length of the first servo element in the longitudinal direction and a length of the second servo element in the longitudinal direction are different from each other.

17. The servo recording apparatus according to claim 16, wherein a component of the width direction of the magnetic tape in the length of the first servo element and a component of the width direction of the magnetic tape in the length of the second servo element are the same.

18. A servo write head that writes a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle, wherein the servo write head includes a plurality of pairs of servo elements corresponding to the plurality of servo bands, each of the pairs of servo elements including a first servo element that writes the first servo pattern and a second servo element that writes the second servo pattern.

19. A method of producing a magnetic tape, comprising:

writing, by a servo write head of a servo recording apparatus, a first servo pattern and a second servo pattern to a plurality of servo bands of a magnetic tape, the first servo pattern and the second servo pattern being asymmetric with respect to a width direction of the magnetic tape, the magnetic tape being used in a data recording apparatus that includes a data write head disposed such that a longitudinal direction of the data write head is inclined with respect to the width direction of the magnetic tape by a first head azimuth angle, wherein the servo write head includes a plurality of pairs of servo elements corresponding to the plurality of servo bands, each of the pairs of servo elements including a first servo element that writes the first servo pattern and a second servo element that writes the second servo pattern.

20. A magnetic tape, comprising:

a base;

a non-magnetic layer that is stacked on the base; and a magnetic layer that is stacked on the non-magnetic layer, the magnetic tape having a plurality of servo bands to which servo patterns have been written, the servo patterns including a first servo pattern and a second servo pattern that are asymmetric with respect to a width direction of the magnetic tape, the servo patterns in servo bands adjacent to each other having a phase difference, wherein the first servo pattern is inclined with respect to the width direction of the magnetic tape at a first angle, wherein the second servo pattern is inclined opposite to the first angle at a second angle that is different from the first angle with respect to the width direction of the magnetic tape, wherein the first head azimuth angle is adjusted within a predetermined range with reference to a reference angle, wherein the phase difference is related to the reference angle, and wherein the phase difference is represented by SP×tan (Refθ), the Refθ being the reference angle, the SP being a pitch between the servo bands adjacent to each other in the width direction of the magnetic tape.

21. The magnetic tape according to claim 20, wherein the first servo pattern and the second servo pattern have longitudinal directions, and, a length of the first servo pattern in the longitudinal direction and a length of the second servo pattern in the longitudinal direction are different from each other.

22. The magnetic tape according to claim 21, wherein a component of the width direction of the magnetic tape in the length of the first servo pattern and a component of the width direction of the magnetic tape in the length of the second servo pattern are the same.

23. The magnetic tape according to claim 2, wherein phases of the servo pattern are the same in a direction of the reference angle with respect to the width direction of the magnetic tape.

24. The magnetic tape according to claim 20, wherein the first angle and the second angle are related to the reference angle.

25. A magnetic tape, comprising:

a base;

a non-magnetic layer that is stacked on the base; and a magnetic layer that is stacked on the non-magnetic layer, the magnetic tape having a plurality of servo bands to which servo patterns have been written, the servo patterns including a first servo pattern and a second servo pattern that are asymmetric with respect to a width direction of the magnetic tape, the servo patterns in servo bands adjacent to each other having a phase difference, wherein the first servo pattern is inclined with respect to the width direction of the magnetic tape at a first angle, wherein the second servo pattern is inclined opposite to the first angle at a second angle that is different from the first angle with respect to the width direction of the magnetic tape, wherein the magnetic tape is used in a data recording apparatus that includes a data write head disposed such that a longitudinal direction of the data write head is inclined with respect to the width direction of the magnetic tape by a first head azimuth angle, wherein the first head azimuth angle is adjusted within a predetermined range with reference to a reference angle, wherein the first angle and the second angle are related to the reference angle, and wherein the first angle has a value obtained by adding a servo azimuth angle to the reference angle.

26. The magnetic tape according to claim 25, wherein the second angle has a value obtained by subtracting the servo azimuth angle from the reference angle.

* * * * *